US006212577B1

(12) United States Patent
Stern et al.

(10) Patent No.: US 6,212,577 B1
(45) Date of Patent: *Apr. 3, 2001

(54) METHOD AND APPARATUS FOR IMPROVED INTERACTION WITH AN APPLICATION PROGRAM ACCORDING TO DATA TYPES AND ACTIONS PERFORMED BY THE APPLICATION PROGRAM

(75) Inventors: Mark Ludwig Stern; Robert George Johnston, Jr., both of Cupertino; Elizabeth Ann Robinson Moller, Boulder Creek, all of CA (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,079

(22) Filed: Jan. 5, 1998

Related U.S. Application Data

(63) Continuation of application No. 08/761,714, filed on Dec. 6, 1996, which is a continuation of application No. 08/344,540, filed on Nov. 23, 1994, and a continuation of application No. 08/025,604, filed on Mar. 3, 1993.

(51) Int. Cl.[7] .................................................... G06F 9/54
(52) U.S. Cl. ............................................................ 709/329
(58) Field of Search ................................... 709/300, 302, 709/310–332

(56) References Cited

U.S. PATENT DOCUMENTS 5,341,293   8/1994   Vertelney et al. .................. 707/530
5,579,521 * 11/1996   Shearer et al. ...................... 709/300

OTHER PUBLICATIONS

Powell, James E. "HiJaak 1.0," Windows Magazine, No. 311, 310, pp(2), 1992.*

* cited by examiner

*Primary Examiner*—Alvin E. Oberley
*Assistant Examiner*—St. John Courtenay, III
(74) *Attorney, Agent, or Firm*—Blakely, Sokoloff, Taylor & Zafman

(57) ABSTRACT

A method and apparatus for performing actions while selecting objects on a user interface display. A user may select a first item in an area of a display controlled by a first process and drag that item to a second area on a display controlled by a second process. The second process may negotiate with the first process to provide certain data types, and based upon those data types, the second process will determine a list of actions in hierarchical fashion which may be performed upon the data. Such actions may include, but are not limited to, printing, sending electronic mail, and performing other actions in the computer system. Alternative and primary actions may also be specified by a user, such as by selecting various keys on a keyboard or other input device. Further, a user may specify that the second process display a list of actions which may be performed upon the selected item and allow the user to select an action from a list.

15 Claims, 58 Drawing Sheets

METHOD AND APPARATUS FOR IMPROVED INTERACTION WITH AN APPLICATION PROGRAM ACCORDING TO DATA TYPES AND ACTIONS PERFORMED BY THE APPLICATION PROGRAM

This application is a continuation of Ser. No. 08/761,714 filed Dec. 6, 1996; which is a continuation of Ser. No. 08/344,540 filed Nov. 23, 1994 which is a continuation of Ser. No. 08/025,604 filed Mar. 3, 1993.

BACKGROUND OF THE INVENTION

1. Field of the Invention

The present invention relates to a method and apparatus for the manipulation of data in a computer system and the visual feedback which is provided thereof. More specifically, the present invention relates to an improved method and apparatus for selection and information from one location to another in a user interface display to cause certain actions to occur.

2. Background Information

Existing graphical user interfaces (GUI's) in computer systems provide a variety of tools to manipulate information. One of the key design characteristics of graphical user interface is the concept of direct manipulation. Traditional disk operating systems used a command line interface (such as the MS DOS operating system available from Microsoft Corporation of Redmond, Wash.), and English language commands are issued by a user in order to cause certain events to occur. In modern GUI's, files and other information are directly manipulated by selecting icons representing files and moving the icons while selected on the computer system display. In this manner, files may be moved, copied, deleted, and otherwise manipulated in the file system of the computer.

An example of this process is shown in FIGS. 1a–1d. For example, in FIG. 1a, in a window 100, which is displayed on a computer system display, the user may select an icon 120 representing a file using a cursor pointer 110 which is under user control using a mouse, trackball, or other cursor control device. Once selected the user may move or manipulate the icon in any manner in order to perform certain actions in the file system. Icon 120 is shown in its selected state in window 100 of FIG. 1a. Then, as is illustrated in FIG. 1b, the user may start to move cursor 110 while the icon is selected causing an outline image representation of the icon and its file name, which is illustrated as 130, to be moved on the computer system display. This allows the user to manipulate the file for movement within the file system. Then, as is illustrated in FIG. 1c, the user may move pointer 110 to a subdirectory entitled "Documents," shown as 140 in FIG. 1c (also known as a "folder" in the Macintosh® brand operating system), for movement of that file in the file system. When the "folder" icon 140 is pointed to by pointer 110, it becomes shown in its highlighted state, as is illustrated in FIG. 1c. Then, as is illustrated in FIG. 1d, when the user deselects the icon (that is, releases a mouse button or other selection means), the original icon 120 disappears from the window, and icon 140 is shown in an unselected state. In addition to the visual representation on window 100 as is illustrated in FIG. 1d, the file has been moved from the directory which window 100 represents to the subdirectory "Documents" represented by icon 140. For accessing the file represented by icon 120 at a later time, the user will select icon 140 causing a second window to be displayed representing that subdirectory and be able to access the file represented by icon 120. Thus, movements within the file system and reorganization of files in the file system, known as the HFS (Hierarchical Filing System) in the Macintosh® brand operating system, may be performed using this prior art technique.

Another prior art implementation of a movement of information in a graphical user interface such as that used by the Macintosh® brand operating system is illustrated with reference to FIGS. 2a–2d. For example, this is a process which may be used for transferring text between a window displaying one set of text (e.g., 210) and a second window with a second set of text in it (e.g., 220). As is illustrated in FIG. 2a, the user will select a region of text in document 210 utilizing cursor 200 under control of the cursor control and selection device and select an option from a pull-down menu 230, such as "Cut" 230a. This is a destructive move operation wherein the text is removed from document 210 and will be moved to document 220. This is all illustrated in FIG. 2a. Then, the user will move the cursor to second document 220 in text area 220a and select a region in the text at which he desires the text to be moved. The cursor in text region 220a will change to a format known as insertion carat 250 which indicates where the insertion point will be. Then, as is illustrated in FIG. 2c, the user will use pull-down menu 230 again, selecting a second option "Paste" 230b to retrieve text 240 from an intermediate storage device, such as a clipboard or other type of intermediate storage buffer, and insert the text at that location. As is illustrated in FIG. 2c, the text is still highlighted as this is shown immediately after the paste operation. Then, the highlighting is removed, as is illustrated in FIG. 2d, when the user selects other regions of the screen to operate in or performs other operations. Thus, as is illustrated in FIG. 2d, the destructive move operation from Document 1210 to Document 2220 has been accomplished. As is well-known to those skilled in the prior art, nondestructive "copy" operations may also be performed in a similar manner by selecting other pulldown menu options on pull-down menus such as FIGS. 2a and 2c. Note that the documents 210 and 220 may be under control of a single program, such as a word processing program, or may be under control of different application programs, such as one word processing program and a second word processing program or any other type of application program. As is well-known to those skilled in the prior art, transfer among different types of application programs may be accomplished using the cut and paste operations described with reference to FIGS. 2a–2d on a variety of architectural platforms using the intermediate storage buffer known as the clipboard. Other types of information such as graphical information, numeric information, or other types of information may be transferred in this manner.

Upon viewing FIGS. 1a–1d and 2a–2d, it is apparent that there is a dichotomy between the two techniques. Users become used to the manipulation of files in the manner which is illustrated with reference to FIGS. 1a–1d, however, the user must learn the use of a second tool known as the "Edit" pull-down menu illustrated as 230 in FIGS. 2a–2d in order to perform manipulation of information between windows and/or application programs and/or files. Thus, there is a need for improved manipulations of various types of data, especially between application programs than techniques which exist in the prior art.

SUMMARY AND OBJECTS OF THE INVENTION

One of the objects of the present invention is to provide an improved method and apparatus for manipulating information in a computer system.

Another of the objects of the present invention is to provide a consistent user interface for manipulation of information between and within application programs and within an operating system.

Another of the objects of the present invention is to provide an improved means for providing feedback to a user of manipulation of information in a computer system.

Another of the objects of the present invention is to provide an architecture for direct manipulation of data to and from application programs and files in a file system.

These and other objects of the present invention are provided for by a method and apparatus for manipulating data between application programs. A user may select an item in a first window under control of a first process which specifies formats in which data from the selected first item may be provided. The user drags the selected item to a second window, wherein the second window is under control of a second process. The user deselects the selected item while the item is located at the second window, and the second process determines if the second process can perform a primary action based upon a first format of the first item and, if so, then receives data from the first process in the first format and performs the primary action using the first format. The action may include a plurality of actions including such system services as printing, sending electronic mail, or other actions which may be performed in a computer system. The method further comprises alternative actions and action selection mechanisms which are activated by a user selecting various activation means in the computer-controlled display system. The selection means may include a list of plurality of actions which can be performed by the second process using the formats from the first process. The user may select one of the desired actions from the plurality of actions, and the process performs the desired action. Any number of a plurality of actions may be selected from based upon the format of the first item provided by the first process. Such actions are known as "verbs" in the preferred embodiment.

Other features, advantages, and novel aspects of the present invention will become apparent from the detailed description which follows below.

BRIEF DESCRIPTION OF DRAWINGS

The present invention is illustrated by way of example and not limitation in the figures of the accompanying in which like references indicate like elements and in which.

DETAILED DESCRIPTION

A process and apparatus for an improved manipulation of data and user feedback in a computer-controlled display system is described. In the following description, specific steps, procedures, command options, command items, and other specifics are set forth in order to provide a thorough understanding of the present invention. However, it will be apparent to one skilled in the art that the present invention may be practiced without these specific details. In other instances, well-known systems and methods are shown in diagrammatic, block or flow diagram form in order to not unnecessarily obscure the present invention.

System of the Preferred Embodiment

Figure 1A:
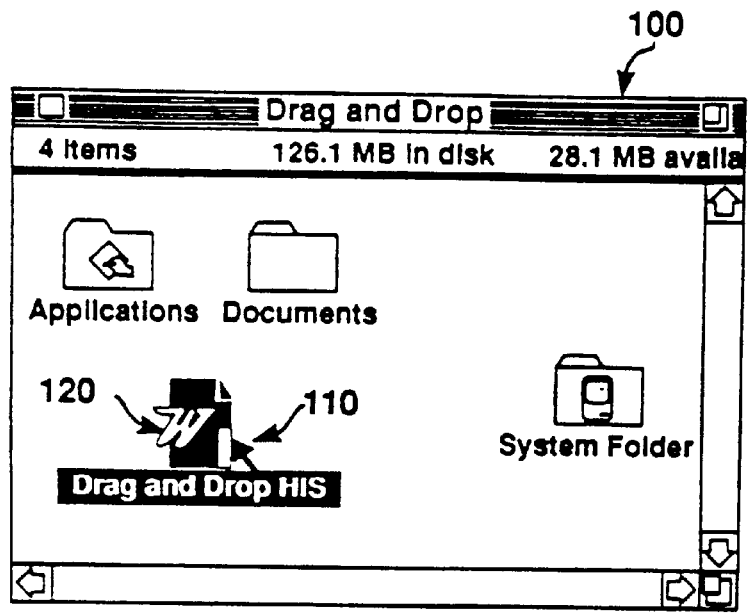
FIGS. 1a–1d show a prior art method for selecting an icon representing a file and moving it to a second location using a graphical user interface.
Figure 1B:
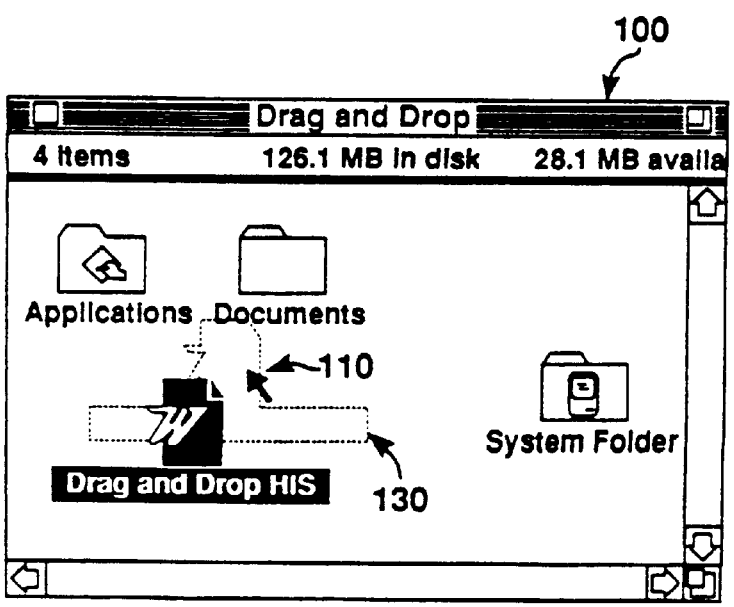
Figure 1C:
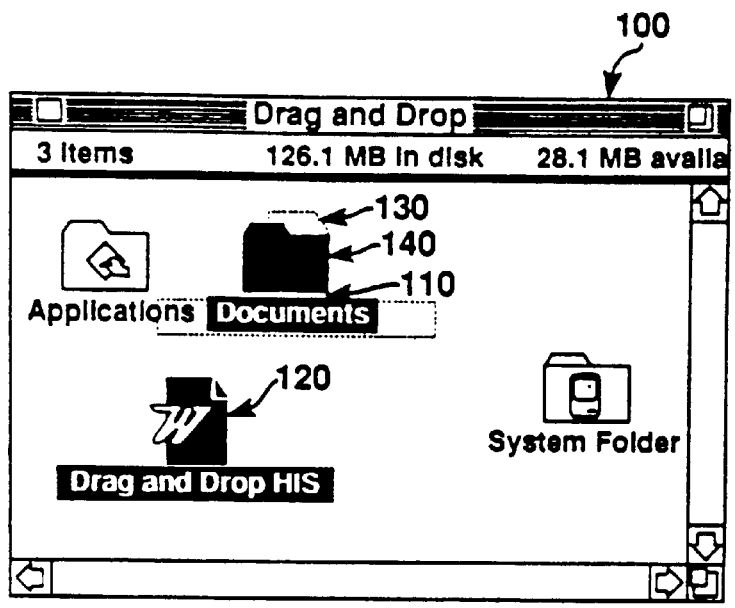
Figure 1D:
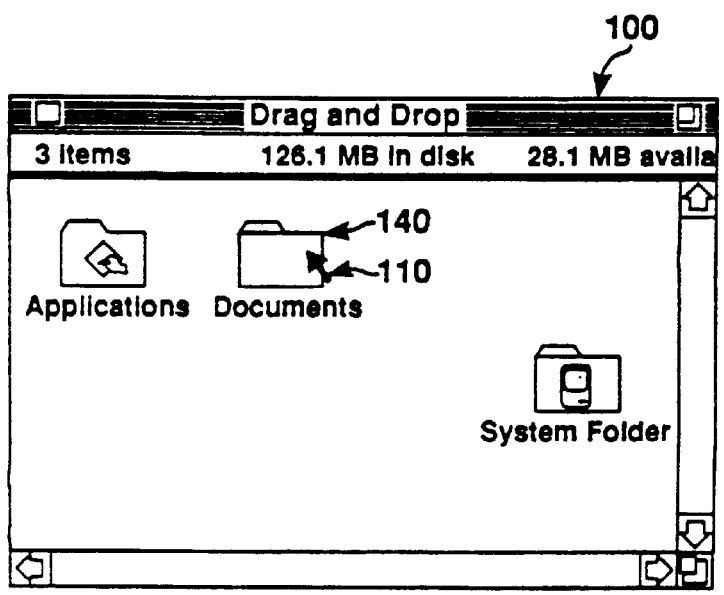
Figure 2A:
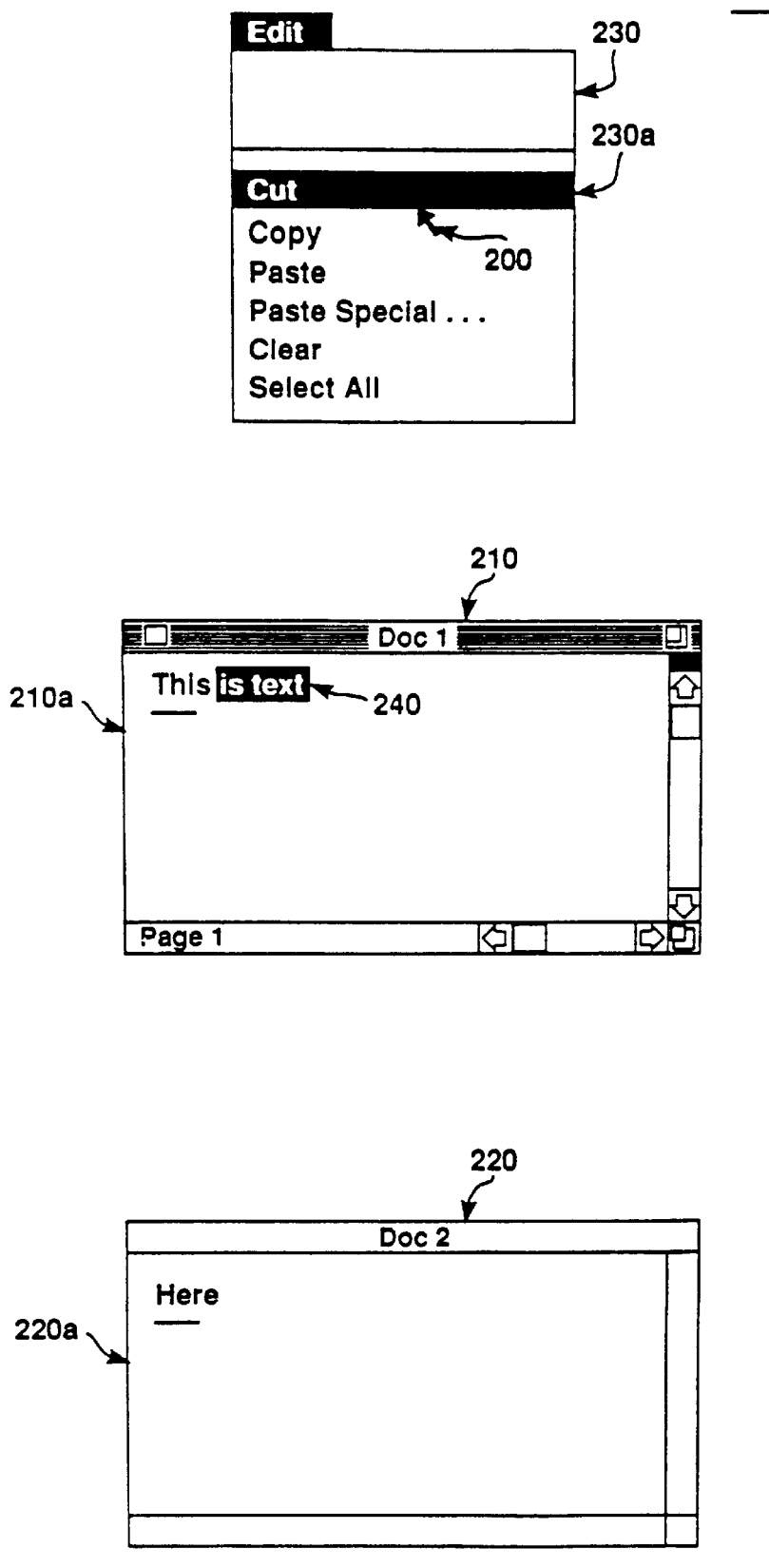
FIGS. 2a–2d show a prior art method of copying text from a first file on a user interface display to a second file on the user interface display.
Figure 2B:
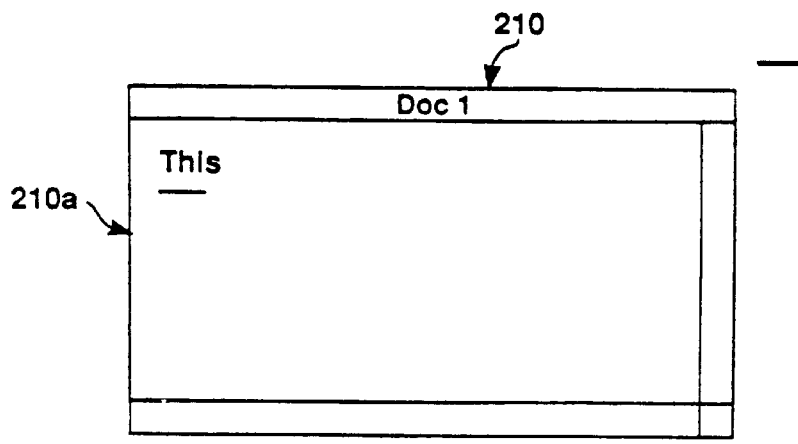
Figure 2B:
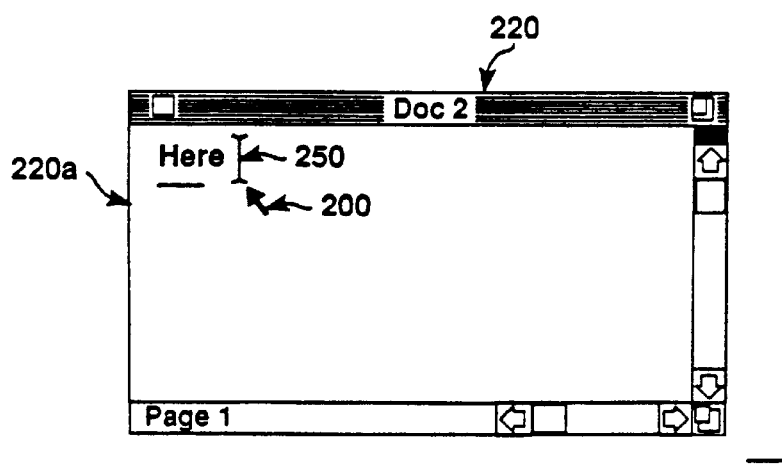
Figure 2C:
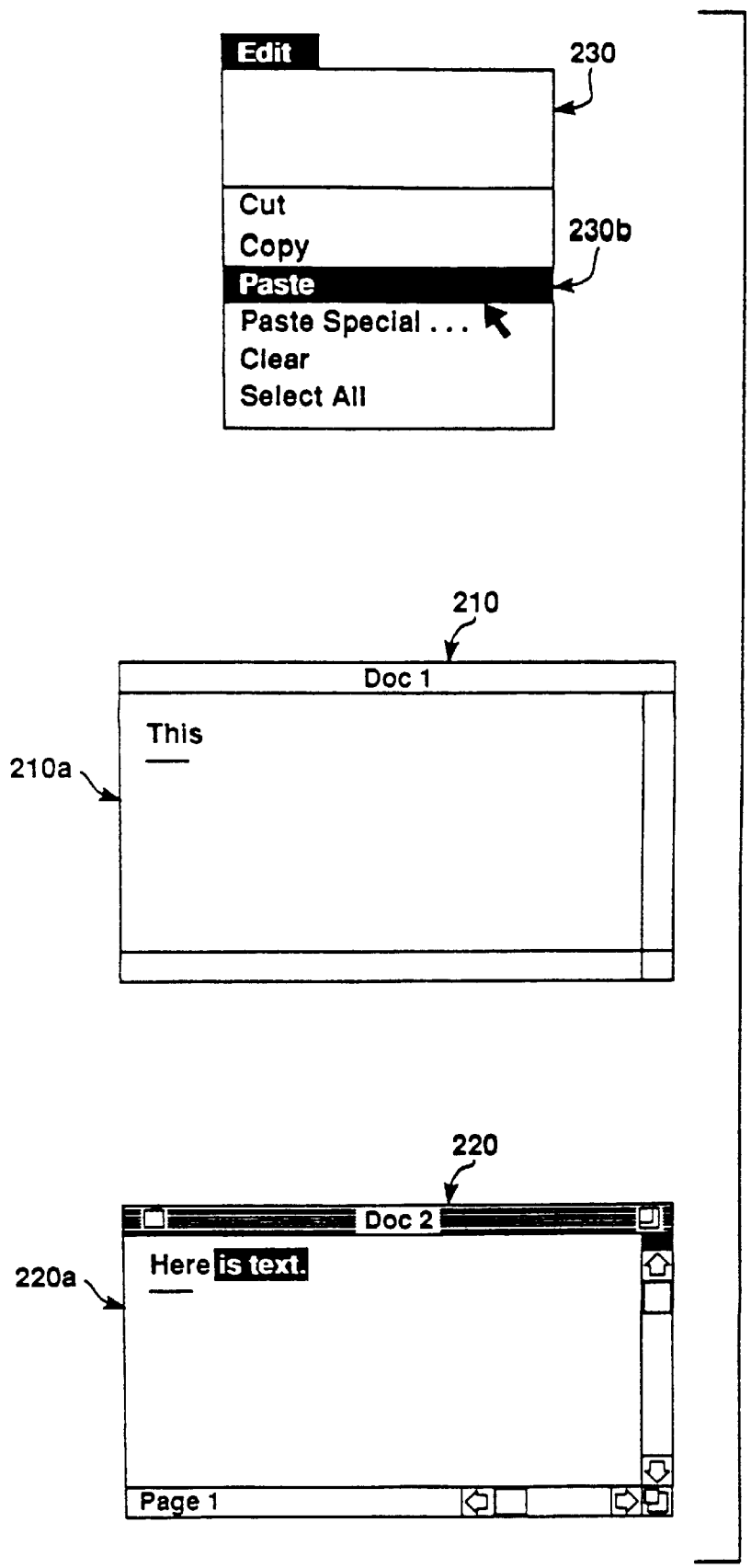
Figure 2D:
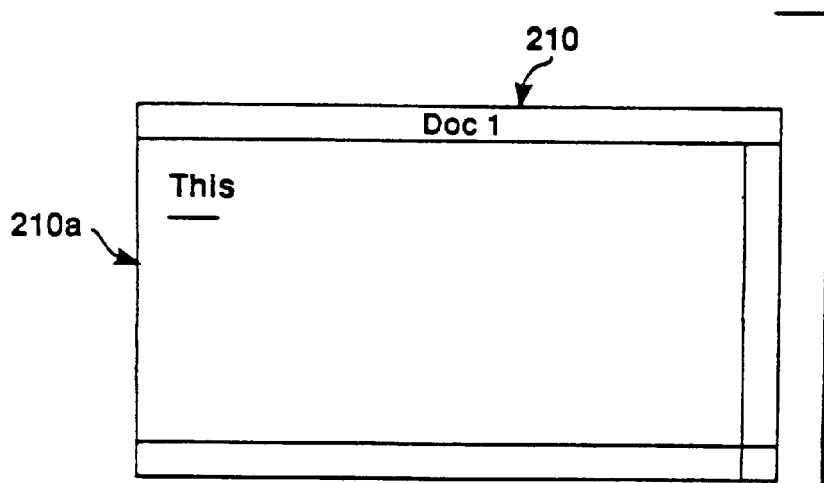
Figure 2D:
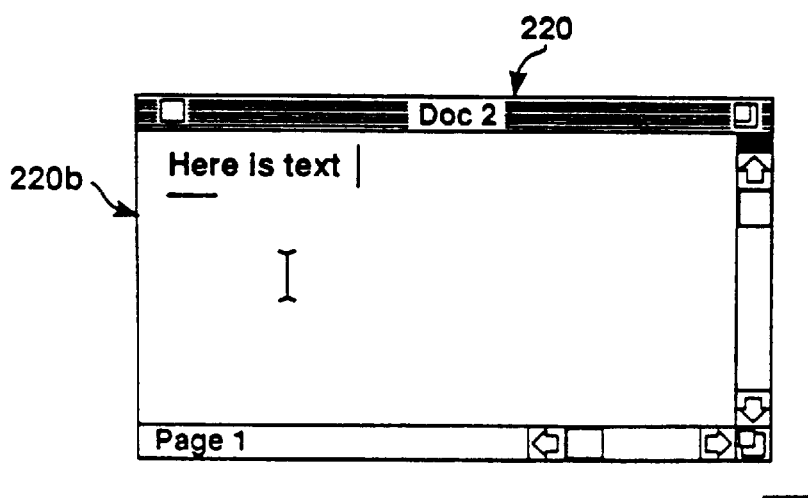
Figure 3:
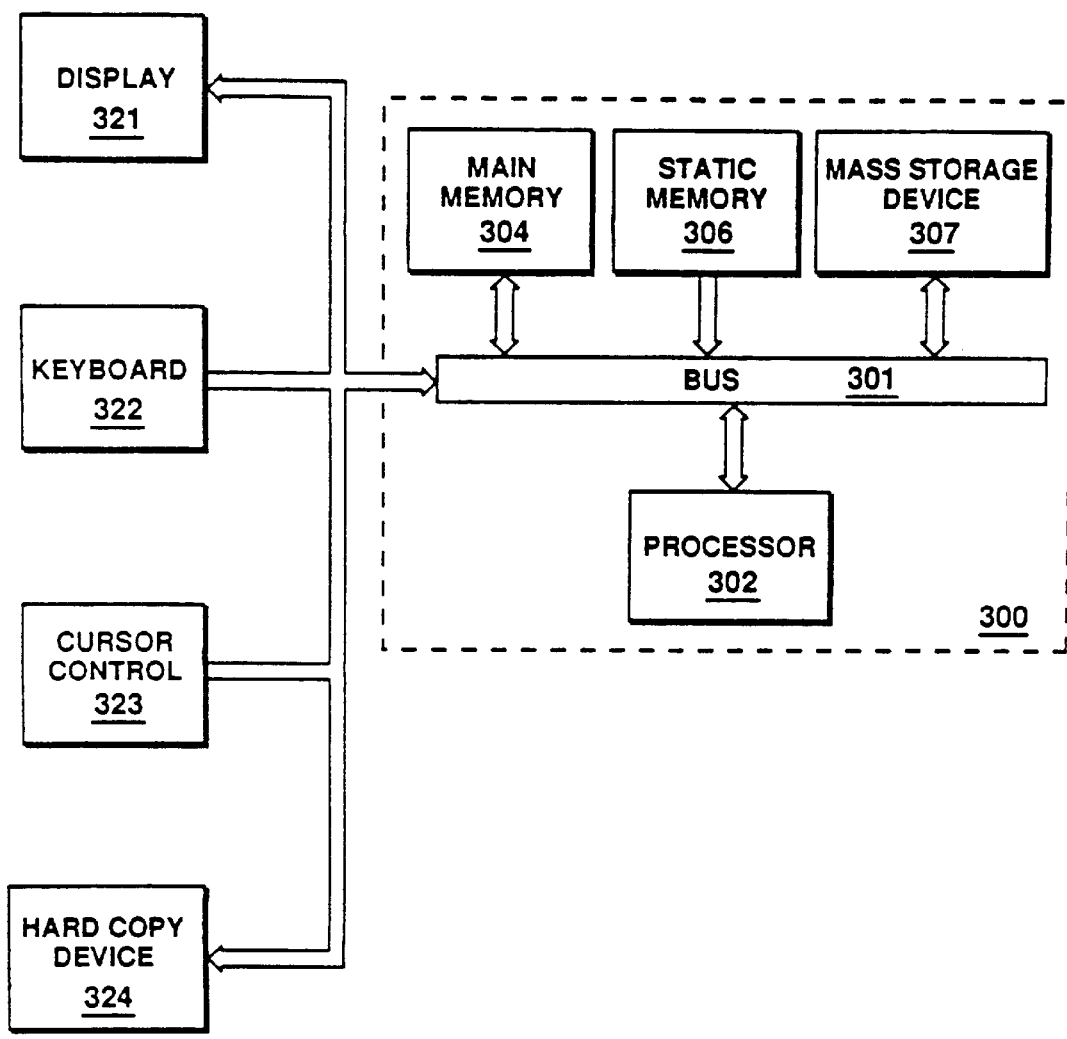
FIG. 3 shows a block diagram of a computer system upon which the methods and apparatus of the preferred embodiment may be implemented.

Referring to FIG. 3, the computer system upon which a preferred embodiment of the present invention is implemented is shown as 300. 300 comprises a bus or other communication means 301 for communicating information, and a processing means 302 coupled with bus 301 for processing information. System 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions. Computer system 300 may further be coupled to a display device 321, such as a cathode ray tube (CRT) or liquid crystal display (LCD) coupled to bus 301 for displaying information to a computer user. An alphanumeric input device 322, including alphanumeric and other keys, may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321. Another device which may be coupled to bus 301 is hard copy device 324 which may be used for printing instructions, data, or other information on a medium such as paper, film, or similar types of media. Note, also, that any or all of the components of system 300 and associated hardware may be used in a preferred embodiment, however, it can be appreciated that any type of configuration of the system may be used for various purposes as the user requires.

In the preferred embodiment, computer system 300 is one of the Macintosh® family of personal computers such as the Macintosh® Quadram or Macintosh® Performal™ brand personal computers manufactured by Apple® Computer, Inc. of Cupertino, Calif. (Apple, Macintosh, Quadra, and Performa are trademarks of Apple Computer, Inc.). Processor 302 is one of the 68000 family of microprocessors, such as the 68030 or 68040 manufactured by Motorola, Inc. of Schaumburg, Ill.

Note that the following discussion of the methods and apparatus of the preferred embodiment discussed herein will refer specifically to a series of routines which are compiled, linked, and then run as object code in computer system 300 during run-time. It can be appreciated by one skilled in the art, however, that the foregoing methods and apparatus may be implemented in special purpose hardware devices, such as discrete logic devices, large scale integrated circuits (LSI's), application-specific integrated circuits (ASIC's), or other specialized hardware. The description here has equal application to other apparatus having similar function.

User Interface of the Preferred Embodiment

Before discussing the preferred embodiment in detail, a brief overview of the user interface used in this system is required. A "windowing" or graphical user interface (GUI) operating environment is used wherein selections are performed using a cursor control device such as 323 shown in FIG. 3. Typically, an item is "selected" on a computer system display such as 321 using cursor control device 323 by positioning a cursor, or other indicator, on the screen over (or in proximity to) an object on the screen and by depressing a "selection" button which is typically mounted on or near the cursor control device. The object on the screen is often an icon which has an associated file or operation which the user desires to use in some manner. In order to launch a user application program, in some circumstances, the user merely selects an area on a computer display represented as an icon by "double clicking" the area on the screen. A "double click" selection is an operation comprising, while positioning the cursor over the desired object (e.g., an icon), two rapid activations of the selection device by the user. "Pull-down" or "pop-up" menus are also used in the preferred embodiment. A pull-down or pop-up menu is a selection which is accessible by depressing the selection button when the cursor is pointing at a location on a screen such as a menu bar (typically at the top of the display), and "dragging" (moving cursor control device 323 while the selection button is depressed) until the selection the user wishes to access is reached on the pull-down menu. An item is indicated as being "selected" on a pull-down menu when the item is highlighted or displayed in "reverse video" (white text on a black background). The selection is performed by the user releasing the selection device when the selection he wishes to make is highlighted. Also, in some GUI's, as is described in the background above, the "selection" and "dragging" of items is provided to move files about in the file system or perform other system functions. These techniques include "dragging and dropping" which comprises making a "selection" of an icon at a first location, "dragging" that item across the display to a second location, and "dropping" (e.g., releasing the selection device) the item at the second location. This may cause the movement of a file to a subdirectory represented by the second location.

Note also that GUI's may incorporate other selection devices, such as a stylus or "pen" which may be interactive with a display. Thus, a user may "select" regions (e.g., an icon) of the GUI on the display by touching the stylus against the display. In this instance, such displays may be touch or light-sensitive to detect where and when the selection occurs. Such devices may thus detect screen position and the selection as a single operation instead of the "point (i.e., position) and click (e.g., depress button)," as in a system incorporating a mouse or trackball. Such a system may also lack a keyboard such as 322 wherein the input of text is provided via the stylus as a writing instrument (like a pen) and the user handwritten text is interpreted using handwriting recognition techniques. These types of systems may also benefit from the improved manipulation and user feedback described herein.

Overview of the Preferred Embodiment

The preferred embodiment is a series of enhanced methods and apparatus which allow direct manipulation of data to and from application programs in the operating and/or file management system. These methods and apparatus are implemented using a variety of novel approaches, including, but no limited to: improved user interface feedback for manipulation of information in the computer system; improved architectural functionality for transfer of control to and from various application programs, handlers, and other system services which service those application programs; improved activation and use of system services; combinations of immediate data transmission or deferral of time-intensive techniques such as data translation and/or data communication until such time as required to minimize interaction delays and increase performance of the manipulation actions; and the creation of files representing discrete portions of files for later use. For the remainder of this application, in the preferred embodiment, the improved user functionality and user feedback is provided via a system toolbox routine known as the Drag Manager.

The Drag Manager provides capabilities for various application programs which have interapplication dragging capability to identify the formats of data that they are capable of providing information in. These data types will be known, for the remainder of this application, as "flavors."

Interaction Model of the Preferred Embodiment

Figure 4:
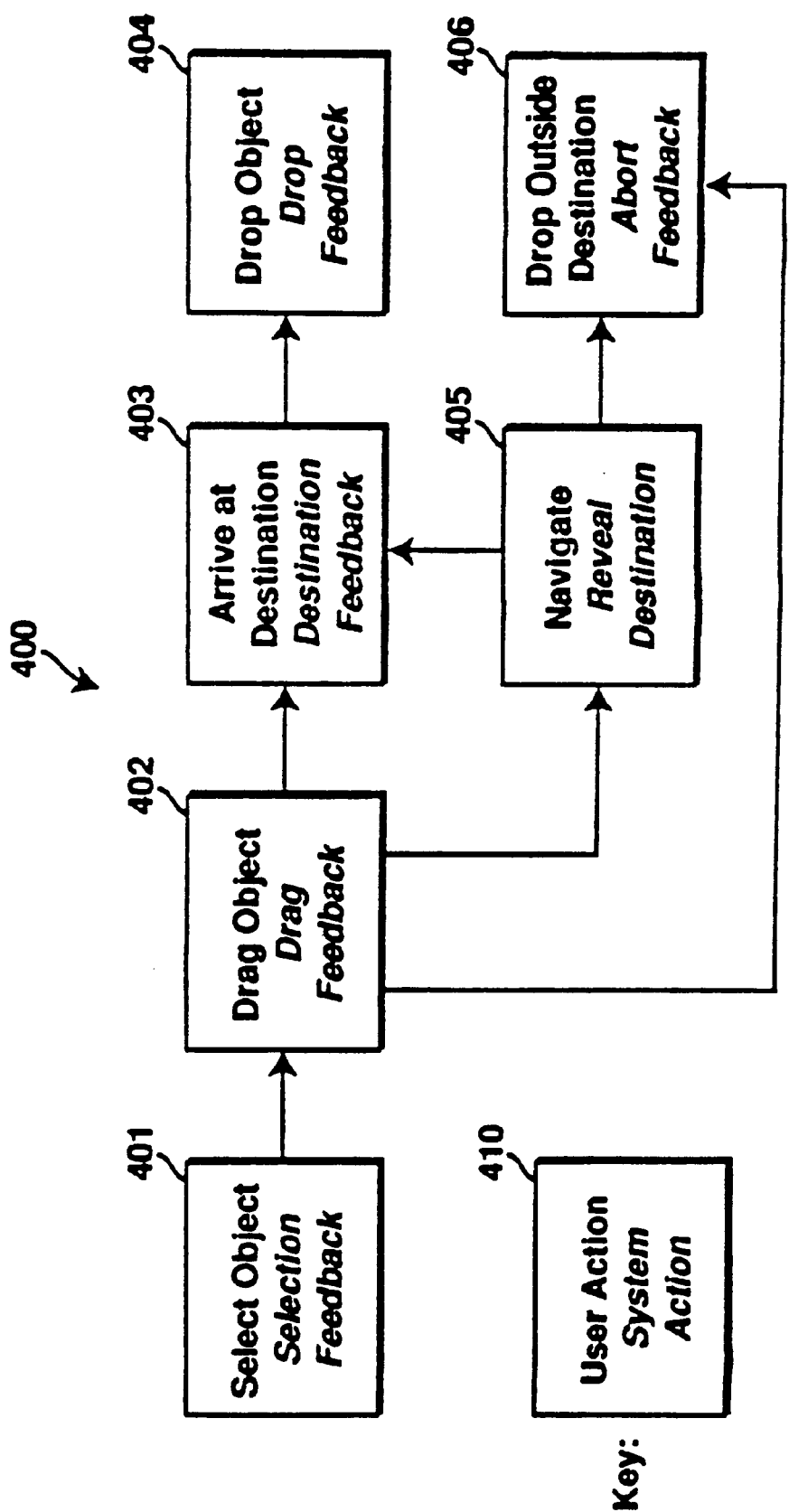
FIG. 4 shows the interaction model used by the preferred embodiment to provide various user interface feedback during drag-and-drop operations.

The improved user interface used by the preferred embodiment may be easily described with reference to the interaction model of FIG. 4. The interaction model has modified and broadened the use of techniques, such as "dragging and dropping," to provide certain inventive and useful advantages. The interaction model comprises several features which have a richer set of data items and destinations which may be used for selecting and manipulating (e.g., "dragging and dropping") in the user interface of system 300. The interaction model has several components such as the selection of an object, which is illustrated as 401, which provides certain selection feedback displayed upon display 321 to a user operating system 300 which has an improved appearance. Furthermore, when a "drag" occurs (a selection which is being moved on the display), the preferred embodiment comprises new methods for illustrating to a user that the dragging operation is occurring, as is illustrated by block 402. While the drag is being performed, improved navigation techniques are provided, as is illustrated by block 405, which provides improved methods of displaying various information during the movement operation on the user interface display, such as movement within windows, etc. Once the destination is arrived at by the user at the end of the drag operation (for example, indicated by deactivating the selection signal), then there are improved user interface objects, illustrated as block 403, which provides improved destination feedback, such as whether a container can receive an object. This model also provides certain feedback to the user when destination is reached, and the operation is completed successfully when a "drop" occurs (drop feedback block 404), or the destination is either invalid or incapable receiving the information by showing improved abort feedback (block 406). All of the objects are under control of user actions and system actions, as is illustrated by block 410.

For the remainder of this application, the manipulation of information in the manner discussed below will be known as "drag-and-drop sequences," and these techniques encompass a wide variety of user interface actions to perform system services or other actions in the computer system.

Up until now, drag-and-drop sequences that span windows have been limited to objects characterized as containers. For example, documents are containers of content, and these documents could be dragged only across folder windows (e.g., directories), disk windows (icons representing media devices), and the main display of the operating system known as the "Finder." Also, dragging content itself (e.g., graphics) has been limited to certain types in a single window. For example, objects in a graphics application program can be dragged to another position in the same window, but cannot be dragged to another controlled by the same application program. The preferred embodiment makes it easier to eliminate these limitations; ideally, users should be able to drag any content from any window to any other window that accepts the content's type. This new capability leads to a generalization of the interaction model, where "objects" and "destinations" take on broader meanings.

Another extension to the prior art drag-and-drop sequence is the ability to navigate while dragging, as shown in the interaction model above. This navigation includes opening windows, scrolling, finding, and window hierarchy changes.

Interapplication Dragging

Figure 5A:
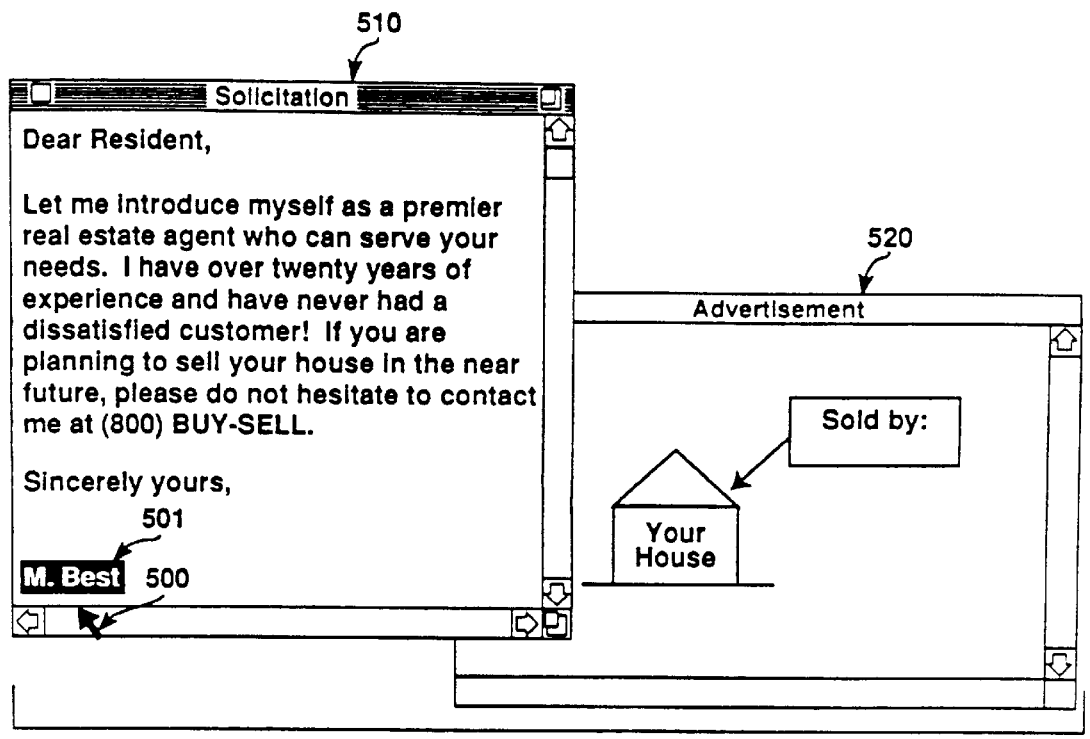
FIGS. 5a–5d show an operation which may be implemented for selecting text from a first application program and dropping it in a second application program containing graphic data.

The preferred embodiment provides for one interapplication dragging of data. That is, users are not limited to selecting and dragging information within a single application program but may select and drag this information across application boundaries to windows control by different application programs. This is accomplished, in the preferred embodiment, with all necessary translation of information (if required) being transparent to the user and deferral of time-intensive tasks, such as data communication and translating, until actually requested by the receiver. A detailed implementation of this interface will be discussed in more detail below, however, one example is illustrated with reference to FIGS. 5a–5d. For example, as illustrated in FIG. 5a, two windows may be present on the display screen, such as 510 and 520. 510 may be a window under control of a word processing program, and window 520 may be under control of a second program such as a computer graphics program. As is illustrated in FIG. 5a, the user, using the pointing device (e.g., 323) to control cursor 500 on user interface display 321, may select a region such as 501 in window 510 which he wishes to move or copy to a second document window 520, such as that handled by graphics program. Using well-known techniques, the user selects text region 501 (e.g., blocks out a region of text and selects the blocked regions) and starts to move the text across the window boundary. This is illustrated at FIG. 5b.

Figure 5B:
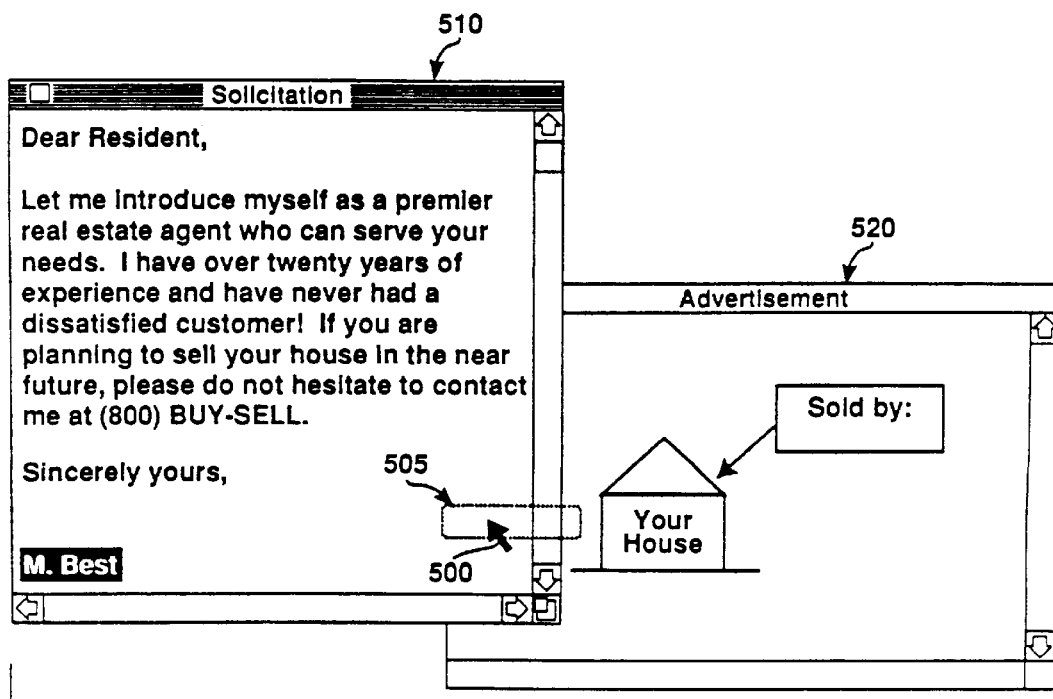
Figure 5C:
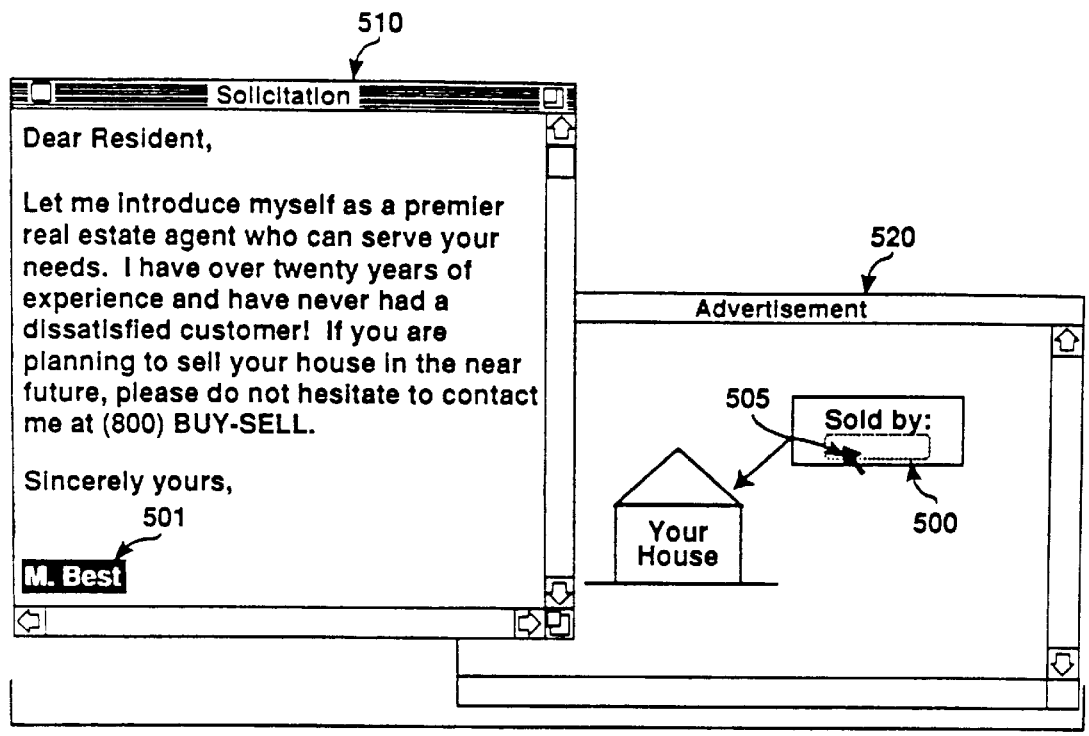
Figure 5D:
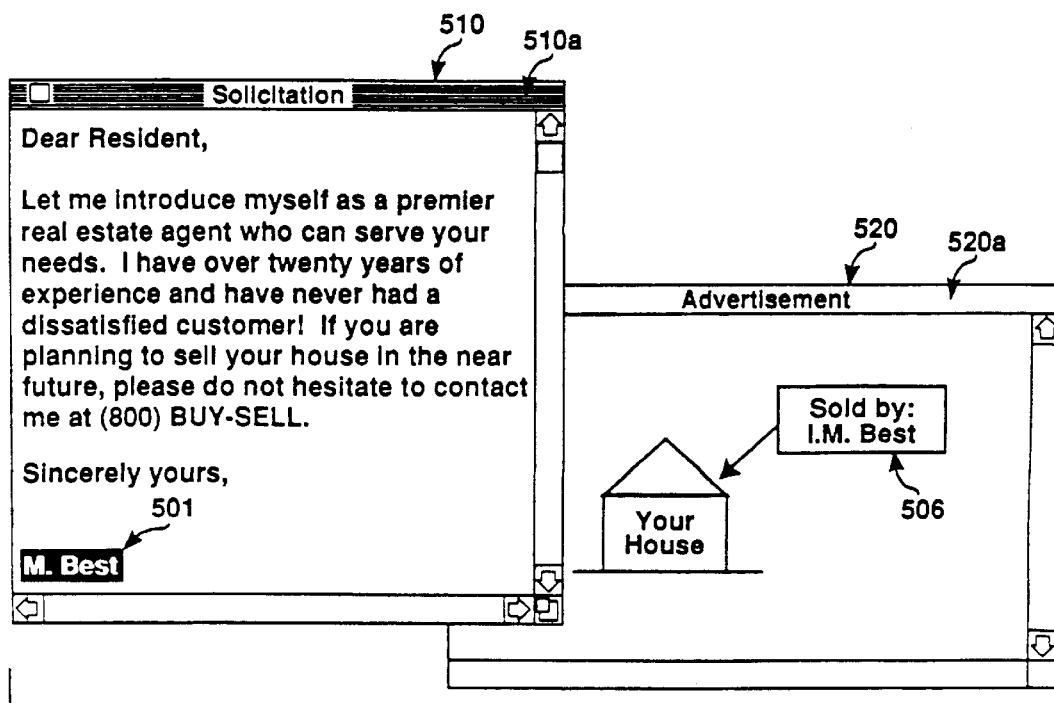

Note that once movement of selected information 501 takes place, the selection changes to an outline representation of a rectangular box having the shape of the blocked text 501 shown as 505 shown in FIG. 5b. Then, the user arrives at the destination in window 520 to complete the drag of the selected information 505 from window 510 to 520, as illustrated in FIG. 5c. Upon reaching the location in window 520, the selection device is deactivated (e.g., the mouse button is released), and the text or other information which was present in window 510 is now copied in region 506 in window 520 as illustrated in FIG. 5d. Another interesting behavior to note from viewing FIGS. 5a–5d is that the "background" application program which is in control of window 520 never becomes activated. This is illustrated by its title bar 520a remaining in its inactive representation (e.g., the clear representation), whereas the front window 510's title bar 510a remains in the "active" state. In prior art drag-and-drop operations, the destination window becomes the front-most window upon the detection of a selection within the window, and it tends to obscure the other window (s) shown on the display. Moreover, the preferred embodiment does not activate the inactive application program (e.g., controlling window 520), but instead, allows the hierarchy of windows which was originally displayed, such as illustrated in FIG. 5a, to remain the same. In this way, the original appearance of the display is not modified in any way, unless the user desires, and drag-and-drop operations do not cause unintended and distracting changes to the windows on the display.

Figure 6A:
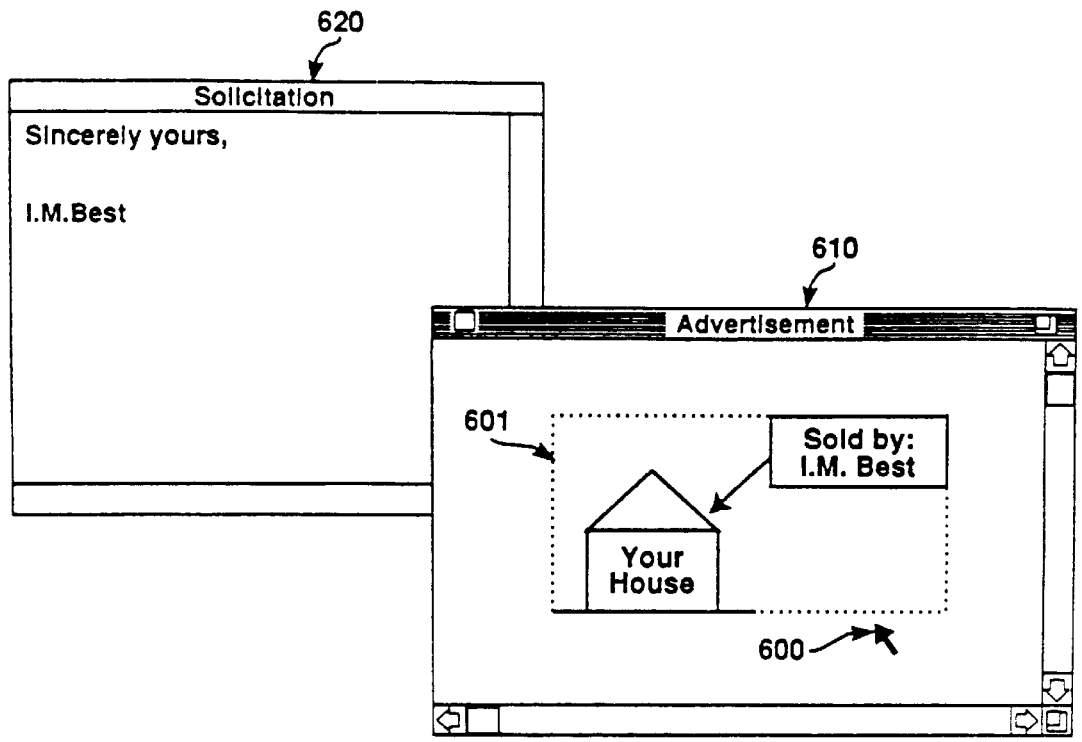
FIGS. 6a–6c show a sequence of steps which may be used on a graphical user interface for dragging graphic data from a first user interface window to a second window containing text.
Figure 6B:
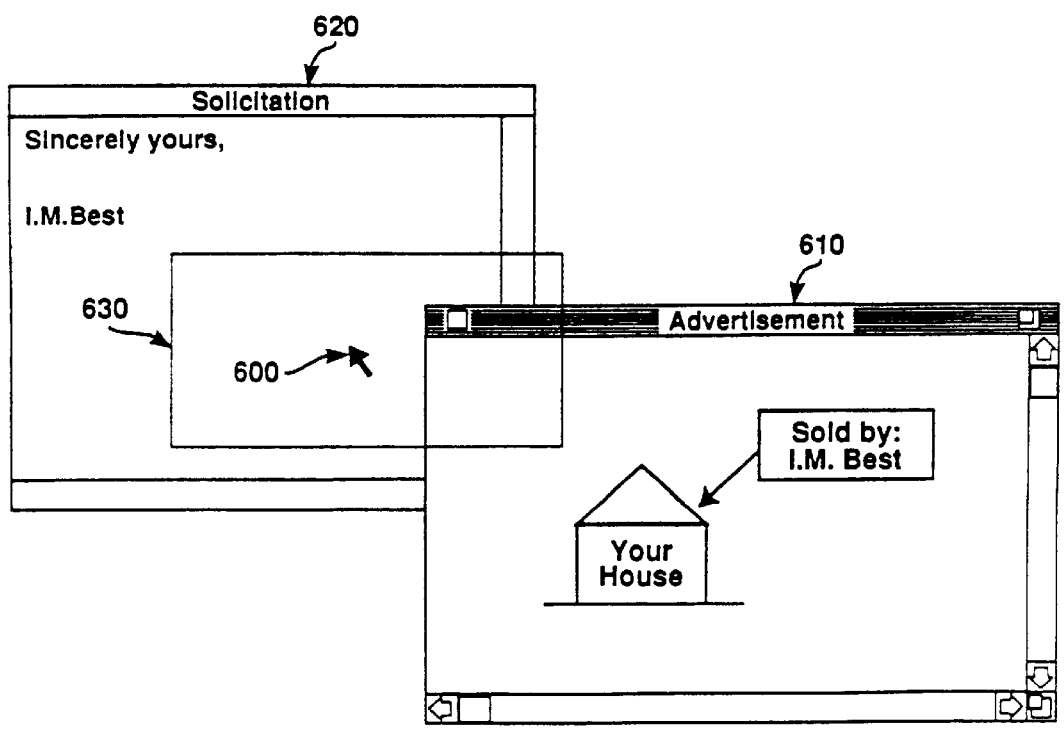
Figure 6C:
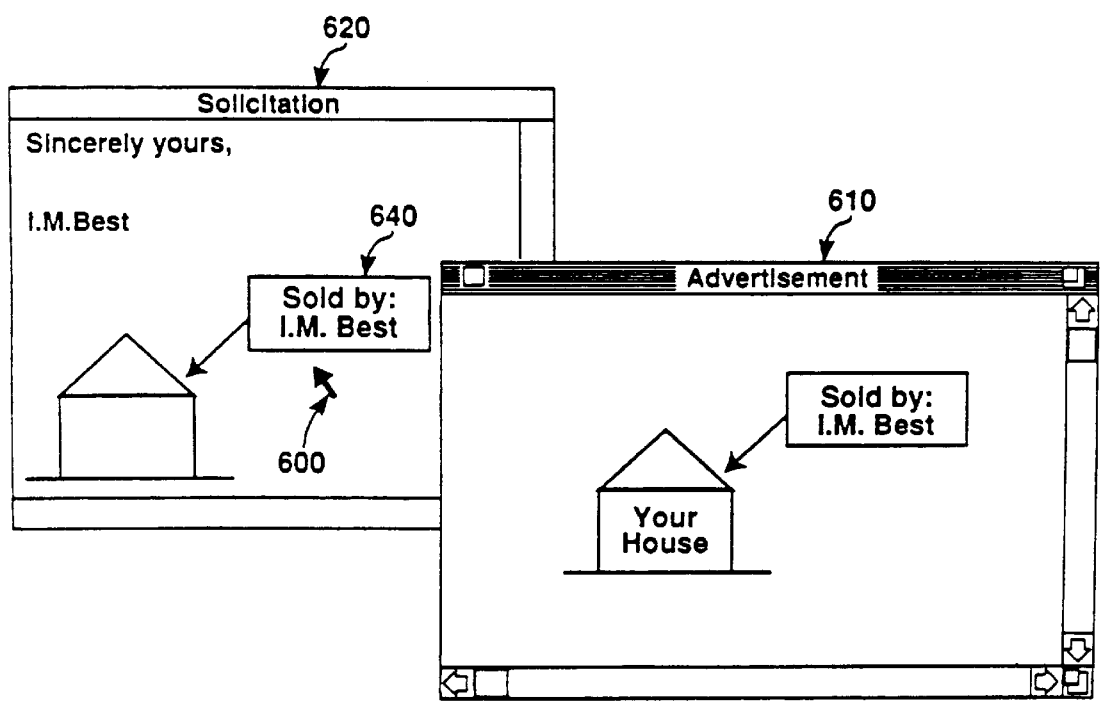

Other types of data such as graphics may also be moved in a similar manner. This is illustrated with reference to FIGS. 6a–6c. First, using the cursor control device 323 to control cursor 600, the user selects the graphic data to be moved. Graphic data may be selected using well-known selection techniques (e.g., by drawing a bounding box), such as illustrated as 601 in FIG. 6a. Of course, if the object is a discrete graphical object, such as used in object-oriented drawing programs (e.g., the MacDraw brand drawing program available from Claris Corporation of Santa Clara, Calif.), the selection may comprise a single selection of graphical objects 601 instead of the bouding box method. Then, the drag commences, as illustrated in FIG. 6b, wherein outline box 630 of graphics 601 will be displayed during the drag. Once the user reaches the desired drop location with cursor 600 and deactivates the selection device, as illustrated in FIG. 6c, graphic data 640 is copied to window 620. It will be apparent from the remainder of this specification that the capability to drag and drop different types of information is provided only if the sending and receiving applications have a common format in which data can be transmitted. If there is no common format in which the data can be transmitted (e.g., text, graphics, sound, or other types of data), then abort feedback on the user interface display will be provided from the destination or receiver application program window. It will be apparent from the remainder of this specification, however, that a wide variety of data types will be provided for insertion into different application programs. In addition, other data types are available through the use of a system service called the Translation Manager. Sending applications specify a list of formats in which the data is or may be provided, and the Translation Manager appends to that list a list of formats that it can translate the data into. If the receiving application program cannot use any of the data types specified by either the sending application program or the Translation Manager, then abort feedback is provided on the user display to indicate to the user that the drag-and-drop operation was not successful. These operations will be discussed in more detail below.

Figure 7A:
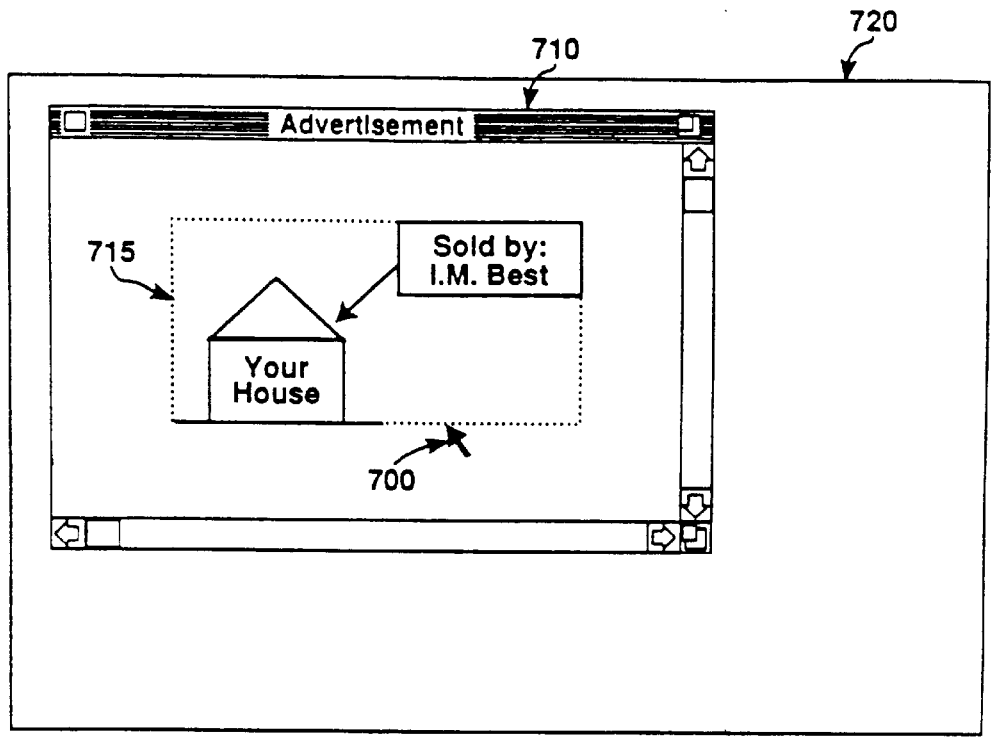
FIGS. 7a–7d show a method for selecting an item within a user interface window and dragging and dropping that item into a window controlled by the file system to create a file representative of the item selected.
Figure 7B:
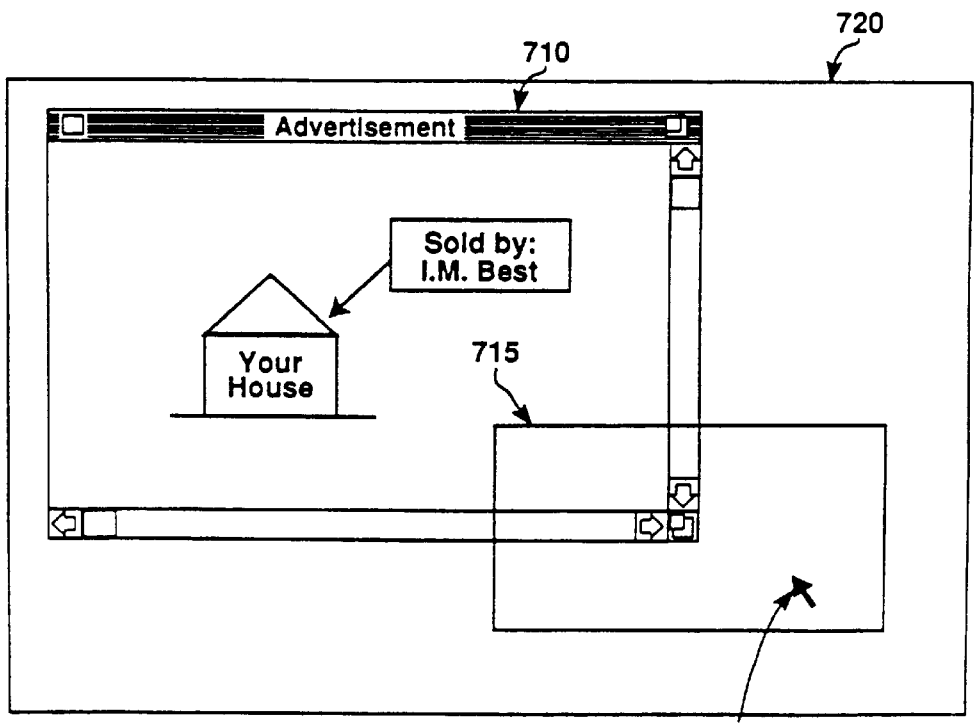
Figure 7C:
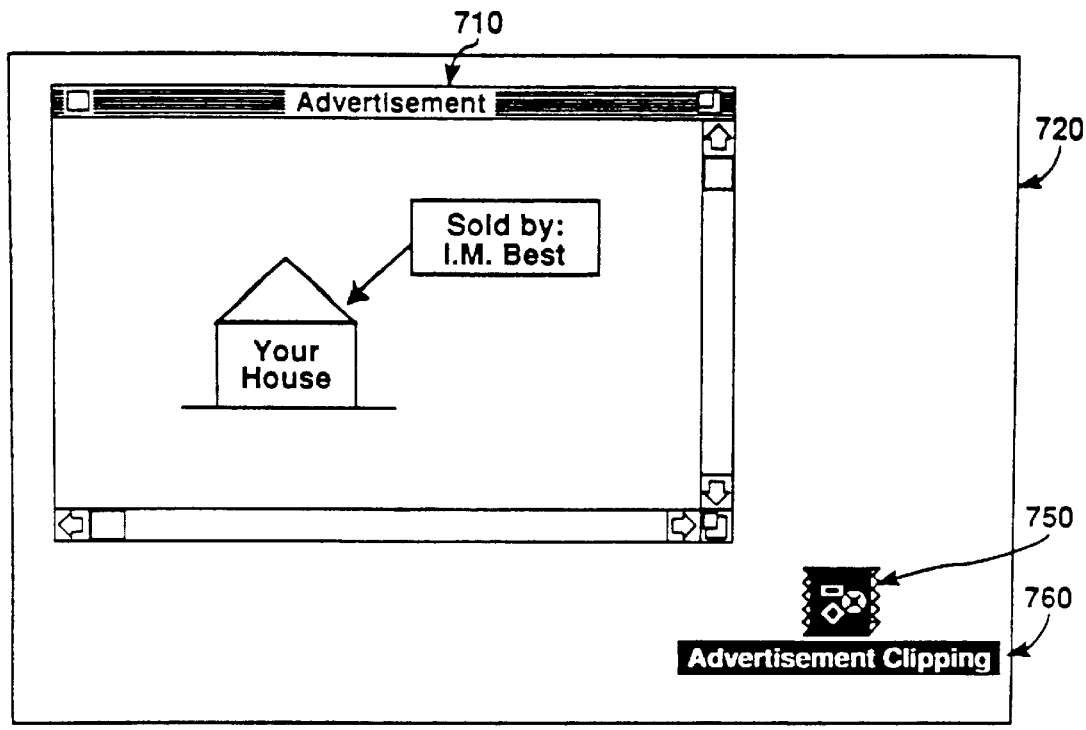

Another feature which the Drag Manager provides for is the creation and use of "clippings." This is illustrated and described with reference to FIGS. 7a–7c. The user selects, using cursor 700, a region in a first application program's window 710 which he desires to drag and drop to a second location. Upon activation of the selection device, the area is highlighted, such as 715 shown in FIG. 7a, and the user may move the selected region which the selection device is activated to any region on the computer system display. In the example shown in FIG. 7b, the dragged region 715 is dragged to the "desktop" illustrated as 720 in FIGS. 7a–7c. In the preferred embodiment, desktop 720 is the main directory of the user's mass storage device 307 in the Macintosh® brand computer system, however, it may be any file system window, such as a subdirectory or "folder." Like the example shown in FIGS. 5a–5d and 6a–6c, desktop 720 is under control of a second application program, known as the "Finder," which is the main operating system in the Macintosh® brand computer system. Thus, FIGS. 7a–7c illustrate interapplication dragging between an application program and the file system manager. Upon reaching a desired file location (e.g., desktop 720) at which a user wishes the data to reside, the user releases the selection device. Immediately thereafter, as illustrated in FIG. 7c, an icon 750 is created at the location of cursor 700 when the selection device was deactivated. The icon represents a file created in the file system which contains the data dragged from window 710. As will be discussed in more detail below, a file is created by the File System Manager which may be subsequently accessed by the user for insertion into files under control of other application programs. This type of icon 750 represents a "clipping" which is a file containing the selected data dragged out of the application program window.

The clipping represented by icon 750 contains all file information which would normally be associated with the data if the data had been stored as an ordinary file. However, the creator in the Macintosh® brand system of the clipping is the Finder instead of the application program from which the data originated. Therefore, the selection of the icon-representing the clipping will call a modeless window to be displayed which allows the user to view the data, however, not modify the data in any way instead of launching the application program. The creation of clippings in the manner discussed with reference to FIGS. 7a–7c provides distinct advantages over the prior art cut-and-paste buffer described with reference to FIGS. 2a–2d. Clippings are stored as normal files in the hierarchical filing system (HFS) and are not retained in an intermediate memory storage location, such as the clipboard buffer normally used for cut and paste operations. Because the clipboard is stored in main memory, it is volatile and is not retained by the computer between user sessions. Moreover, the prior art clipboard buffer generally only contains a single item, and thus an item in the clipboard may be overwritten by another item. A user may desire to select a large number of items to be retained for later use in other application programs or later sessions, and the clipboard buffer is inadequate for this purpose. Because a clipping is stored in the computer system's mass media device (e.g., 307 of FIG. 3), it may be retained and used at a later date. In addition, the creation of a clipping does not cause another clipping having a different filing name in the computer system to be overwritten. A large number of clippings may be retained by the user in the preferred embodiment for use at a later time. Clippings have many advantages over the prior art cut and paste operations and clipboard buffer which are in use in the prior art.

In addition to the creation of a file in the file system containing the dragged data, an icon 750 is stored representing the type of data stored within the clipping. Certain default icons are used in the preferred embodiment for representing text, graphic data, sound, video, etc. Also, clippings have associated with them a default name, such as 760 illustrated in FIG. 7c, which may be a standard name supplied by the application program or a system-assigned name using some standard convention. The name supplied by the application program may identify the application program where the clipping originated (e.g., for a word processing program, the clipping may be entitled "Word Clipping 1").

Figure 7D:
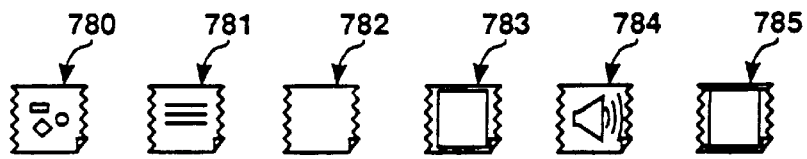

For example, the icons illustrated as 780–785 in FIG. 7d may be used for representing different types of clippings in the file system. For example, icons 780, 781, 784, and 785 are used as default icons for representing graphics, text, sound, and animation data in the preferred embodiment. Icon 782 may be used as a default icon to represent any data type which the system does not recognize.

One unique aspect of the preferred embodiment's implementation of clippings is the use of a "proxy" icon. This is an icon which is supplied by the application program and may fill in the dark area illustrated in icon 783 of FIG. 7d. If a proxy has been supplied by the application program, than the proxy icon is used instead of the default icons 780–782 or 784 and 785. This proxy may be representative of the data, such as miniature representation of text or graphics selected, a standard icon used by the application program, or other representation. This allows the user to easily identify the data at a later time by simply viewing the icon. This provides improved interaction and identification of clippings, in addition to the name chosen for the clipping, as discussed above. The proxy icon may be generated based upon the data or some default icon which the application provides, as is familiar to those skilled in the art. The methods and apparatus for creating a clipping, associating an icon with the clipping, and the naming of a clipping are all discussed in more detail below.

Background Selection

Figure 8A:
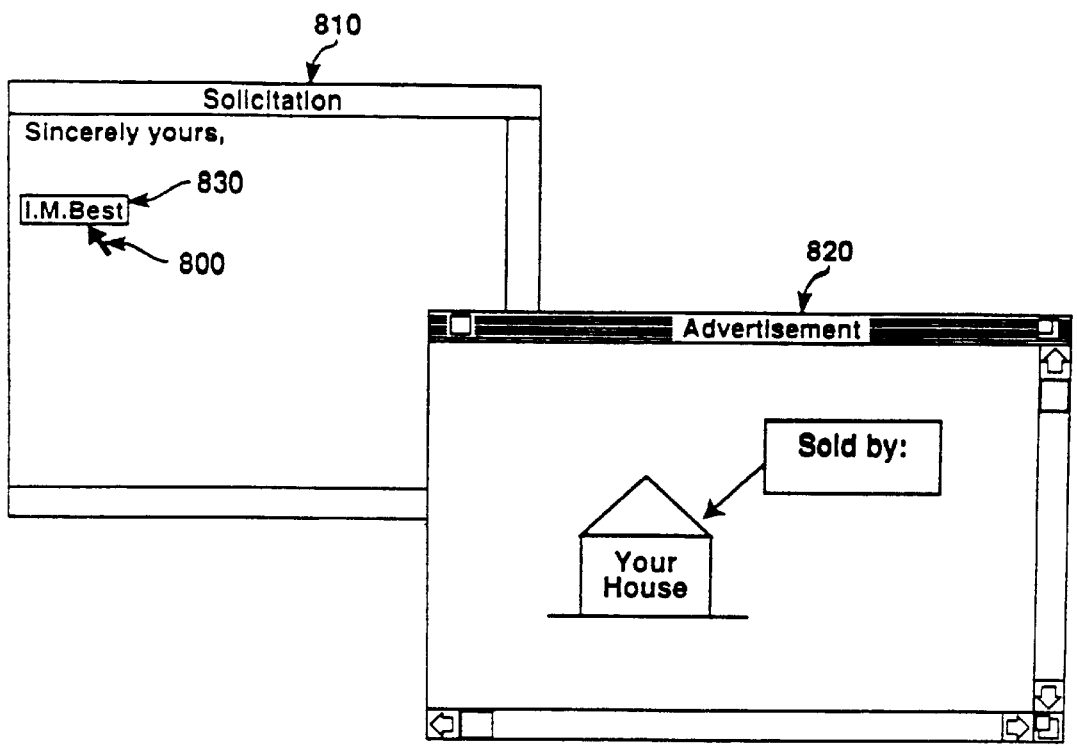
FIGS. 8a–8d illustrate an example of background selection used in the user interface of the preferred embodiment.
Figure 8B:
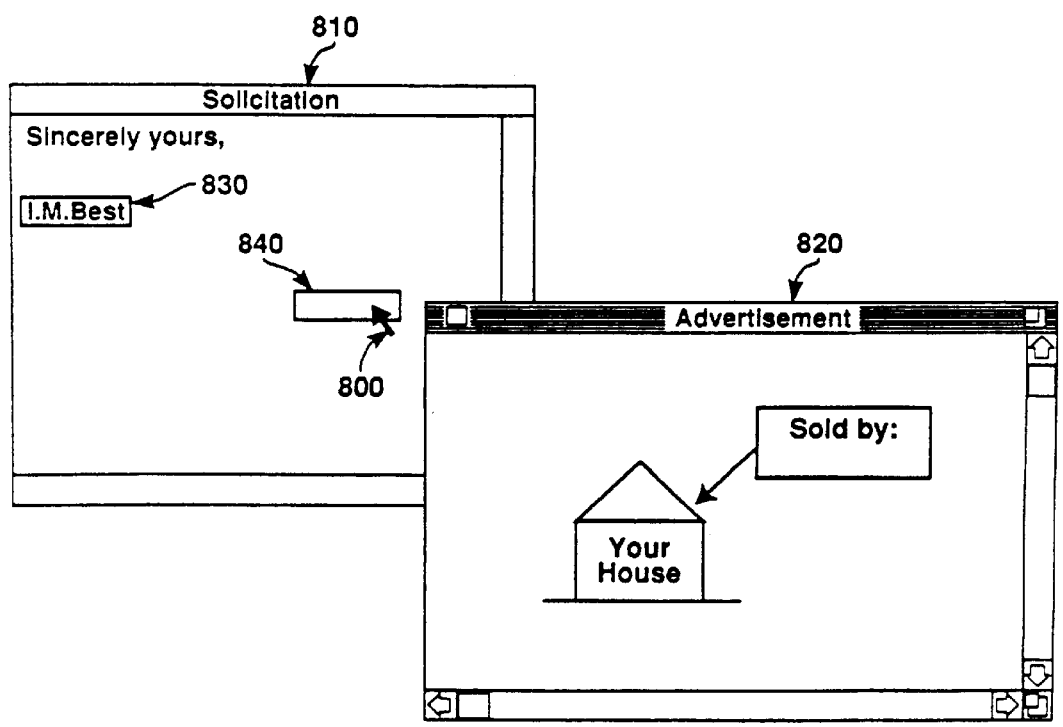
Figure 8C:
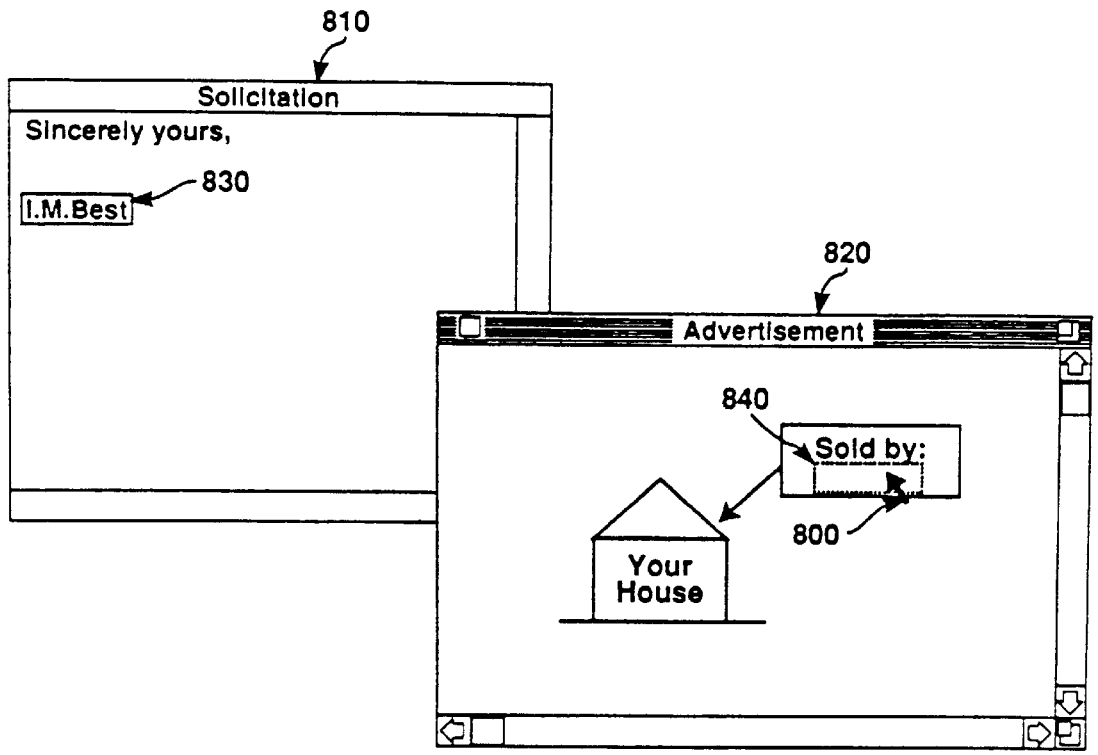
Figure 8D:
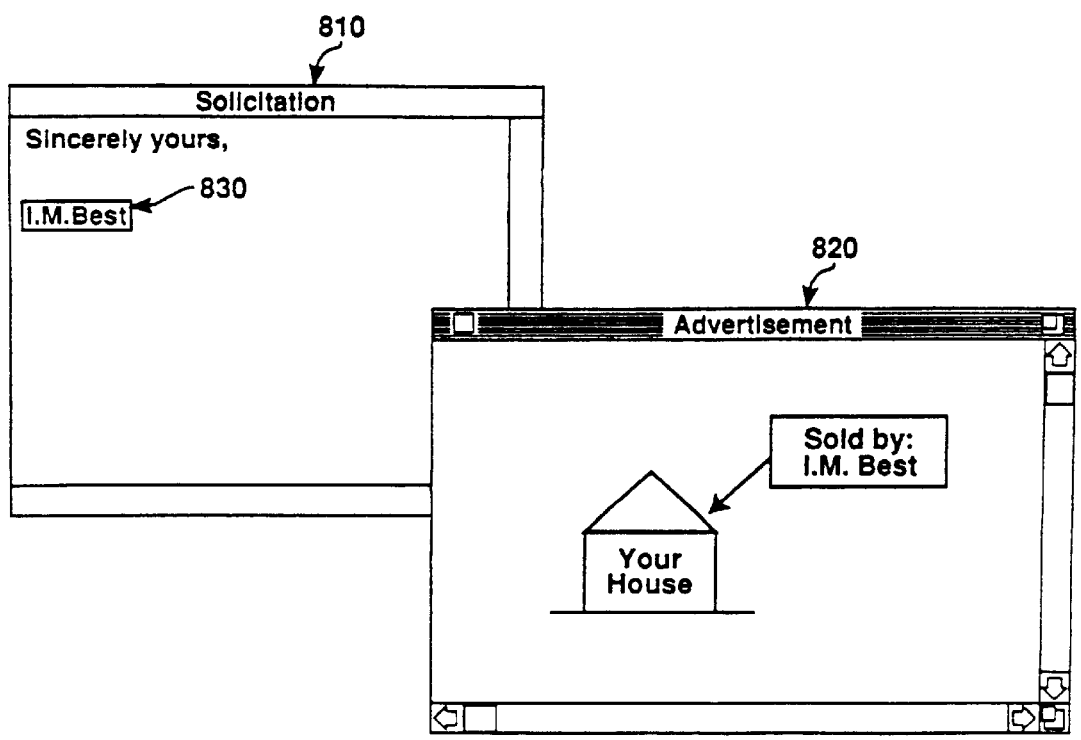

Yet another aspect of the behavior of the preferred embodiment is that of background selection. In the Macintosh® brand operating system, when a selection is made in a window, the window becomes that active window and is brought to the front so the user may perform various actions within the window. In the preferred embodiment, when a selection has been made in a window controlled by an application which becomes inactive (e.g., its window goes to the "back"), the selection changes to a different representation in order to provide improved control and display of that information. This is illustrated with reference to FIGS. 8a–8d. For example, the user may be operating in one window, such as 810, and select some information. The user may then select a second window 820 to bring that window to the front. 830 was previously selected information in a similar manner as illustrated as 501 in FIG. 5a. Upon selecting window 820 to bring it to the foreground, 830 changes to an outline box representation as is illustrated in FIG. 8a. Then, the user may select the information and drag the selected information to a second window. The select-and-drag operation of the background window will be performed without bringing the source window (e.g., 810) of the drag to the foreground. A typical background select-and-drag operation is performed as illustrated in FIGS. 8a–8d. As the first step, the user selects, using cursor 800, selected item 830, as is illustrated in FIG. 8a. Then, as is illustrated in FIG. 8b, using cursor control device 323, the user drags cursor 800 towards window 820, as is illustrated in FIG. 8b. Again, as in the other drag-and-drop operations, the selection of region 830 is displayed as an outline box. A second outline box 840 provides user feedback to illustrate the information being moved to the second window. As illustrated in FIG. 8c, box 840 may be moved into the second window 820, such as that controlled by a second active application program. As illustrated in FIG. 8d, the selection device may be described while cursor 800 is in window 820, and the original selected information 830 is copied to window 820. Note, in FIG. 8d, that region 830 is still maintained in its selected state even after completion of the drag-and-drop operation. This will allow the user to do similar drag-and-drop operations using background selection 830 for other windows on the display. As will be discussed below, all of the drag-and-drop operations are performed without activation of any of the background application(s), and as many background selection(s) as necessary may be maintained on the user interface display.

Invocation of System Services

Figure 9A:
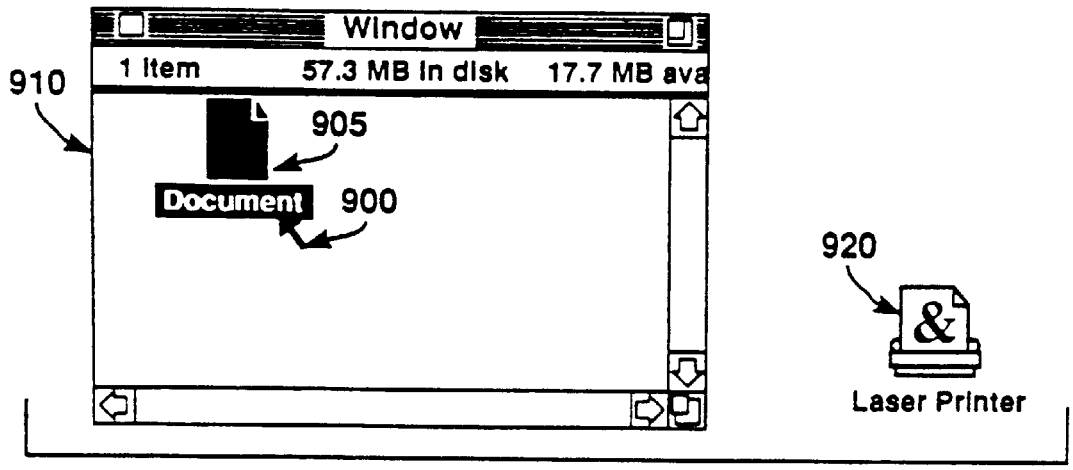
FIGS. 9a–9d illustrate a method for performing a system service using the graphical user interface of the preferred embodiment.
Figure 9B:
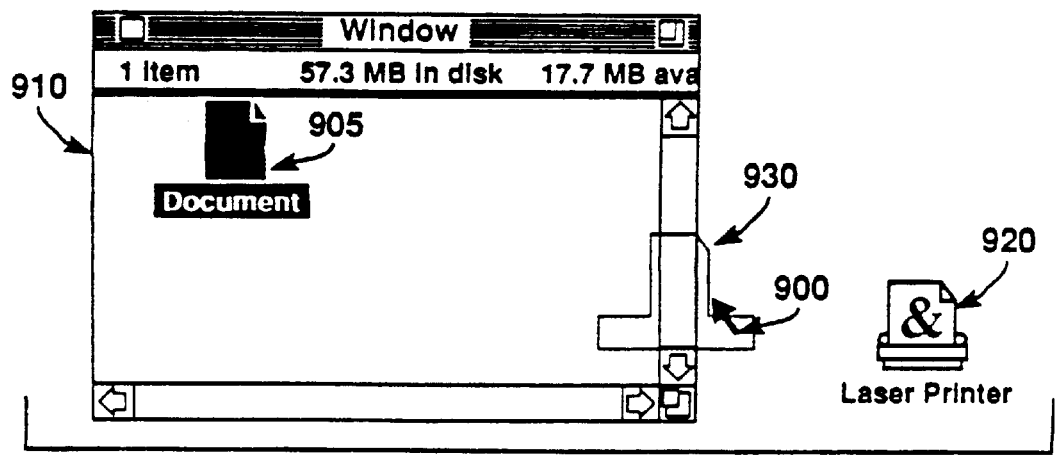
Figure 9C:
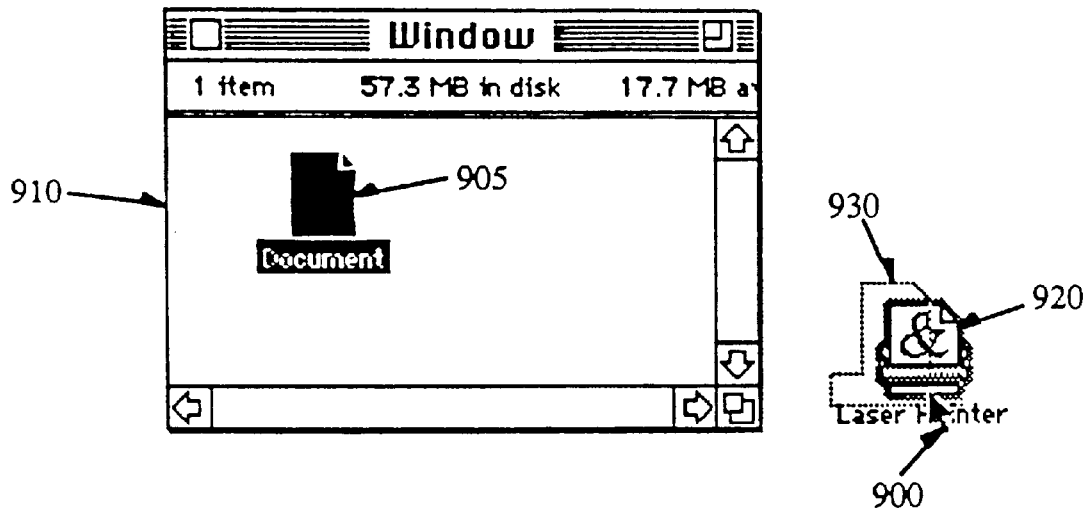
Figure 9D:
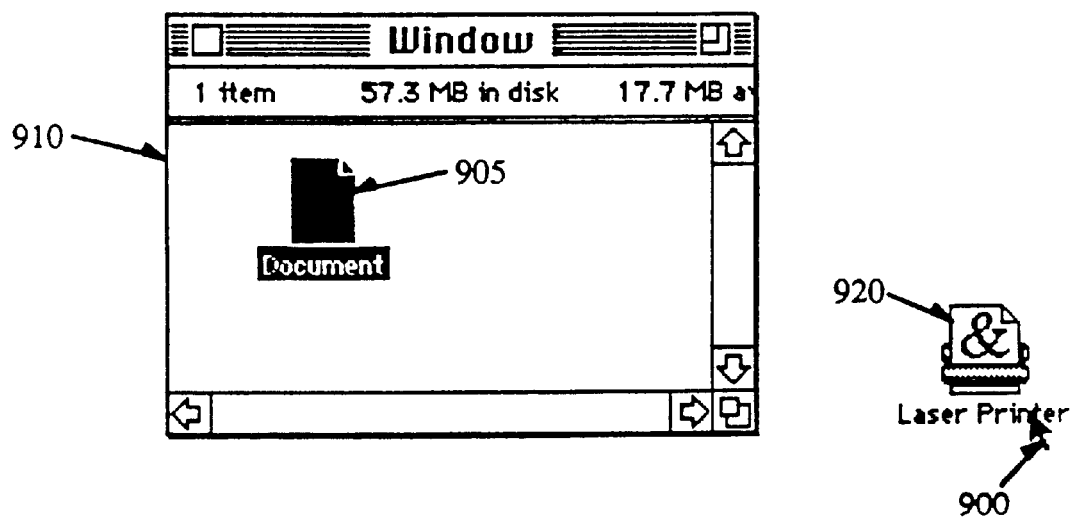

Another feature provided by the preferred embodiment is the invocation of certain system services through the use of drag-and-drop operations. Thus, as discussed above, in the preferred embodiment, the drag-and-drop operations need not be performed wherein destinations represent "containers," but rather, destinations include system services wherein the drop operation indicates the performance of that system service. This is illustrated with reference to FIGS. 9a–9d. The user may be viewing a particular window, such as 910 as illustrated in FIG. 9a. To print the document represented by icon 905 in FIG. 9a, the user would select, by pointing cursor 900 at icon 905, icon 905 using the selection device. Then, while icon 905 is selected, the user drags, and the icon is represented in its outline representation 930 shown in FIG. 9b. The dragged box 930 may be to an icon representing a system service, such as illustrated by Laser Printer icon 920. At FIG. 9c, cursor 900 resides over icon 920 which indicates that the user desires to print the document represented by icon 905. As illustrated in FIG. 9d, the user releases the selection device while the cursor is over Laser Printer icon 920 thus causing a process, such as a background printing system service, to retrieve the document represented by icon 905 and cause it to be printed. In this manner, system services may be accessed using select, drag, and drop operations. The system service, such as that controlling the laser printer as illustrated by icon 920, determines whether the type of data represented by icon 905 is such that can be used by the system service (e.g., printed), and if so, then data is retrieved from the file, and the file has the action performed upon it. In this instance, the file would be retrieved and sent to the print queue for printing by the user's computer system. Other system services may be accessed in an analogous manner, such as the sending of electronic mail messages. This action may be performed by selecting a file containing a message and dropping it into an icon representing a mail service, for example, an icon which looks like a mailbox. Other analogous types of operations may be performed using the drag-and-drop operations discussed herein, and certain routines will be discussed in more detail below.

Feedback During Navigation of Drag Operations

Feedback during the navigation of drag operations will be discussed with reference to FIGS. 10a–13b. For representing icons during drag operations, including multiple icons which are selected, two alternatives are shown with reference to FIGS. 10a and 10b. For example, with reference to FIG. 10a, items represented as icons in a window such as 1000 (e.g., 1001–1005) are represented as single-pixel outlines, each having the shape of the original icon and single-pixel outlines of the name for each icon shown as 1011–1015.

Figure 10A:
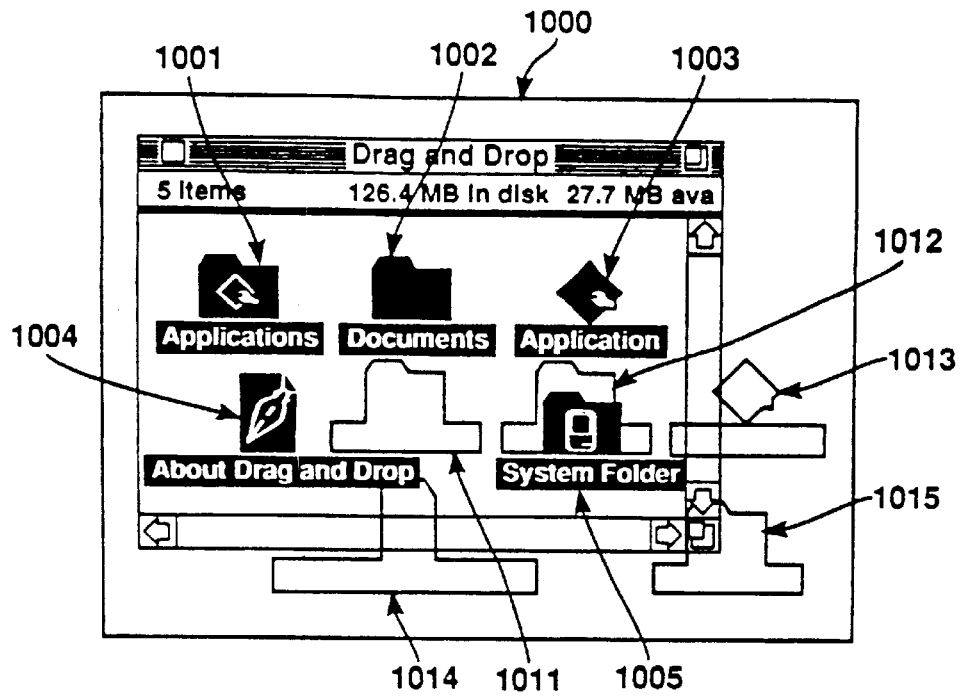
FIGS. 10a–11 illustrate the appearance on a display of a graphical user interface while selecting and dragging multiple objects.
Figure 10B:
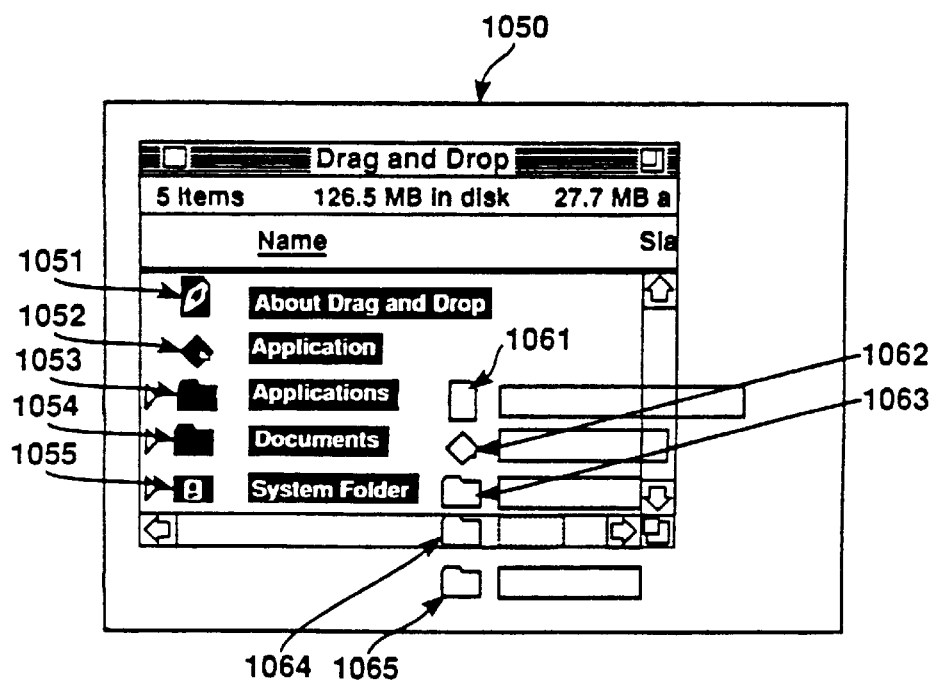

Similarly, as is illustrated in FIG. 10b, icons which are selected and dragged, such as 1051–1055 in window 1050, are represented with single-pixel outlines of the icon and the name associated with each icon are represented as single-pixel outlines, such as 1061–1065. Note that, in either of the examples of FIGS. 10a or 10b, the icons and the representative single-pixel outlines are represented using arbitrary shapes or the icons and are not represented using rectangular or other simple outlines as performed in certain prior art systems. Thus, improved feedback is given to the user during dragging. Note that the arbitrary shape of the single-pixel outline and the single-pixel outline of the name is done for one or many icons, depending on the number selected by the user.

Figure 11:
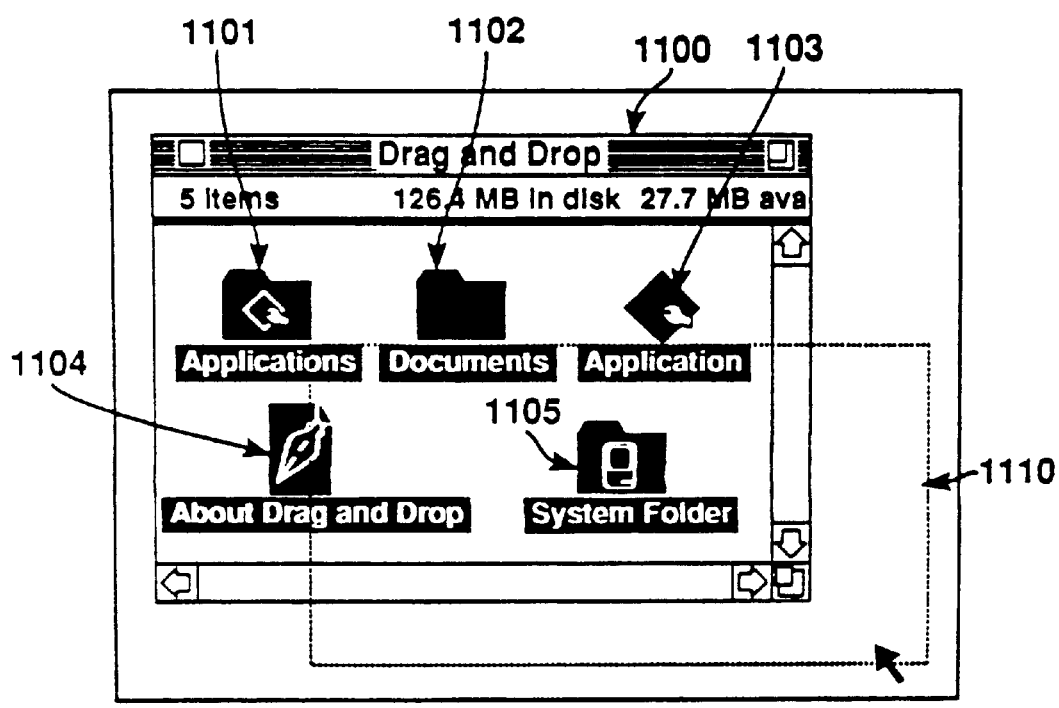

An alternative representation of multiple selections is shown in FIG. 11. In this instance, if a large number of items, such as icons 1101–1105, are selected in a window such as 1100, then a single rectangular single-pixel outline, such as 1110, may be shown. In any event, this provides feedback to the user that a large amount of information is being selected and dragged to a second location.

Figure 12:
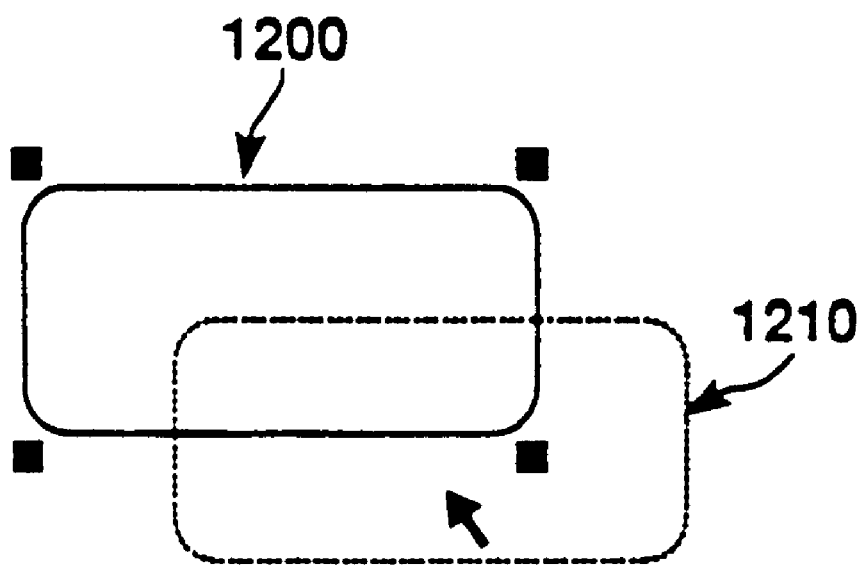
FIGS. 12–13b show examples of selection feedback which may be provided for a graphical object using the user interface of the preferred embodiment.
Figure 13A:
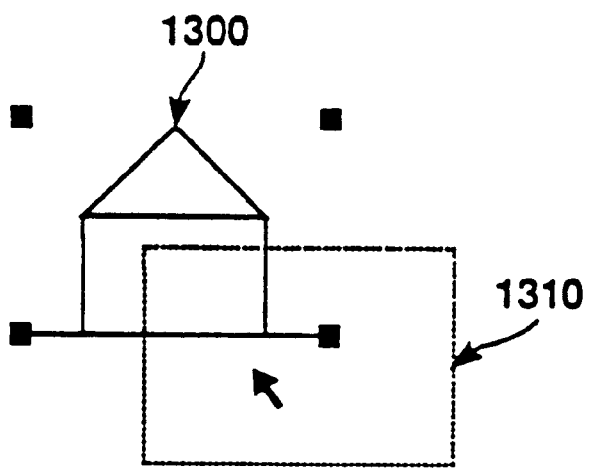
Figure 13B:
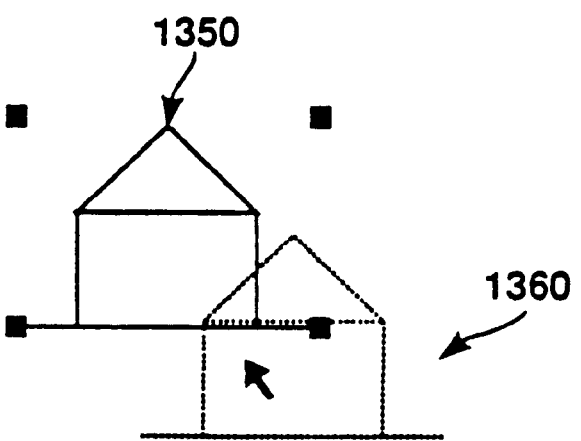

Graphic data, in contrast to an icon, is represented using either the shape of the graphic (which may an arbitrary shape) or a rectangular region of similar size to the graphic itself. In either event, positive feedback is provided to the user that graphic data is being selected and dragged. For example, in one instance, the drag feedback of FIG. 12 is used. When a graphic object, such as 1200, is selected, then a shape (e.g., 1210) is displayed as the selection, an arbitrary shape representing the graphical object, to provide drag feedback. This is shown for simple objects. As is illustrated in FIGS. 13a and 13b, alternative methods of showing the selection of the graphics and the movement during the drag operation is illustrated. For example, for the graphic illustrated as 1300 in FIG. 13a, a rectangular shape 1310 may be used to represent the object during the drag. The rectangle is similar in size to the outer bounds of the object being dragged, however, there is no interior detail shown of the object during the drag. In contrast, as is illustrated in FIG. 13b, the outline of the object and certain interior details are illustrated in dotted outline form 1360 if graphic object 1350 is selected and dragged.

Drag Feedback for Text Objects

Figure 14A:
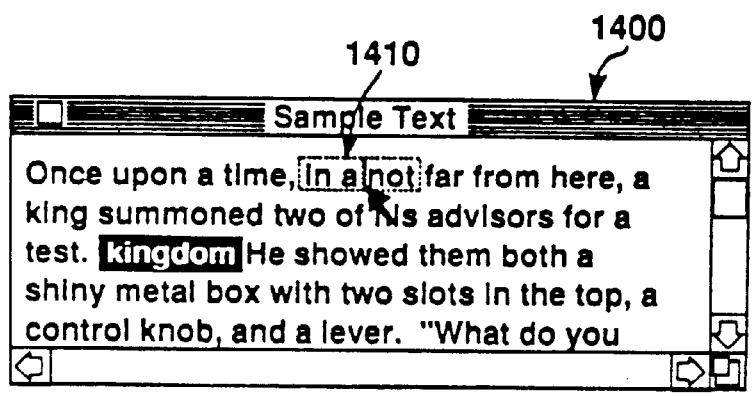
FIGS. 14a and 14b show an example of drag feedback which may be provided for text items.
Figure 14B:
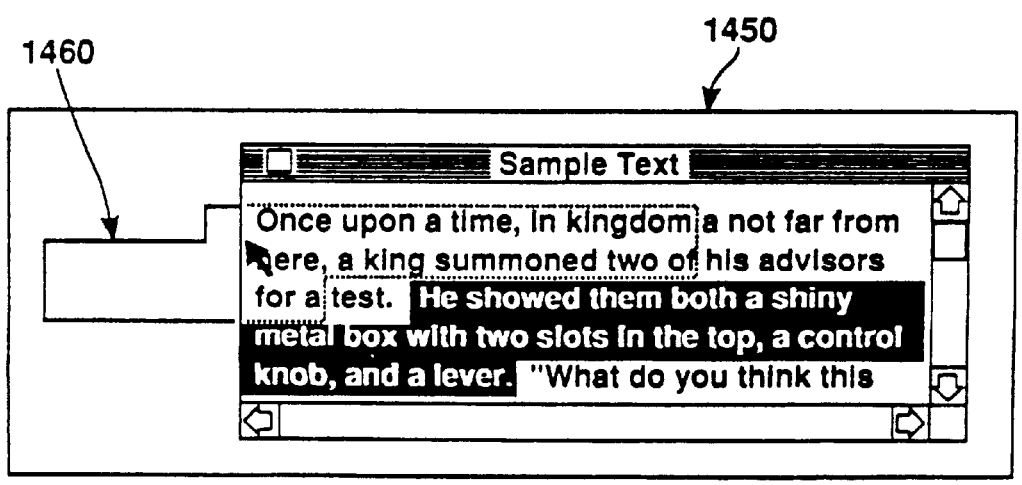

Two examples, of feedback for the dragging of text objects is illustrated with references to FIGS. 14a and 14b.

For example, as shown in FIG. 14a, a selected text region is represented with a dotted outline of the region, as is illustrated by 1410 in window 1400. Note that the dotted outline is consistent for icons, graphics, and text to provide positive user feedback that a drag is occurring. Similarly, text spanning several lines, such as that shown in FIG. 14b, may be performed using a dotted outline of the shape of the text as it appears in window 1450 by a dotted outline 1460. Examples of the selection of text and the movement thereof within an application program and the positive user feedback thereof are provided in application Ser. No. 07/632,318 and application Ser. No. 07/993,784, which are both assigned to the assignee of the present invention. Note that there is a distinction between these selection methods and those used in prior art text selection methods which utilize a "I-beam cursor" whenever the cursor is within a text area, regardless of whether a portion of text is selected. In the current preferred embodiment, the I-beam cursor is not displayed when a drag operation is to be performed, such as the selection (e.g., mouse-down event) of an item and the movement of three pixels while the region is selected. An activation and deactivation of the selection device while the cursor is in a window and no movement will result in an I-beam cursor or insertion caret at the place in the text in where the selection was made. This takes place upon the deactivation of the selection device (a mouse-up event). At any rate, the appearance of the display for movements of various types of information will not be discussed further here, however, the functioning thereof will be discussed below.

Autoscrolling

Figure 15A:
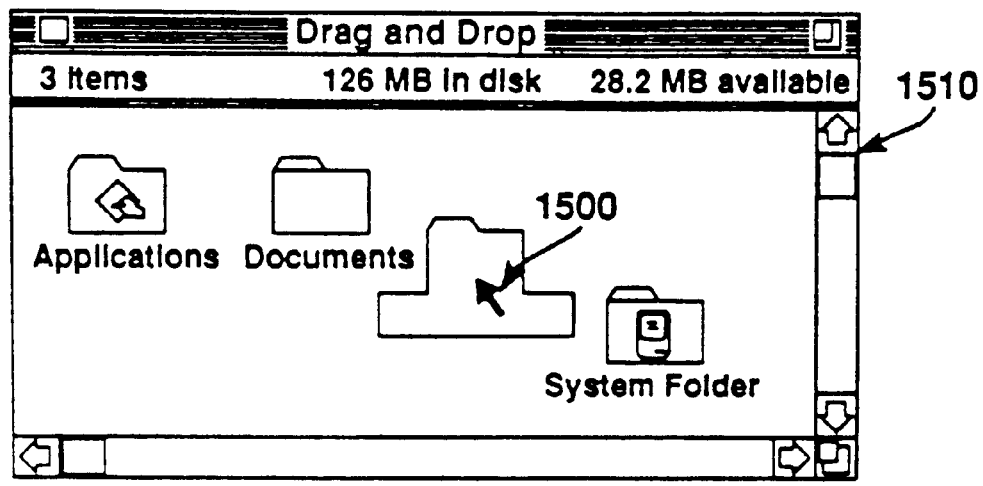
FIGS. 15a–15d illustrate autoscrolling which may be performed upon the graphical user interface of the preferred embodiment.
Figure 15B:
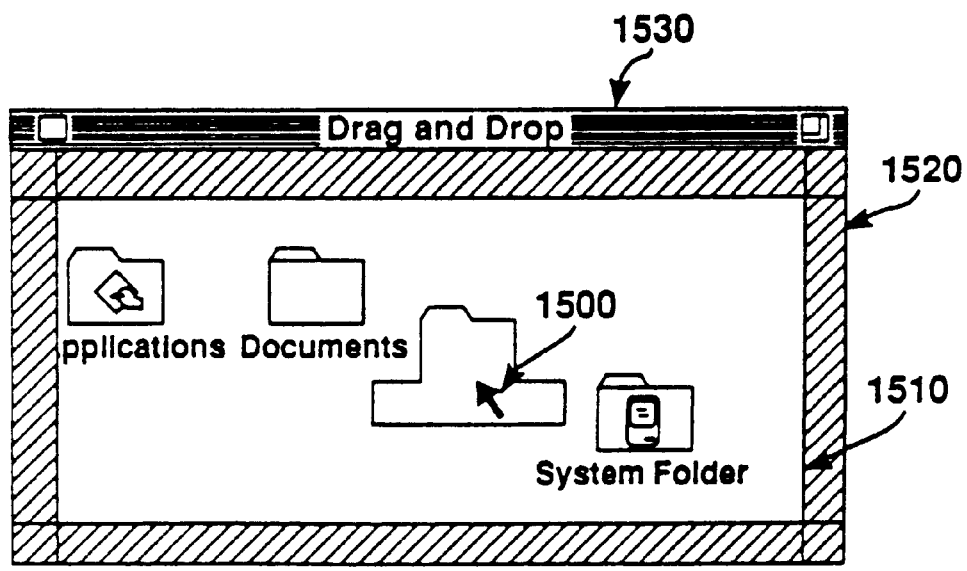

Another improved aspect of the user interface display which takes place during drag operations is known as "autoscrolling." Autoscrolling is a technique wherein, during a drag operation or the selection of items for dragging, portions of the window display will "scroll" or move in appearance on the display in order to select additional regions or move the window to a part in which the window is not currently displayed. For example, as is illustrated in FIG. 15a, a user may use cursor 1500 to select a document and drag that document to another part of the window or select additional items in the window. The autoscrolling region for a window is defined as outer border 1510, as is illustrated in 1520 of FIG. 15b, however, it excludes title bar region 1530 wherein, if the cursor enters that portion of the window, then autoscrolling is suspended. Autoscrolling will scroll in the direction of the portion of the scrolling bar selected while the cursor remains at that position until no more scrolling can be performed in the given window. So, if the cursor resides in the right portion of scrolling region 1510, then the window scrolls to the right, and if it is at the left portion of the window, then the window scrolls to the left.

Figure 15C:
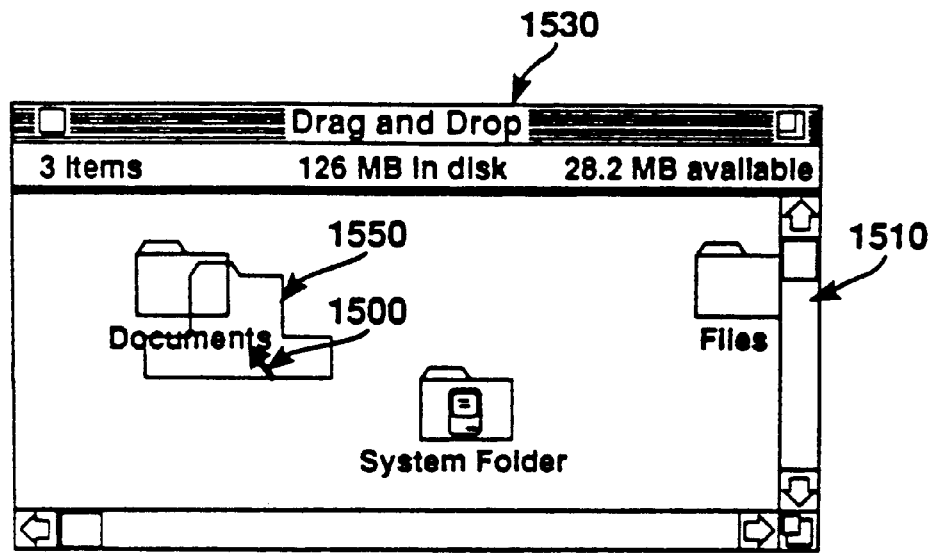
Figure 15D:
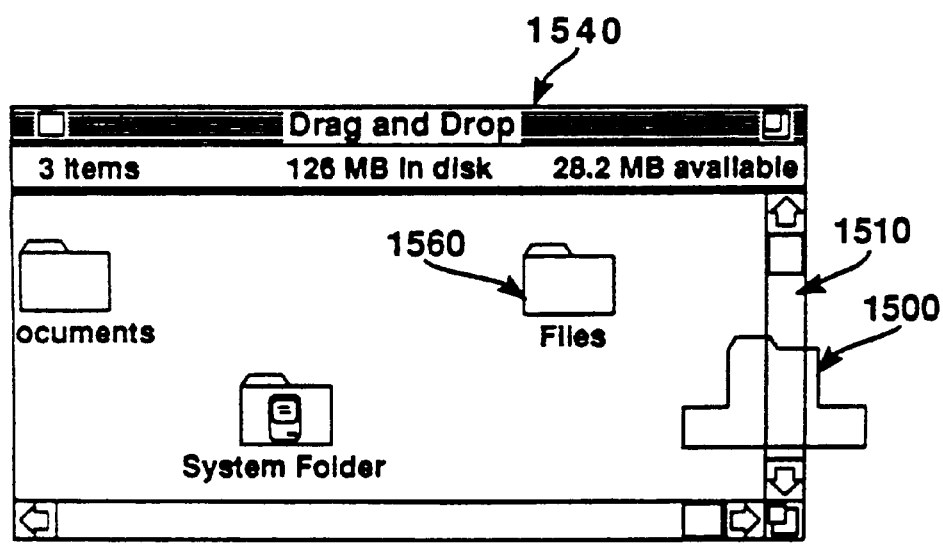

Autoscrolling is illustrated with reference to FIGS. 15c and 15d. For example, a selection of an icon may be performed, as is illustrated in FIG. 15c. The user will drag the icon until it resides in the scroll bar region 1510. In this manner, any areas not currently displayed in a window may be revealed by placing the cursor on the scroll bar during a drag or range selection operation (e.g., by drawing a rectangle box to select multiple objects). Thus, the window changes to the appearance, as is illustrated in 1530 of FIG. 15d, by scrolling to the right to reveal the "Files" folder 1560.

Destination Feedback

Figure 16:
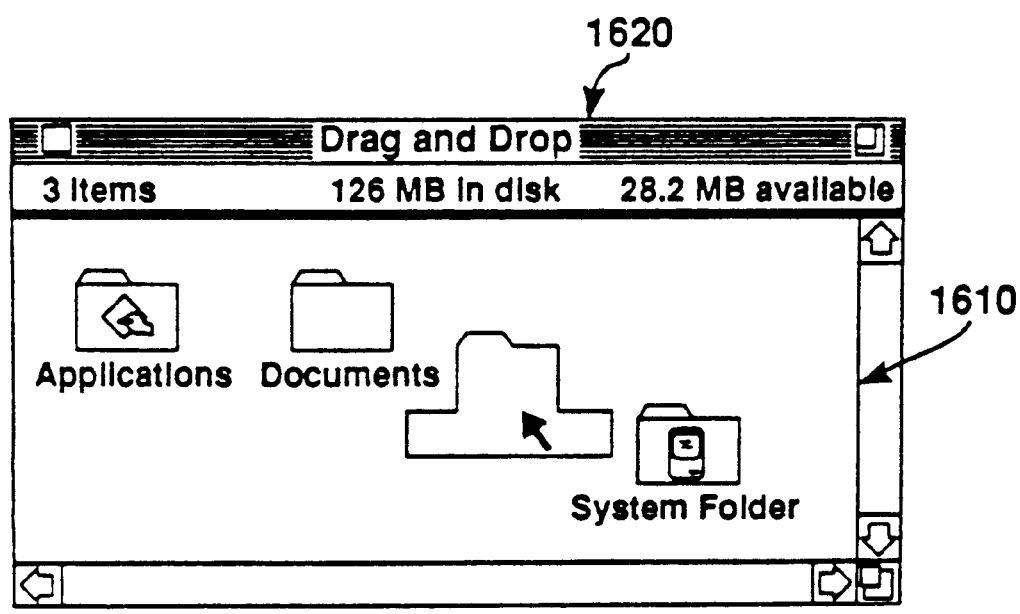
FIGS. 16–18d illustrate examples of various destination feedback which may be provided by the graphical user interface of the preferred embodiment.
Figure 17:
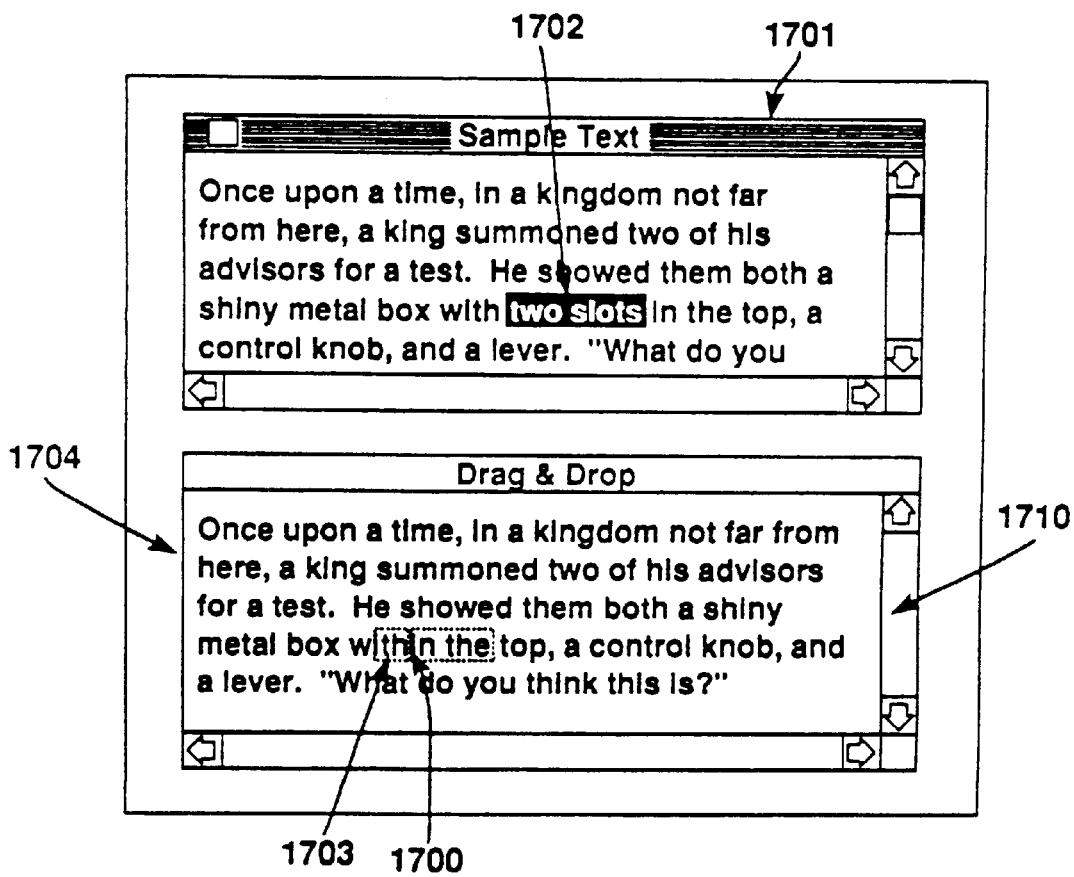

Another feature provided by the preferred embodiment is destination feedback. The user is provided with visual feedback for the destination where the information will be dropped. This is illustrated with reference to FIGS. 16–19b. When dragging takes place, especially into discrete windows such as illustrated in FIG. 16, if the window (e.g., 1620) can accept the dragged item, then a single-pixel highlight inset 1610 is displayed when the window is the current location of the cursor. Another example is illustrated in FIG. 17. For example, the user may be selecting text 1702 in window 1701 for dragging to a second window 1704. When the cursor enters the region of window 1704, a highlight inset 1710 is displayed if the window can receive the dragged information. This provides feedback to the user that information 1702 may be dragged to that location (the application program controlling 1704 can accept the text information). While cursor 1700 resides within the domain of window 1704, the inset highlighting 1710 is displayed. The preferred embodiment also provides feedback for subwindows and other user interface objects, such as icons, spreadsheet cells, and other objects which are under control of an application program, have a similar single-pixel inset highlighting to provide additional feedback to the user, even when interapplication dragging is taking place. This is illustrated with reference to FIGS. 18a and 18b.

Figures 18A, 18B:
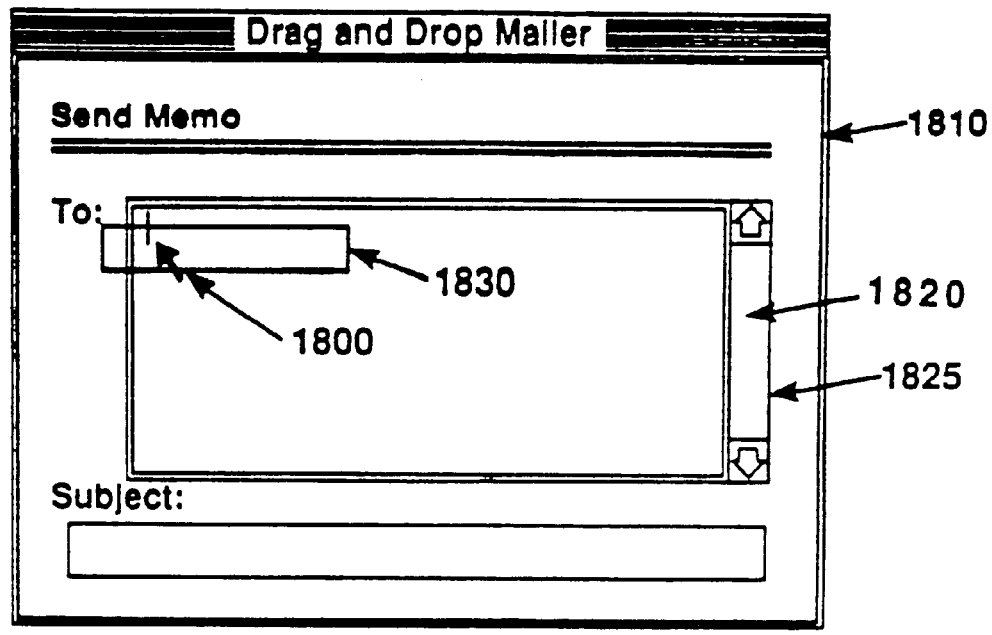

For instance, an electronic mail application may be controlling the window shown as 1810 in FIG. 18a. For example, in the electronic mailer window 1810 illustrated in FIG. 18a, the user may desire to select such an item as an electronic mail address to place into "To" field 1820. In this instance, when cursor 1800 enters "To" field 1820, then a single-pixel inset 1825 is displayed within the "To" field to indicate that that field is capable of receiving the electronic mail address information or other information which is selected and dragged as icon 1830. Similarly, as is illustrated in window 1850 of FIG. 18b, selected data 1860 may be dropped into the worksheet cell of a spreadsheet displayed in window 1850, as is illustrated by the highlighting provided as 1870 in window 1850. In either event, destination highlighting may be provided for various subwindows, icons, fields, or other discrete user interface objects in the preferred embodiment when interapplication dragging is taking place to provide positive feedback to the user. The mechanics of this will be discussed in more detail below with reference to tracking handlers during the drag and the tracking of the drag through various windows or other areas on a computer system display.

Drop Feedback

When the user releases the mouse button after dragging an object to a destination, a "drop" feedback occurs informing that the drag-and-drop operation was successful. This feedback is visual in the preferred embodiment (but also may be audio, according to an application program's function), and is related to the semantic operation indicated by the drag-and-drop sequence. Semantics will now be briefly discussed.

Dragging Semantics

Because dragging semantics are intimately related with drop feedback, it will now be briefly discussed here. Dragging semantics includes appropriate actions which will be performed upon dragging between various application programs and the main operating system window and various other operating system services controlled The semantics are briefly summarized with reference to Table 1 below.

TABLE 1

Dragging Semantics

| To<br>From | Document | | File System | | Finder |
| --- | --- | --- | --- | --- | --- |
| | Same | Different | Same Volume | Different Volume | Service |
| Document | Move | Copy | Copy | | Copy |
| Finder | Copy | | Move | Copy | Copy |

Thus, the general rule is that, if the window represents a different item or location, then the action is interpreted as a copy operation. In the case of a same document or same media volume, then it is interpreted as a move operation. Note that, in the cases where the action is in doubt, a copy operation is assumed to avoid any data loss which may occur. Thus, for the same document or window in which the data resides, the operation is assumed to be a move operation. Similarly, if it is the same physical media or same volume, then it is assumed that the operation is a move. In all other cases, if the windows are different or it is between a document and the Finder or a document in a Finder service, then the operation is assumed to be a copy operation or performing the Finder service which the icon or other Finder service performs (e.g., printing, sending electronic mail, etc.).

Finder Icons

When the user drags a document to a folder icon in the Finder, the behavior of the drop feedback is the reorganization of the document into the folder, the visual component is the disappearance of the document icon and the unhighlighting of the destination folder icon (in the case of a "move" operation).

Figure 18C:
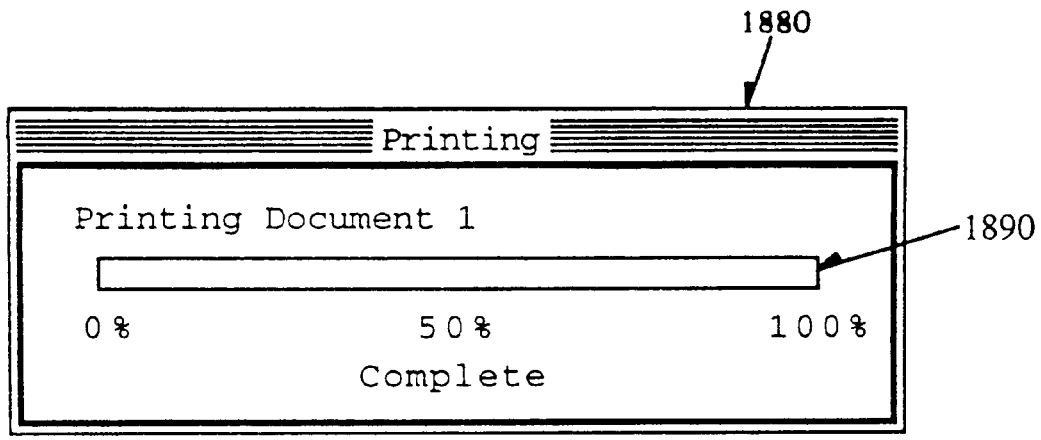
Figure 18D:
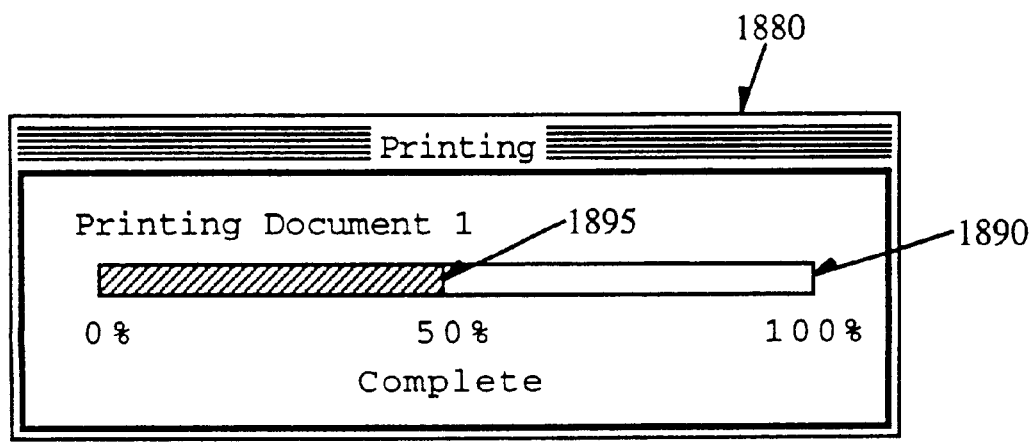

If an icon represents a system service, such as an electronic mail or printing, the drop feedback is followed by some indication that the service is being delivered. For example, if the user drags a document to a printer, the icon would slowly "fill up" in color as the printing job progresses towards completion. This is called "progress feedback" and is represented using a progress bar or other feedback. One method is illustrated in FIGS. 18c and 18d. For example, as is illustrated in FIG. 18c, a progress window 1880 may be displayed upon dropping an item into a system service such as a printing routine, as was illustrated in FIGS. 9a–9d. A progress bar window, such as 1880 shown in FIG. 18c, may be displayed first. As is illustrated, progress bar 1890 is currently clear indicating that no printing has yet taken place at this initial stage. In a short time later, however, as illustrated in FIG. 1890, it may have a dark region 1895 which fills up the progress bar indicating the percentage of completion of the printing job. Other types of system service feedback may be provided using various techniques well-known to those skilled in the art.

Graphics

When dropping graphics, the drop feedback is the movement of the actual object to the location of the mouse-up event (the release of the selection device), in the preferred embodiment. This was illustrated in FIGS. 6a–6c.

Text

After dropping text, the drop feedback is the movement or copying of text from the source to the destination, accompanied by a series of "zooming rectangles" from the source text to the destination text in the preferred embodiment. The zooming rectangles are provided using a routine ZoomRects( ) described below and are displayed only after the text is rewrapped because the destination text may end up being a distance away from the exact point where the user dropped the text. If a "move" operation is in effect, the source text disappears. In either case, the text is inserted at the destination is selected and may be performed using the techniques disclosed in Ser. No. 07/993,784 assigned to the assignee of the present invention.

Transferring Selections

After a successful drag-and-drop sequence involving a single window, the selection feedback is transferred from the source to the destination. This is discussed with reference to FIGS. 19a and 19b.

Figure 19A:
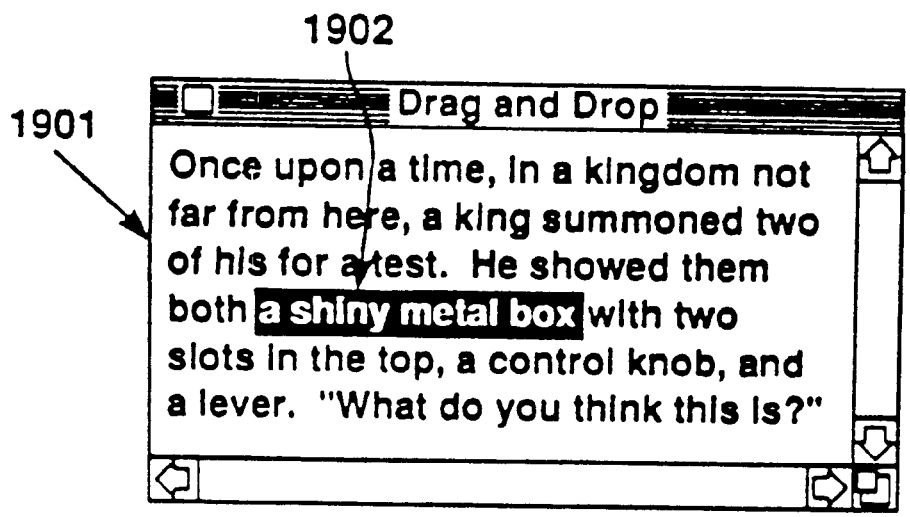
FIGS. 19a–19d illustrate examples of dragging text within a single application window and between application windows.
Figure 19B:
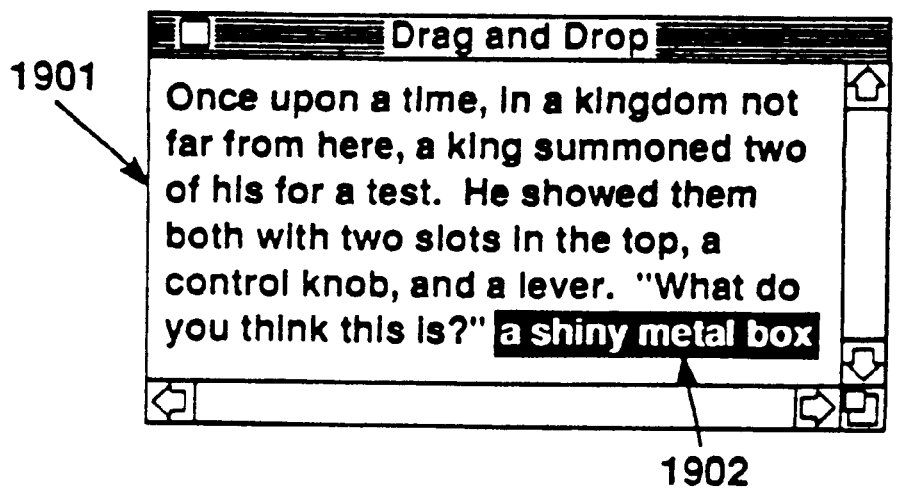
Figure 19C:
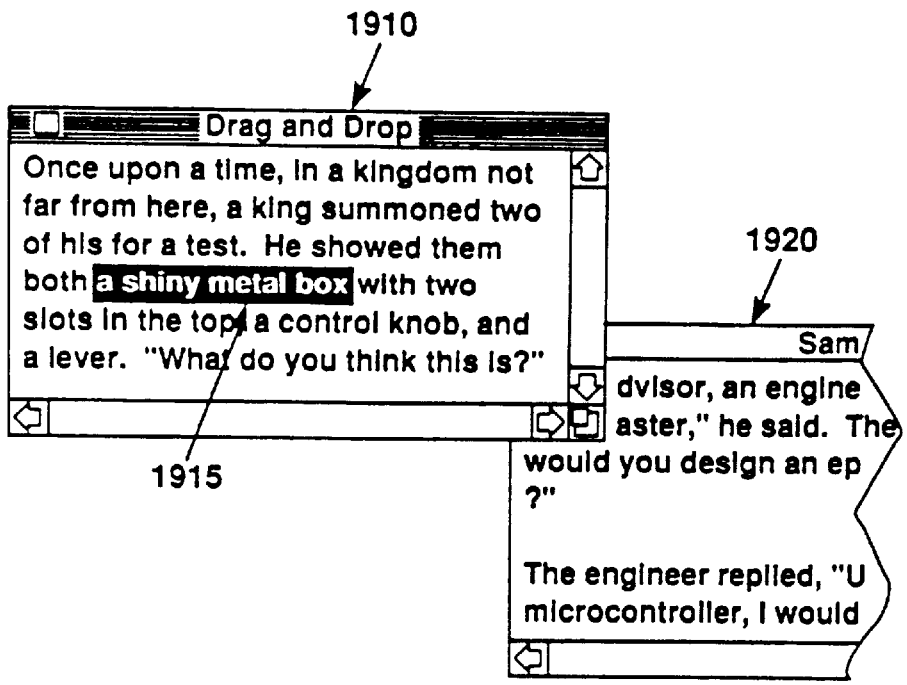
Figure 19D:
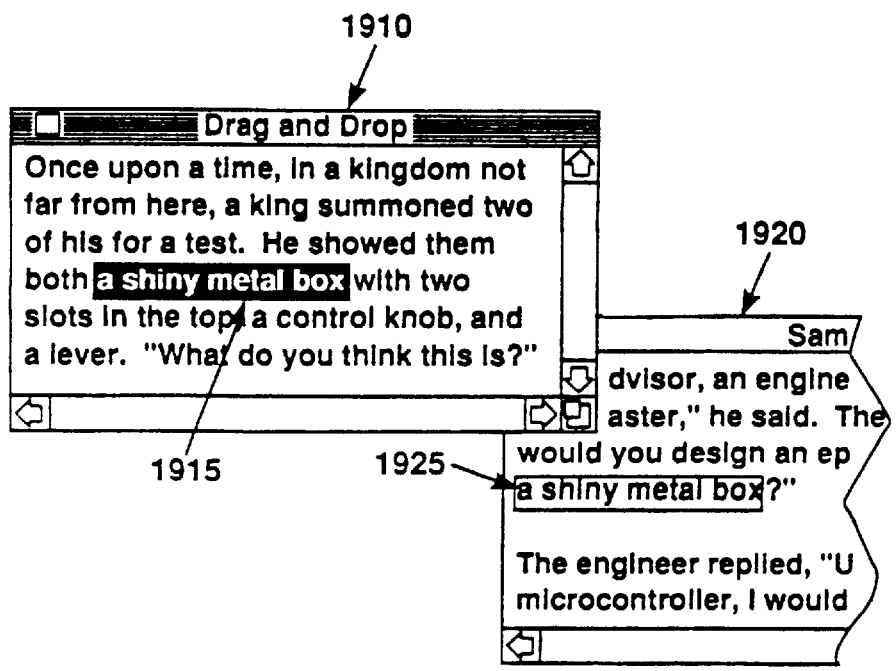

In a single window 1901, as is illustrated in FIG. 19a, selected text 1902 may be desired to be moved. As is illustrated in FIG. 19b, text 1902 has been moved, and the region remains selected. This process of copying between windows is illustrated in FIGS. 19c and 19d.

Background Window Dropping

The results of the process of dragging and dropping into a background window is illustrated with reference to FIGS. 19c and 19d. For example, a user may desire to select text (e.g., 1915) in a first window 1910, which is active, and copy that text to a second window 1920, which is not active (e.g., it may be controlled by an inactive application program). This can be applied to any type of data being selected, dragged, and dropped between windows. The results of the drag and drop are shown in FIG. 19d. As is illustrated, background window 1920 does not become active (e.g., its title bar 1926 is not shown in active state), and region 1925 is shown in the single-pixel outline representation surrounding the copied text 1925 from 1915 from window 1910. The window is also not brought to the front, in this circumstance.

Abort Feedback

Dropping outside a destination is considered as an "abort" and is indicated in the preferred embodiment by zooming rectangles that originate at the position of the drop and end at the source's location. If, for some reason, dropping inside a destination does not result in a successful operation, zooming rectangles are used in the preferred embodiment. This is a form of "negative" drop feedback. This is illustrated with reference to FIGS. 20–20e.

Figure 20A:
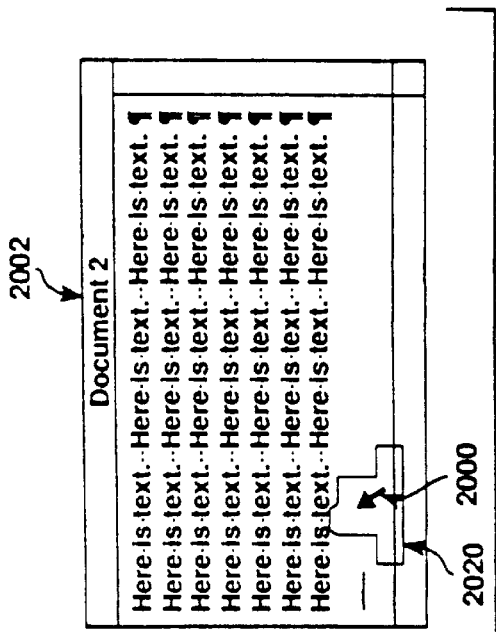
FIGS. 20a–20d show an example of abort feedback which illustrates an appearance on a display when an operation cannot be completed successfully.
Figure 20A:
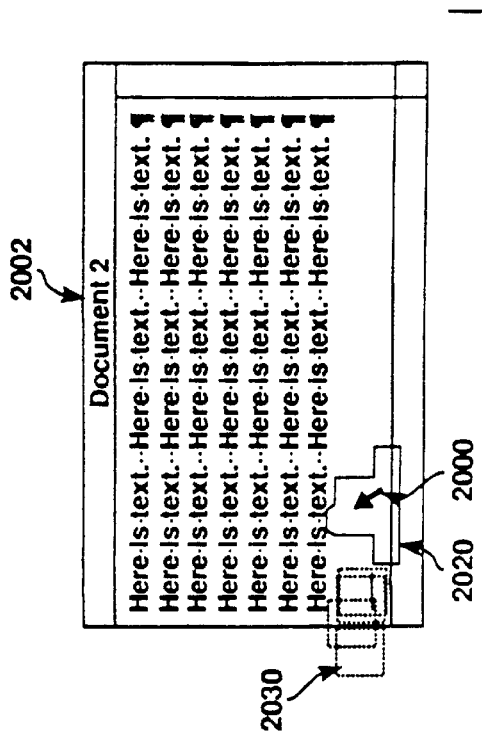
Figure 20A:
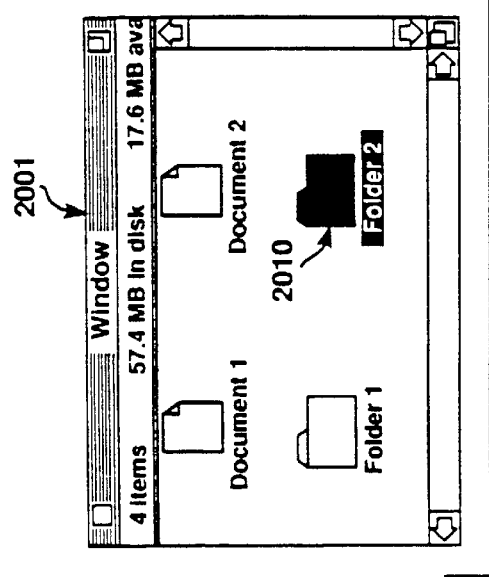
Figure 20B:
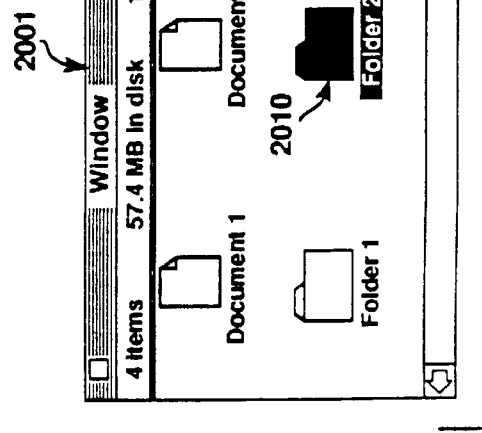
Figure 20C:
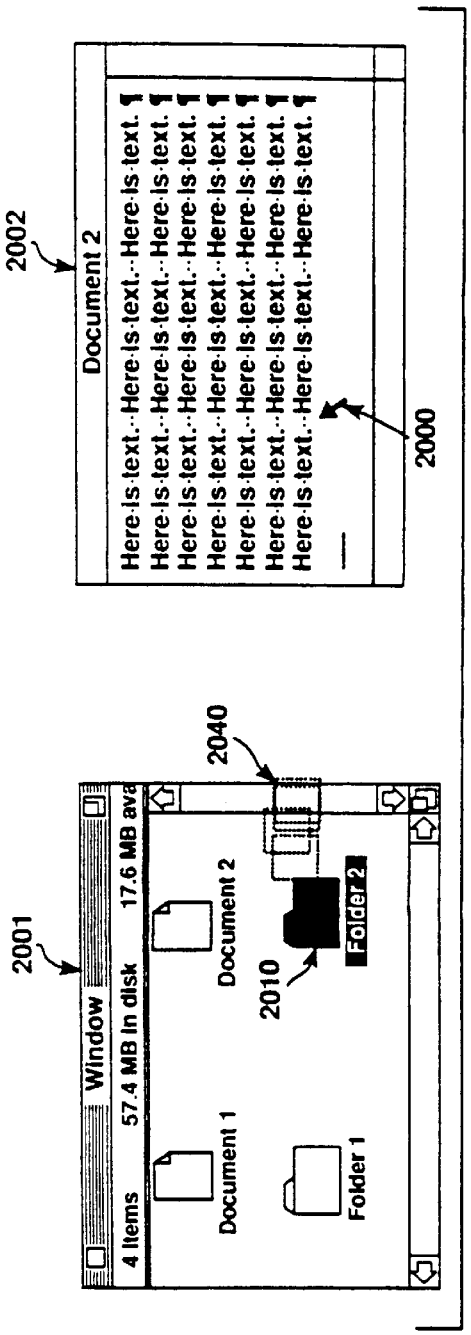
Figure 20D:
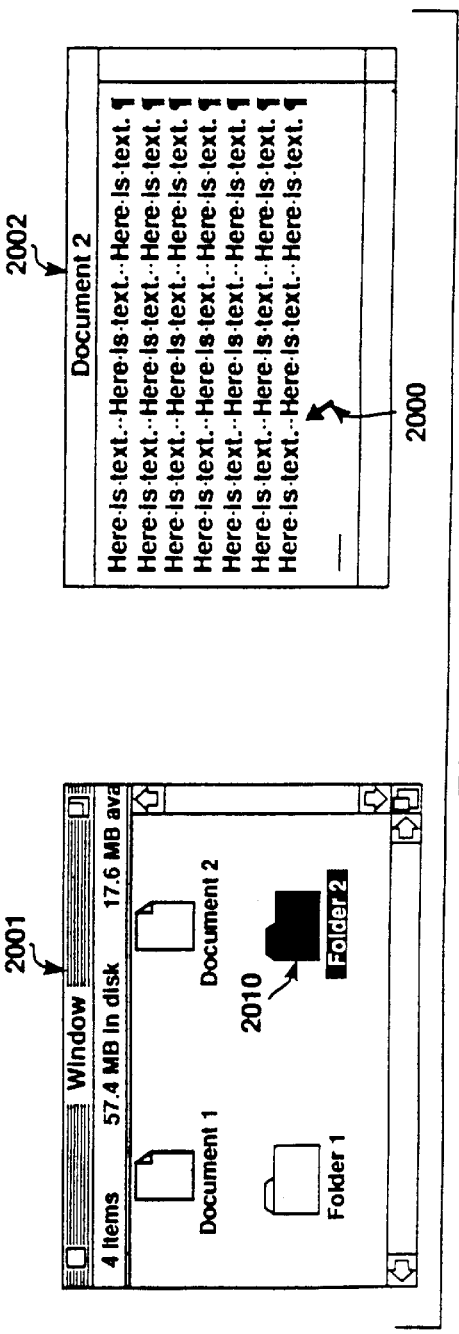

For example, a user may drag, using cursor 2000, an icon 2020 into a second window 2002, as is illustrated in FIG. 20a. This is folder 2010 which was dragged from window 2001, as is shown by its highlighted state. Then, as illustrated in FIG. 20b, the abort may be indicated by series of "zooming rectangles" 2030 generated by the subroutine ZoomRects( ) discussed below. As is illustrated in FIG. 20c, zooming rectangles head back towards the original folder 2010 until the zooming rectangles completely disappear from the screen, as shown in FIG. 20d. This is an animated effect indicating to the user that the drag operation was unsuccessful.

Summary of the Behavior of Windows

Independent Windows

When a window is brought to the front, in the preferred embodiment, only that specific window is brought to the front; the entire window hierarchy belonging to the application is not brought to the front, as in prior art systems. This behavior makes it easier to have a source window and destination window side-by-side, especially when the two windows belong to different applications.

Even with this behavior, the user is still able to bring the entire window hierarchy belonging to an application to the front. This can be done in the preferred embodiment by choosing the application's menu item in an application menu of the user interface display. In the case of the Finder, clicking on the desktop brings the Finder's window hierarchy to the front. Also, double-clicking on the application's Finder icon brings the entire window hierarchy of the application to the front.

Bringing Windows to the Front

In the preferred embodiment, as already been illustrated, the release of the selection device (the mouse-up event) serves as the application-switching trigger (instead of the mouse-down event as in the prior art), subject to certain exceptions.

If the user clicks inside an inactive window without dragging at least three pixels between the mouse-down and mouse-up events (no drag has taken place), the window is brought to the front. If the user drags wholly inside an inactive window (i.e., the source and destination are in the same inactive window), the window is brought to the front as soon as the mouse-up event occurs. If the user drags from any window to another window that is inactive, the inactive window is not brought to the front after the drag-and-drop sequence is completed. If the drag-and-drop sequence ends at the Finder desktop, no window is brought to the front. As discussed above, whenever an inactive window is brought to the front, a background selection (if any) in that window becomes highlighted as a normal selection, instead of the single-pixel outline representation.

Drag Verbs

Figure 21:
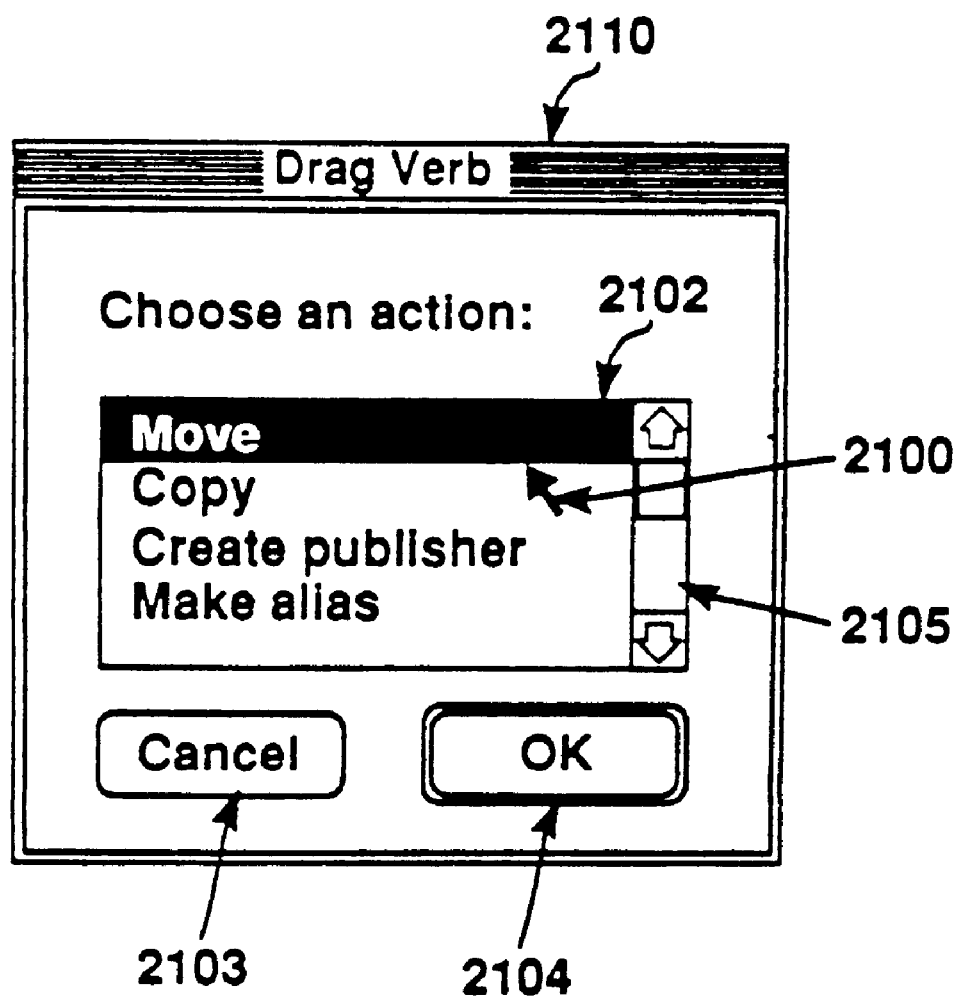
FIG. 21 illustrates a selection dialog window which may be used for selecting verbs or actions to be performed during a drag-and-drop operation.

There are three ways in which the user can specify the drag verb that is applied to a given drag-and-drop sequence. The first way is to perform the drag without holding down any modifier keys. In this case, the most frequently used or most likely verb is applied. For example, a printing routine assumes that a print operation is to take place, and the sending application program and the system service negotiate the type of data transmitted to allow the information to be printed (see, discussion below). The second method is when the user performs the drag while holding down the Option key. This method specifies the secondary verb. In most cases, this verb would be Copy. However, in cases where Copy is not applicable, the verb can be something else, such as overriding the confirmation dialog when dragging an icon from a remote read-only volume to the desktop. The third way of specifying the drag verb is to hold down the Control key when dragging; as soon as the dragged object is dropped, a verb selection dialog appears, as in FIG. 21. The user can choose the verb in this dialog, or cancel the operation altogether. For example, as is illustrated in FIG. 21, a dialog window 2110 is displayed. The user may select, such as using cursor 2100, a selection 2102 in verb list 2105. As is typical in standard prior art Macintosh® dialog boxes, the user may either double-click, using cursor 2100 and the selection device, a selection such as 2102 to cause the verb to be performed or select "OK" button 2104. To cancel the operation, the user selects "Cancel" button 2103. The list of verbs displayed will be a match between data item flavors, which are specified by the sending application program, and the service performed by the object at the destination (e.g., a printing or mail service).

Functional Description

Drag Handlers and Drag Procedures

Application programs supply the Drag Manager callback routines (e.g., pointers to routines in the program) that the Drag Manager calls to allow the application to implement dragging. The Drag Manager uses two different types of callback routines, called drag handlers and drag procedures. Drag handlers are routines that are installed on windows that the Drag Manager uses when dragging over that window. Drag procedures are routines that are used by the Drag Manager during a drag regardless of which window the user may be dragging over. The Drag Manager allows application programs to install the following drag handlers on the program's windows:

a receive data handler that the Drag Manager calls when the user finishes a drag in one of an application's windows a drag tracking handler that the Drag Manager calls when the user drags a selection through one of the application's windows to allow the application to track the drag within the window a constrain mouse handler that the Drag Manager calls when the user drags a selection through one of the application's windows to allow the application to modify the mouse coordinates The Drag Manager provides a family of InstallHandler and RemoveHandler routines that allow an application program to register handlers of each of these types with the application. An application can register a different set of handlers to be used for each window in the application. An application can also register with the Drag Manager a set of handlers to be used when a window does not have its own handlers.

Figure 22:
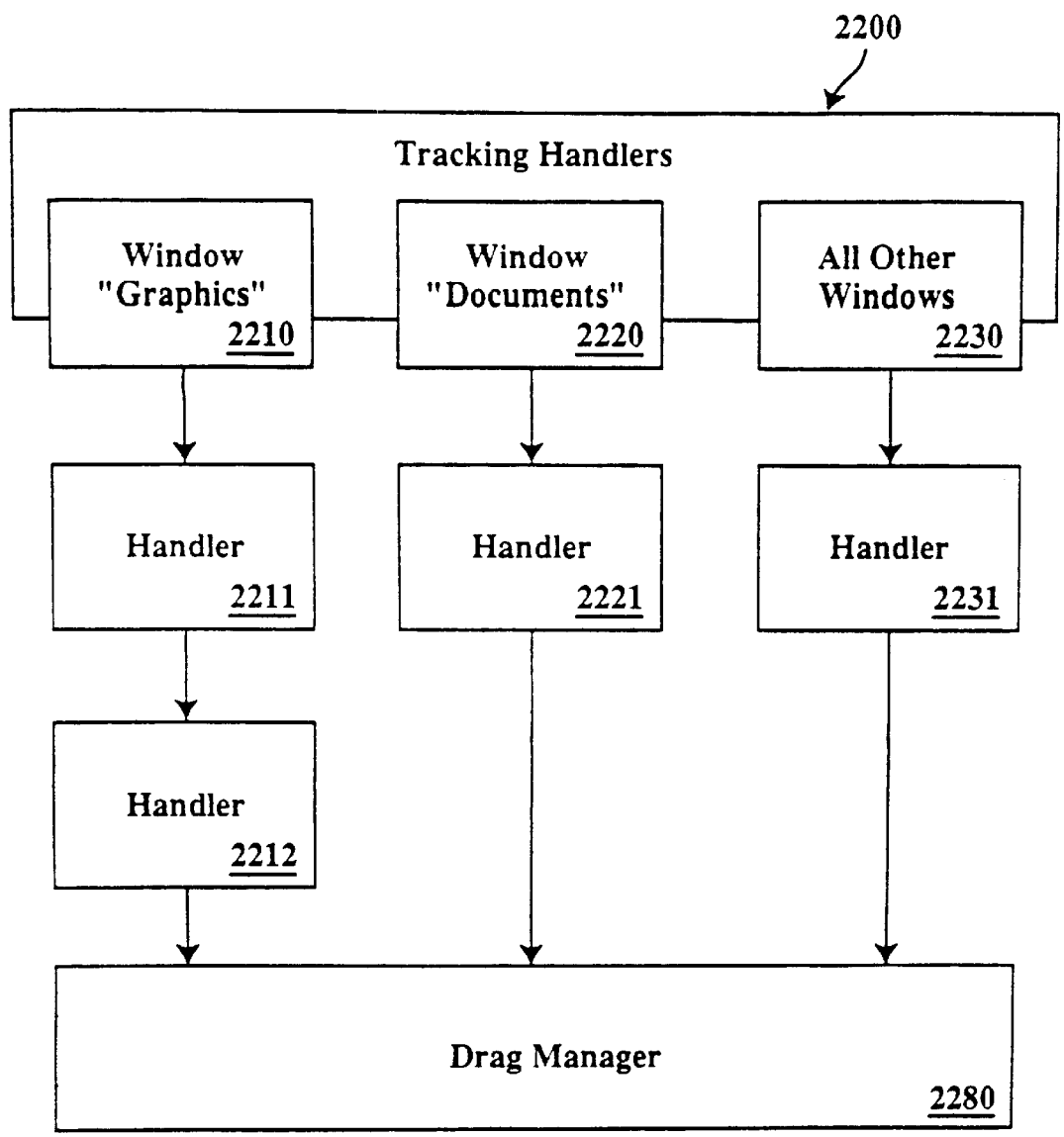
FIG. 22 illustrates an example of a tracking handler registry for various windows which are handled by a particular application program.

If an application assigns more than one handler of the same type on the same window, the Drag Manager calls each of these handler routines in the order that they were installed. This technique is known as "chaining" and allows the control of various areas in a window, such as icons, subwindows, fields, panes, or other user interface objects. FIG. 22 shows an example of the tracking handler registry 2200 for an application that has installed two handlers 2211 and 2212 for its "Graphics" window 2210, a single handler 2221 for its "Documents" window 2220 and a single handler 2231 to be used for all of the application's other windows. When the Drag Manager 2280 tracks a drag through the "Documents" window, handler 2221 is called. When the Drag Manager tracks a drag through the "Graphics" window, handler 2211 is called followed by handler 2212 being called. Finally, if the Drag Manager tracks a drag through any other window in the application, handler 2231 is called. For example, handler 2211 and 2212 may be two distinct tracking handlers, one for the window itself and a second for a specific icon or other ornament within the window. This may be an additional pane for a window or other type of object within a window. The "Documents" window and other windows which are accessed by the tracking handler registry 2200 for this particular application program will have only single tracking handlers 2221 and 2231, respectively, associated with them for any and all actions within windows in those circumstances.

The second type of callback routine that may be provided to the Drag Manager is a drag procedure. The Drag Manager uses the following drag procedures:

a send data procedure that the Drag Manager calls when the receiver application requests a drag item flavor that the Drag Manager does not currently have the data cached for a drag input procedure that the Drag Manager calls when sampling the mouse position and keyboard state to allow the application program to override the current state of the input devices a drag drawing procedure that if provided by the sender application program, the Drag Manager calls to allow the sender application to assume responsibility for drawing the drag feedback on the screen Sending Data When the user chooses a destination for the items being dragged, the receiving application program may request from the Drag Manager any number of types of data. These various types of data are known, in the preferred embodiment, as drag item "flavors." Flavors may be of any sort, including ASCII text (flavor type 'TEXT'), styled text ('styl'), and rich text ('rtf'). Many other flavors may be used, in the preferred embodiment, according to the data types that the sending and receiving application programs understand. Another advantage to the method(s) and apparatus of the preferred embodiment is that sending application programs may provide data in addition to flavors. This is done if there is sufficient time available to provide the data in addition to the flavor. If the sending application program provided the flavor's data to the Drag Manager when calling one of the AddFlavor routines, the Drag Manager will simply provide that data to the receiver.

The application program may have chosen not to provide the data to the Drag Manager when calling one of the AddFlavor routines because it might have taken too long to prepare the data (and, perhaps, cause a user-perceivable performance penalty), or there might not have been enough memory to store the data. In this case, the Drag Manager calls the DragSendProc (if one was given to the Drag Manager) to allow the sending application to provide the data to the Drag Manager only when needed by the receiver, and the flavors provided act as "promises" which may be fulfilled at such time that the receiver requests the data.

If the sending application only exports small pieces of data that are easily generated, the data would presumably by provided when calling the AddFlavor routines discussed below and therefore the sender application would not need to provide a DragSendProc.

Receiving Data

When the user drops a collection of items in one of a receiving application's windows, the Drag Manager calls all of the ReceiveDropHandler routines that are installed on the destination window. This call allows the program to request the drag item flavors that the receiving application wishes to accept.

The receiver application program can inspect the available flavors by using the CountDragItems, GetItemReferenceNumber, CountDragItemFlavors, GetFlavorType, GetFlavorFlags and GetFlavorData functions which are described in more detail below. It receives flavor from the sender application by calling the GetFlavorData function. The GetFlavorData function calls the sender's SendDataProc if necessary to get the data for the receiver.

Drag Tracking

While the user drags a collection of items on the screen, as the mouse passes through one application's windows, the Drag Manager calls the DragTrackingHandler routines that are installed on the window under the mouse to allow the application program to track the drag through its windows. For example, this allows the highlight or other drag feedback to take place, as discussed below with reference to FIGS. 16–18b.

The Drag Manager sends the application's DragTrackingHandler tracking status messages as the user moves the mouse. The DragTrackingHandler receives the following messages from the Drag Manager:

an enter handler message when the focus of a drag enters a window that is handled by an application's DragTrackingHandler from any window that is not handled by the same DragTrackingHandler an enter window message when the focus of a drag enters any window that is handled by an application's DragTrackingHandler an in window message as the user drags within a window handled by the application's DragTrackingHandler a leave window message when the focus of a drag leaves any window that is handled by an application's DragTrackingHandler a leave handler message when the focus of a drag enters a window that is not handled by an application's DragTrackingHandler When an application's handler receives any of these messages from the Drag Manager, it can use the CountDragItems, GetItemReferenceNumber, CountDragItemFlavors, GetFlavorType and GetFlavorFlags routines to inspect the drag item flavors that are contained in the drag to determine if the application program should highlight its window or a portion of its window.

The in window message can be used to highlight specific containers within a window or if window contains a text field, an insertion point within the text field.

The enter window and leave window messages occur in pairs. These messages are useful for highlighting a window that can accept the items being dragged.

The enter handler and leave handler messages also occur in pairs. These messages only occur when the drag moves between windows that are handled by different routines. These messages are useful for allocating and releasing memory that the application might need when tracking within a specific set of windows.

Figure 23:
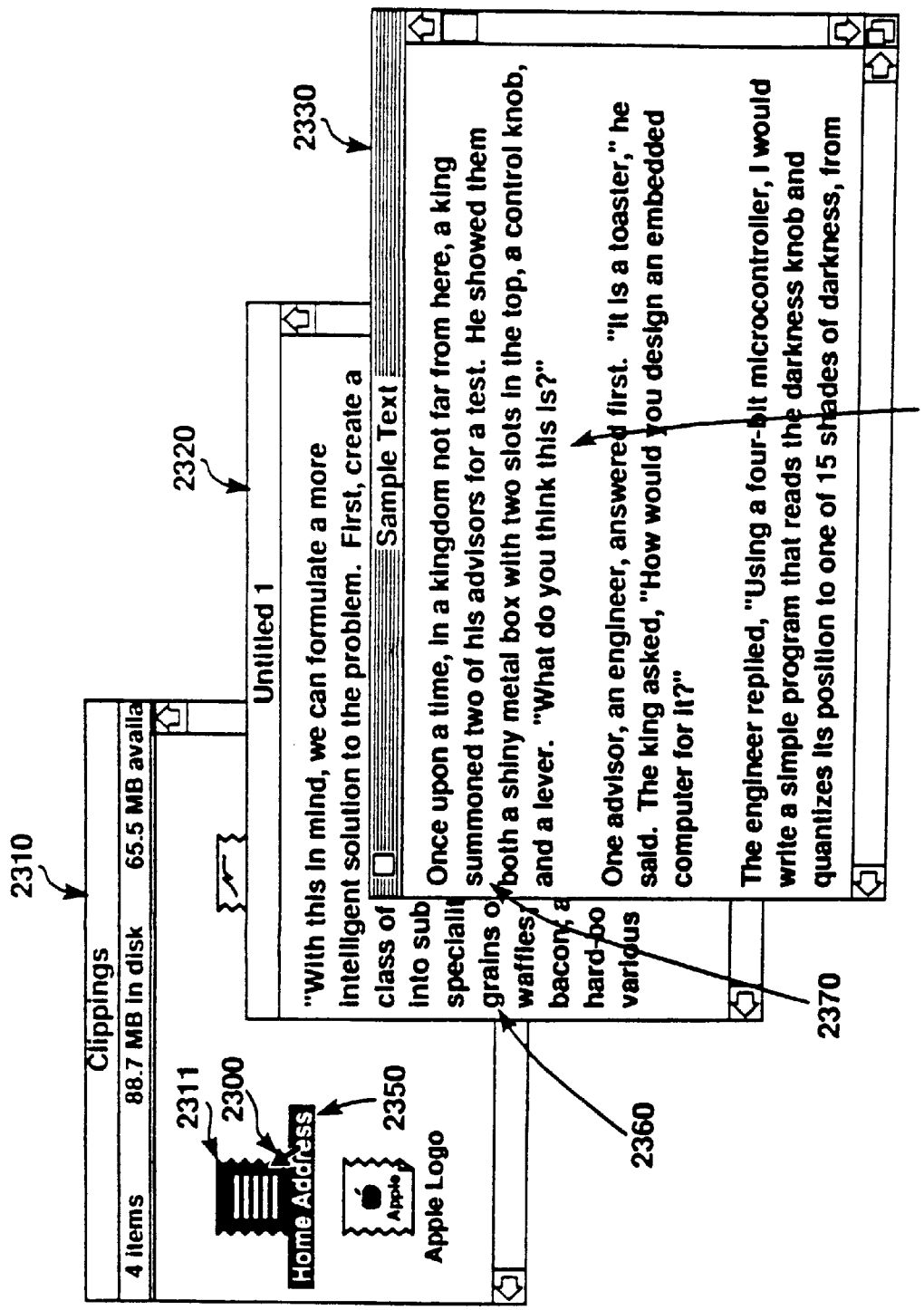
FIG. 23 shows a selected item and a series of windows which may be traversed during a drag-and-drop operation.

FIG. 23 shows an example of a user dragging a clippings file from a Finder window 2310 through two windows 2320 and 2330 of a word processing application. The following example demonstrates what tracking messages are sent to the Finder's tracking handler and an application requested by icon 2311 during a drag:

Cursor 2300 at position 2350—The user clicks and drags on the clippings file and the Finder starts a drag. The Finder receives an enter handler message followed by an enter window message. As the user drags within the Finder's "Clippings" window, the Finder receives multiple in window messages.

Cursor 2300 at position 2360—When the user drags into the word processor's "Untitled 1" window, the Finder receives a leave window message followed by a leave handler message. The word processing application then receives an enter handler message followed by an enter window message. While the user drags within the application's "Untitled 1" window 2320, the application program receives in window messages.

Cursor 2300 at position 2370—Assuming that both of the word processor's windows 2320 and 2330 are handled by the same DragTrackingHandler, when the user drags into the "Sample Text" window, the word processing application receives a leave window message followed by an enter window message. It does not receive any enter/leave handler messages since the same handler routine is used for both windows. As the user drags within the application's "Sample Text" window 2330, the application receives in window messages.

Cursor 2300 at position 2380—When the user releases the selection device when the cursor is at position 2380, the data transaction occurs. Then the word processing application receives a leave window message followed by a leave handler message. Drag tracking is now complete.

Using the Drag Manager

The Drag Manager allows the user to drag items in and out of a window or other object controlled by an application program. Before items can be dragged into or out of a window, the application program must register a set of drag handlers for the Drag Manager to use when the application is involved in dragging. A drag and drop action by the user is broken down into three discrete steps. The steps are first to pick up the item or items being dragged, then to track the selection being dragged through application windows as the user searches for a place to drop the selection, and finally to then drop the item or items at the user's chosen destination.

This section explains in detail how the Drag Manager is used to:

install and remove drag handlers to and from the Drag Manager's handler registry for the application's windows prepare the Drag Manager with drag items and drag item flavors start a drag process track a drag through the application's windows send data to the receiver of a drag that originated from an application's windows request and receive data flavors from the sender application when the user drops the selection within an application's windows Installing and Removing Drag Handlers A drag handler is registered with the Drag Manager using the InstallHandler functions. There is a separate InstallHandler function for each kind of handler. These functions are InstallReceiveHandler, InstallTrackingHandler and InstallConstrainHandler.

Each of the InstallHandler functions takes a pointer to a window that the application wants to associate the handler with. If NIL is supplied as the window pointer, the Drag Manager will register the handler in the special area that is used when a drag occurs in a window that is not registered with the Drag Manager. Handlers installed in this special area are called default handlers.

A reference constant may be passed to each of the InstallHandler functions. This value is stored by the Drag Manager and is forwarded to each handler's routine when it is called.

The following code segment shows how to use the InstallHandler functions to install a default handler for the application:

```
OSErr MyInitDragManager ()
{   OSErr       result;
    if (result = InstallReceiveHandler(MyDefaultReceiveHandler,
        NIL, &myGlobals)) {
        return (result);
    }
    return(InstallTrackingHandler(MyDefaultTrackingHandler,
        NIL, &myGlobals));
}
```

The function MyInitDragManager calls InstallReceiveHandler and InstallTrackingHandler to install default receive and tracking handlers for the application program. In the window parameter, NIL is passed to specify that these handlers should be installed as default handlers. A pointer to the application's global variables is passed in the reference constant parameter.

The following shows how to use the InstallHandler functions to install handlers for a specific window:

```
OSErr MyDoNewWindow(WindowPtr *newWindow)
{   OSErr       result;
    WindowPtr   theWindow;
    if (!(theWindow = GetNewWindow(kMyWindowID, 0L, -1L))) {
        return(resNotFound);
    }
    if (result = InstallReceiveHandler(MyReceiveHandler,
        theWindow, &myGlobals)) {
        DisposeWindow(theWindow);
        return(result);
    }
    if (result = InstallTrackingHandler(MyTrackingHandler,
        theWindow, &myGlobals)) {
        DisposeWindow(theWindow);
        return(result);
    }
    *newWindow = theWindow;
    return(noErr);
}
```

The function MyDoNewWindow calls all three of the InstallHandler functions to install a set of drag handlers for the window that it creates. In DoNewWindow, the window pointer is passed to the InstallHandler functions.

In the scenario created in the last two example functions, the Drag Manager will use the MyReceiveHandler and MyTrackingHandler functions when the focus of a drag occurs within any window created with the DoNewWindow function. Any other windows in the application would use the MyDefaultReceiveHandler and the MyDefaultTrackingHandler functions.

To remove a drag handler from the Drag Manager's handler registry, the RemoveHandler functions are used. The following shows how to remove drag handlers:

```
OSErr MyDoCloseWindow(WindowPtr theWindow)
{
    RemoveReceiveHandler(MyReceiveHandler, theWindow);
    RemoveTrackingHandler(MyTrackingHandler, theWindow);
    DisposeWindow(theWindow);
    return(noErr);
}
```

The function MyDoCloseWindow demonstrates the use of the RemoveHandler functions. The same routine address and window pointer is used to remove a handler. If NIL is used as the window pointer, the Drag Manager will attempt to remove the handler from the default handler registry.

Beginning a Drag

When the user clicks on an item or a selection of items in an application and begins to move the mouse without first releasing the mouse button, the user is making a gesture to begin dragging the selected objects.

To start a drag, a new drag reference is created by calling the NewDrag function. The NewDrag function returns a reference number that the application uses to refer to a specific drag process in subsequent function calls to the Drag Manager.

After creating a new drag reference, drag item flavors can be added to the drag by calling the Drag Manager's AddFlavor functions.

When all of the data describing the items contained in the drag has been given to the Drag Manager, the application calls TrackDrag to actually begin the drag. The following code segments show how mouse down events and start drag operations are handled.

```
OSErr MyDoMouseDown(EventRecord *theEvent)
{   OSErr       result = noErr;
    short       thePart;
    WindowPtr   theWindow;
    Boolean     onItem;
    thePart = FindWindow(theEvent->where, &theWindow);
    switch(thePart) {
        case inContent:
            if (theWindow == FrontWindow()) {
                MyDoContentClick(theEvent,
                theWindow, &onItem);
                if (onItem && WaitMouseMoved(theEvent)) {
                    result = MyDoStartDrag(theEvent, theWindow);
                }
            } else {
                SelectWindow(theWindow);
            }
        case . . .
    }
    return(result);
}
```

The function MyDoMouseDown above shows a simplified mouse down event service routine. Only the code for handling an inContent part code from FindWindow is shown. The MyDoContentClick function either selects, extends the selection or deselects an item in the application's document window. The onItem parameter it returns is true if the mouse down event occurred on a draggable item. The routine then calls WaitMouseMoved, which is a Drag Manager function that waits for the mouse button to be released or the mouse to move from its mouse down location. It returns true if the mouse moved. The MyDoStartDrag function, which is listed below, is called if the user gestures to start a drag.

```
OSErr MyDoStartDrag(EventRecord *theEvent, WindowPtr theWindow)
{   OSErr          result;
    DragReference  theDrag;
    if (result = NewDrag(&theDrag, (long) theWindow)) {
        return(result);
    }
    if (result = MyDoAddFlavors(theWindow, theDrag)) {
        DisposeDrag(theDrag);
        return(result);
    }
    return(TrackDrag(theDrag));
}
```

The MyDoStartDrag function above first creates a new drag by calling the NewDrag function. It then calls the MyDoAddFlavors function, which is defined below, to add the application's drag item flavors to the drag. Finally, TrackDrag is called to perform the drag.

To add drag item flavors to a drag, the AddFlavor functions are used. The AddFlavor functions require a drag reference number to add the flavor to. The application program also provides an item reference number when adding flavors. The handlers may specify any item reference numbers when adding items. The same item number is used for adding flavors to the same drag item. Using a different item number results in a new item being created.

```
OSErr MyDoAddFlavors(WindowPtr theWindow,
DragReference theDrag)
{   MyDocumentItem *theItem;
    theItem = GetFirstSelectedItem(theWindow);
```

```
    while (theItem) {
        AddDragItemtFlavor(theDrag, theItem, 'MOOF',
            (Ptr) *(theItem->dataHandle),
            GetHandleSize(theItem->dataHandle), 0);
        AddDragItemFlavor(theDrag, theItem, 'TEXT',
        (Ptr) 0L, 0L, 0);
        if (theItem->hasStyles) {
            AddDragItemFlavor(theDrag, theItem, 'styl',
            (Ptr) 0L, 0L, 0);
        }
        AddDragRegionFlavor(theDrag, theItem, theItem->region);
        theItem = theItem->nextSelectedItem;
    }
}
```

The MyDoAddFlavors function shown above uses the Drag Manager's AddFlavor functions to add three or four flavors to the drag for each item that is selected in the window.

The first call to AddDragItemFlavor uses the document item pointer as the drag item reference number. Since this is the first flavor added to the drag, a new drag item is created with that item number. The first flavor for the item is the application's own internal data type 'MOOF'. A pointer to the data and the data's size is also passed to the AddDragItemFlavor function.

The second call to AddDragItemFlavor uses the same document item pointer as the drag item reference number. Since this is the same item number as the last call, the second flavor is added to the same drag item. This flavor is of type 'TEXT'. Suppose that an application does not want to create the plain text data unless this flavor is specifically requested by the receiver of a drag. A NIL pointer and zero size is passed to AddDragItemFlavor. By passing NIL, the Drag Manager will call this application DragSendProc to get the data later, if needed.

In this example, an item in the selection may have text styles (such as bold or italic characters), and if it does, it also adds a 'styl' flavor. Again, the same item number is used to add the flavor to the same drag item. The flavor data is not provided; it will only be created if needed.

Finally, AddDragRegionFlavor is called to add the item's drag region to the item. This region is given in global coordinates. The Drag Manager uses this region to drag the dotted outline of the drag on the screen. The receiver may want to get the region to determine where to place the contents of the item.

The MyDoAddFlavors function loops to the next selected item in its list. When it adds the flavors for the next item, it will be using a different item number (since the address of the next item is guaranteed to be different), which will result in a new drag item being created.

Figure 24:
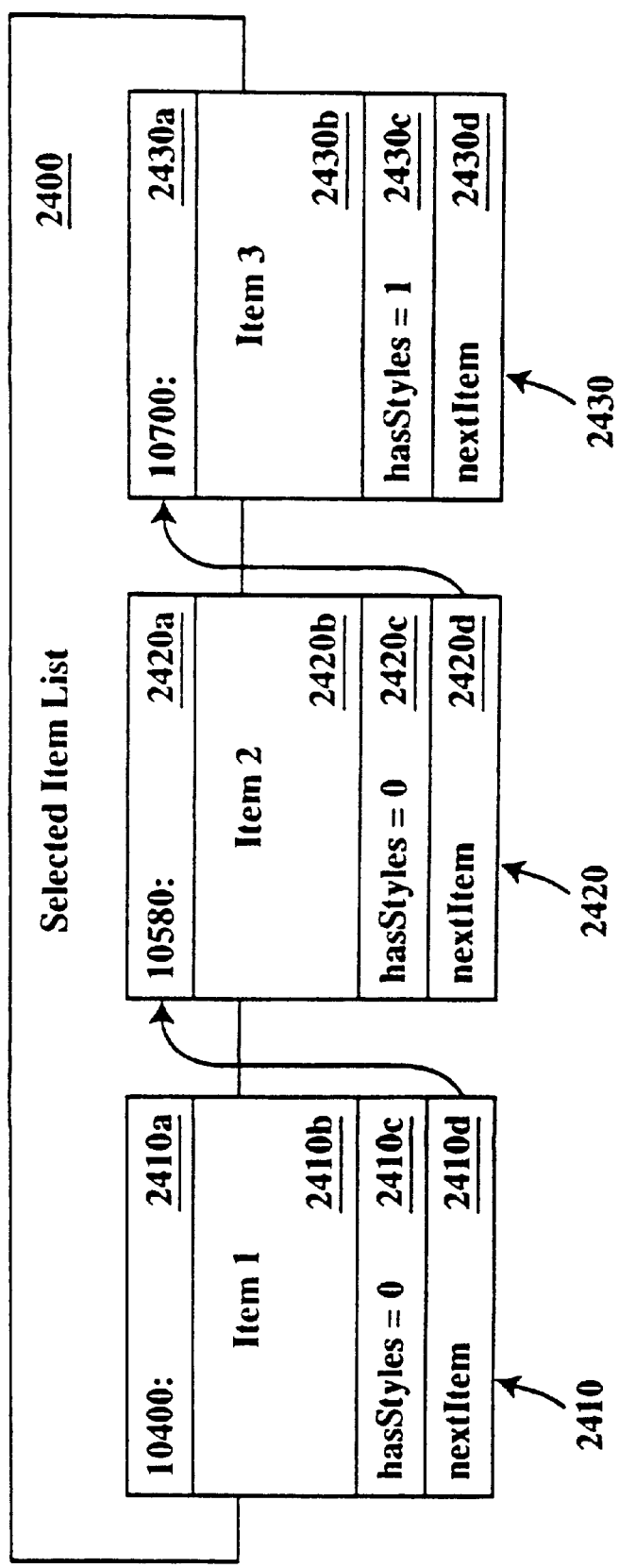
FIG. 24 shows a graphical representation of the data structure used for maintaining a list of selected items for a drag operation.
Figure 25:
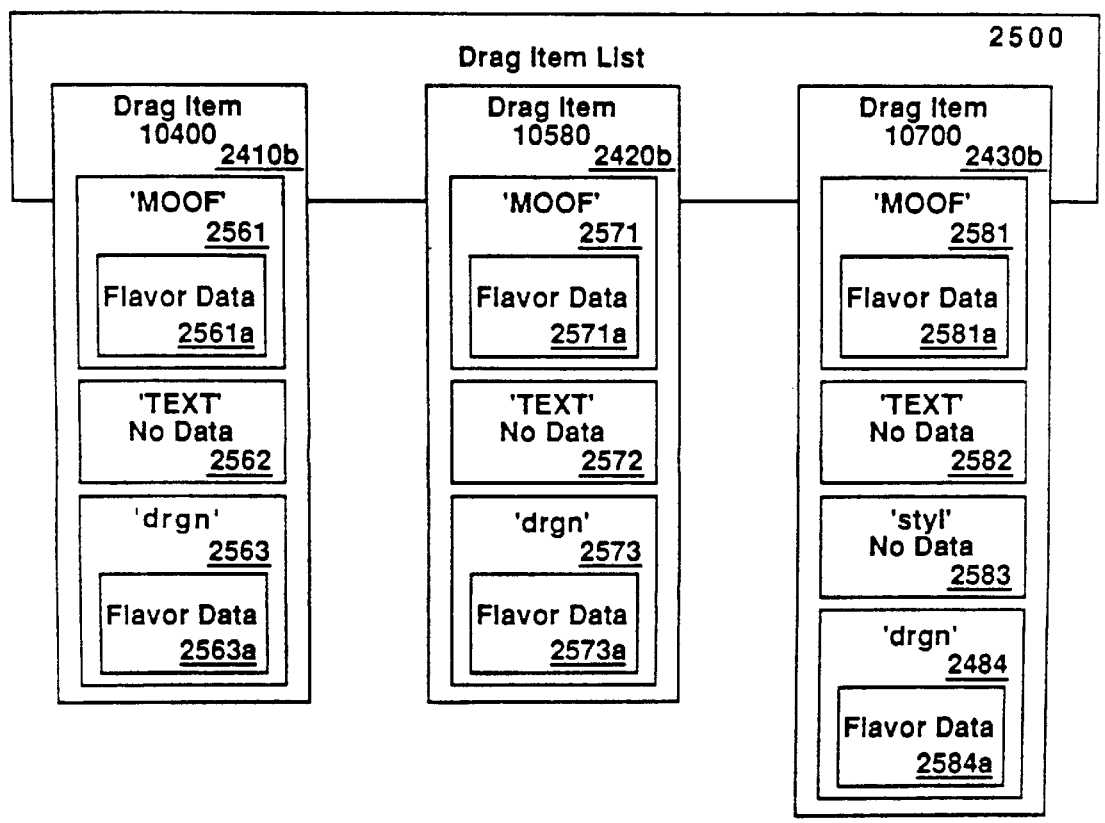
FIG. 25 shows an example of a series of drag items placed into a drag item list for use during a drag-and-drop operation.

To illustrate the effect of calling the MyDoAddFlavors function defined above, FIGS. 24 and 25 show an example list of selected items and the resulting drag items and drag item flavors.

For example, as each item is selected, it is added to a linked list, as is illustrated by 2400 in FIGS. 24. For example, as each item in windows are selected, drag items are acted to a selected item list, such as 2400 illustrated in FIG. 24. As each item is selected, a datum is added, such as 2410, 2420, and 2430, to the selected item list 2400. Each item contains four fields, each representing different portions of the item being selected. A first field (e.g., 2410a, 2420a, and 2430a) contains an integer representing a reference drag item number. A second field (e.g., 2410b, 2420b, and 2430b) contains the actual item information, which is shown in more detail below with reference to FIG. 25. 2410c contains an integer value representing a number of styles which are added in addition to a specific flavor of type 'TEXT.' As shown, only 2430c has a value that is non-zero, indicating that one additional flavor type is promised by the sending process. 2410d, 2420d, and 2430d each contain references to the next drag item in the list with the last drag item pointer 2430d containing the pointer NIL indicating that no other drag items are being dragged and tracked by the Drag Manager.

A more detailed view of the drag items in a drag item list, such as 2500, is illustrated in FIG. 25. For example, drag item 2410b contains three flavors, 'MOOF' 2561, 'TEXT' 2562, and 'drgn' 2563. Because the application was able to create flavor data 2561a of type 'MOOF,' field 2561 contains a flavor data field 2561a. The data type of type 'TEXT' was not able to be created at the time of the drag, so a Drag-SendProc would need to be invoked in order for the sending application to provide that data to the receiver. Lastly, 2563 contains a drag region so that the Drag Manager may keep track and provide visual feedback to the user of the dotted drag item region while the drag is taking place across the user interface display. This flavor data is provided in field 2563a, which is a bitmap representation of the item as created by the sending application program's handler. Similarly, drag items 2420b and 2430b contain similar fields, with the exception that drag item 2430b contains an additional flavor type of type 'styl' in field 2583, which might be made available to the receiving application upon the detection of the release of the selection device (e.g., a mouse-up event), as detected by the Drag Manager.

The Drag Manager also provides two additional AddFlavor routines. They are AddHFSFlavor, which adds an HFS-Flavor record given an FSSpec record, and AddAEFlavor, which adds the data contained within an AEDesc record, using the descriptor's data type as the flavor type.

Tracking a Drag

After creating a new drag with NewDrag, adding drag item flavors to the drag by using the AddFlavor functions, and starting the drag with TrackDrag, the Drag Manager proceeds by tracking the drag until the user releases the mouse button.

During the drag, as the user moves the mouse on the screen, searching for a destination for the drag items, the Drag Manager sends a sequence of tracking messages to the tracking handlers that are registered for the window that the mouse is over.

A tracking handler can inspect the drag item flavors contained in a drag and highlight the application's windows or part of an application's windows in response to data that the application can accept.

The next code segment shows an example of a very simple tracking handler. This tracking handler highlights the window if any of the drag items contains either the application's 'MOOF' flavor or the 'TEXT' flavor. It also calls an application defined function MyTrackItemUnderMouse that could be defined to highlight other parts of the window as the mouse moves through the window.

```
OSErr MyTrackingHandler(short theMessage, Point mouse,
WindowPtr theWindow,
    GlobalsPtr myGlobals, DragReference theDrag)
{
    switch(theMessage) {
        case kDragEnterHandlerMessage:
            myGlobals->canAcceptDrag =
            IsMyTypeAvailable(theDrag);
            break;
        case kDragEnterWindowMessage:
            if (myGlobals->canAcceptDrag) {
                ShowDragHilite(theDrag,
                    ((WindowPeek) theWindow)->contRgn, true);
```

```
            }
            break;
        case kDragInWindowMessage:
            if (myGlobals->canAcceptDrag) {
                MyTrackItemUnderMouse(mouse, theWindow);
            }
            break;
        case kDragLeaveWindowMessage:
            if (myGlobals->canAcceptDrag) {
                HideDragHilite(theDrag);
            }
            break;
        case kDragLeaveHandlerMessage:
            myGlobals->canAcceptDrag = false;
            break;
    }
}
```

The MyTrackingHandler function defined above switches on the given message from the Drag Manager. If the message is kDragEnterHandlerMessage, the routine calls the application's IsMyTypeAvailable function, which is defined below, that returns either true or false, depending on whether or not a type is available that the application window can accept. The result of this function is stored in the application's global variable canAcceptDrag.

When MyTrackingHandler received the kDragEnterWindowMessage message, it checks its global canAcceptDrag to determine if the window can accept the drag. If it can, the Drag Manager utility function ShowDragHilite is called to highlight the window.

When the kDragInWindowMessage message is received, if the window can accept the drag, the application's MyTrackItemUnderMouse is called. Presumably, MyTrackItemUnderMouse would use the mouse coordinate given by the Drag Manager to determine if the mouse is over an object that must also be highlighted.

When the kDragLeaveWindowMessage message is received, if the window can accept the drag, the Drag Manager utility function HideDragHilite is called to remove the window highlighting.

Finally, when the kDragLeaveHandlerMessage message is received, the application's global canAcceptDrag is reset to false.

To determine what drag item flavors are available, an application calls routines in the Drag Manager known as CountDragItems, GetItemReferenceNumber, CountDragItemFlavors, GetFlavorType and GetFlavorFlags functions to determine how many drag items there are, return an item's reference number (e.g., stored in field 2410a), determine how many drag item flavors there are in a drag item, return a drag item flavor's type (e.g., stored in flavor 2561), and the flags identifying the attributes of a flavor.

The next code segment shows the IsMyTypeAvailable function which demonstrates the use of these functions.

```
Boolean IsMyTypeAvailable(DragReference theDrag)
{   short           items, index, result;
    long            flavorFlags;
    ItemReference   itemID;
    CountDragItems(theDrag, &items);
    for (index= 1; index<= items; index++) {
        GetItemReferenceNumber(theDrag, index, &itemID);
        result = GetFlavorFlags(theDrag, itemID, 'MOOF',
            &flavorFlags);
        if ((result == noErr) && (flavorFlags & kFlavorAvailable))
            return(true);
```

```
        result = GetFlavorFlags(theDrag, itemID, 'TEXT',
            &flavorFlags);
        if ((result == noErr) && (flavorFlags & kFlavorAvailable))
            return (true);
    }
    return(false);
}
```

The IsMyTypeAvailable function defined above counts the number of items in the drag and begins a loop through each of the items. It returns true when it encounters the first item that contains either a 'MOOF' flavor or a 'TEXT' flavor, which are types (flavors) that this receiver can handle. The IsMyTypeAvailable function was used to determine if the application should highlight its window. In this manner, arbitration may be performed between sending and receiving handlers to test to determine if a type that the receiving application can receive.

After the user releases the mouse button, the Drag Manager proceeded to the data transaction stage to the finish the drag.

Finishing a Drag

When the user has chosen a final destination for the items being dragged, the Drag Manager calls any receive drop handlers installed on the destination window. An application program's receive drop handler is responsible for accepting the drag by transferring the information being dragged into the destination location.

A receive handler gets a pointer to the destination window, the handler's reference constant and the drag reference. The receive handler routine can call the CountDragItems, GetItemReferenceNumber, CountDragItemFlavors, GetFlavorType and GetFlavor-FLags functions to determine what data types (flavors) are included in the drag. The GetFlavorData function can be used to get flavor data from the sender that the receiver application desires.

The next code segment shows an example receive handler that attempts to receive a 'MOOF' type and if available inserts it into the destination file's data and then on the display. If there is no 'MOOF' flavor in the item, the handler checks to see if a 'TEXT' type is available. If TEXT is available in the item, the handler gets the 'TEXT' data and then also checks to see if a 'styl' type is available. If 'styl' is available, the handler get the 'styl' data also. The handler inserts the 'TEXT' data and optionally the 'styl' data into the destination file's data and then on the display.

```
pascal OSErr MyReceiveHandler(WindowPtr theWindow, unsigned
        long handlerRefCon,
        DragReference theDrag)
{   Point         mouse;
    short         items, index, result;
    long          flavorFlags, dataSize, stylSize;
    ItemReference itemID;
    Ptr           theData, theStyl;
    DragGetMouse(&mouse, 0L, theDrag);
    CountDragItems(theDrag, &items);
    for (index = 1; index <= items; index++) {
        GetItemReferenceNumber(theDrag, index, &itemID);
        //
        // First try to get type 'MOOF'.
        //
        result = GetFlavorFlags(theDrag, itemID, 'MOOF',
            &flavorFlags);
        if ((result == noErr) && (flavorFlags & kFlavorAvailable)) {
            // Determine the size of the 'MOOF' data
            dataSize = 0;
            GetFlavorData(theDrag, itemID, 'MOOF',
                0L, &dataSize, 0L);
            // Allocate space for the 'MOOF' data
            theData = NewPtr(dataSize);
            // Get the 'MOOF' data
            GetFlavorData(theDrag, itemID, 'MOOF',
                theData, &dataSize, 0L);
            // Put the data into the destination location
            MyInsertDataAtPosition(theData, dataSize,
                mouse, theWindow);
            DisposePtr(theData);
        } else {
            //
            // Since there is no 'MOOF' type
            in the drag, try to get
            // 'TEXT' and possibly 'styl'.
            //
            result = GetFlavorFlags(theDrag, itemID, 'TEXT',
                &flavorFlags);
            if ((result == noErr) && (flavorFlags &
                kFlavorAvailable)) {
                // Determine the size of the 'TEXT' data
                dataSize = 0;
                GetFlavorData(theDrag, itemID, 'TEXT',
                    0L, &dataSize, 0L);
                // Allocate space for the 'TEXT' data
                theData = NewPtr(dataSize);
                // Get the 'TEXT' data
                GetFlavorData(theDrag, itemID, 'TEXT',
                    theData, &dataSize, 0L);
                // Check for 'styl' to accompany 'TEXT'
                theStyl = 0L;
                result = GetFlavorFlags(theDrag, itemID, 'styl',
                    &flavorFlags);
                    if (result == noErr) && (flavorFlags &
                        kFlavorAvailable)) {
                        // Determine the size of the 'styl' data
                        stylSize = 0;
                        GetFlavorData(theDrag, itemID, 'styl',
                            0L, &stylSize, 0L);
                        // Allocate space for the 'styl' data
                        theData = NewPtr(stylSize);
                        // Get the 'styl' data
                        GetFlavorData(theDrag, itemID, 'styl',
                            theStyl, &stylSize, 0L);
                    }
                MyInsertStylTextAtPoint(theData, dataSize,
                    theStyl, stylSize, mouse, theWindow);
                DisposePtr(theData);
                if (theStyl)
                    DisposePtr(theStyl);
            }
        }
    }
    return(noErr);
}
```

If the receiver of a drag requests a flavor, and if the sending application provided the flavor data to the Drag Manager when adding the flavor with one of the AddFlavor functions, the Drag Manager simply provides the data to the receiver.

If the sender did not provide the flavor data to the Drag Manager when adding the flavor, the Drag Manager calls the sender's DragSendProc to allow the sending application program to provide the data to the Drag Manager on demand.

The Drag Manager calls the DragSendProc with the requested flavor type, an optional acceptorDescriptor parameter, the handler's reference constant, and the item and drag reference numbers. The SetDragItemFlavorData function is used to provide the requested data to the Drag Manager in the DragSendProc.

```
pascal OSErr MySendDataProc(FlavorType theType, const AEDesc
        *acceptorDescriptor,
        unsigned long refCon, ItemReference theItem,
        DragReference theDrag)
{   OSErr     result;
    Document   *theDocument = (Document *) theItem;
    if (theType == 'TEXT') {
        SetDragItemFlavorData(theDrag, theItem, 'TEXT',
            MyGetSelectedTextPtr(theDocument),
            MyGetSelectedTextSize(theDocument));
    } else if (theType == 'styl') {
        SetDragItemFlavorData(theDrag, theItem, 'styl',
            MyGetSelectedStylPtr(theDocument),
            MyGetSelectedStylSize(theDocument));
    } else {
        return(badDragFlavorErr);
    }
    return(noErr);
}
```

The MySendDataProc function shown above provides both the 'TEXT' and 'styl' flavors to the Drag Manager. The routine uses the item reference number as a pointer to the application's Document data structure (this pointer was used when adding the drag item flavors with AddDragItemFlavor). This example routine calls several of its own routines that would presumably return the memory addresses and data sizes of both the selected text and the 'styl' data. The Drag Manager's SetDragItemFlavorData function is called to pass the requested data to the Drag Manager.

Drag Manager Variables and Routines

This section describes the Drag Manager's constants, data structures and routines.

The "Constants" section describes the constants received from the Drag Manager and used when calling Drag Manager routines. The "Data Structures" section shows the data structures used to refer to drags, drag items, drag item flavors and to special drag item flavor data. The "Drag Manager Routines" section describes Drag Manager routines for installing and removing drag handlers, creating and disposing of drag references, adding drag item flavors to a drag, providing drag callback routines, tracking a drag, getting drag item information, getting drag status information, window highlighting and Drag Manager related utilities. The "Application-Defined Routines" section describes the drag handler functions, the drag callback functions and the zoom callback function.

Constants

The constants described in this section are received from the Drag Manager and used when calling Drag Manager routines.

Flavor Flags

The following constants are used to provide additional attribute information about drag item flavors. These constants are used when calling the AddFlavor functions and can be obtained using the GetFlavorFlags function.

| #define kFlavorAvailable | 1 |
| #define kFlavorSenderOnly | 2 |
| #define kFlavorSenderTranslated | 4 |
| #define kFlavorTMTranslated | 8 |

Constant Descriptions:

kFlavorAvailable—Set if the flavor is available to the receiver of a drag.

kFlavorSenderOnly—Set if the flavor is only available to the sender of a drag. The flavor is visible only if the receiver is the same application as the sender.

kFlavorSenderTranslated—Set if the flavor data is translated by the sender. This attribute is useful if the receiver needs to determine if the sender is performing its own translation to generate this data type.

kFlavorTMTranslated—Set if the flavor data is provided by the Translation Manager. The Translation Manager is a second system service which is called during all drag operations and provides additional flavors and data, if needed, upon the performance of a drop by translating some flavor from the sender to one that the receiver can understand. In short, the Translation Manager adds flavors stored in the drag item and arbitrates between sender and receiver handlers at drop time where the data is translated. So, the sender makes promises about data in the form of flavors and so does the Translation Manager. If a flavor is requested by the receiver that only the Translation Manager can provide, then a translation is performed at drop time, and the receiver is notified when the data is ready to be received. Translation of data is provided in the manner provided in application Ser. No. 07/984,180, which is assigned to the assignee of the present invention. Although that application describes translation of files, the translation of discrete packets of data is performed in a similar manner. If this flavor is requested, the Drag Manager will obtain the required data type from the sender and then it will use the Translation Manager to provide the data that the receiver requested.

Drag Attributes

The following constants are used to provide additional attribute information about a drag that is in progress. The attribute flags provide information about the window and application that the drag is currently occurring in.

| #define kDragHasLeftSourceWindow | 1 |
| #define kDragIsInSourceApplication | 2 |
| #define kDragIsInSourceWindow | 4 |

Constant Descriptions:

kDragHasLeftSourceWindow—Set if the drag has not left the source window since the beginning of the drag. This flag is useful for providing window highlighting after the user has moved the mouse outside of the source window.

kDragIsInSourceApplication—Set if the drag is currently in any window that belongs to the application that started the drag.

kDragIsInSourseWindow—Set if the drag is currently in the same window that the drag started from.

Special Flavor Kinds

The following constants are used to identify special flavor kinds that are defined by the Drag Manager.

| #define kDragRegionFlavorKind | 'drgn' |
| #define kHFSFlavorKind | 'hfs' |

Constant Descriptions:

kDragRegionFlavorKind—The flavor kind for a drag region flavor. The Drag Manager uses drag region flavors to determine the shape of each drag item being dragged. The drag region flavor data is a region in global coordinates of the item being dragged (for example, s used in the Apple brand QuickDraw graphics routines). Drag region flavors are created by calling the AddDragRegionFlavor function.

kHFSFlavorKind—The flavor kind for an HFS (Hierarchical Filing System) file system object (e.g., a file being dragged). The Finder uses HFS flavors when dragging file system objects. The HFS flavor data is defined by the HFSFlavor structure defined below. HFS flavors are created by calling the AddHFSFlavor function.

Zoom Acceleration

The following constants are used when specifying a zoomAcceleration constant to either the ZoomRects or ZoomRegion functions.

| #define kZoomNoAccelerate | 0 |
| #define kZoomAccelerate | 1 |
| #define kZoomDecelerate | 2 |

Constant Descriptions:

kZoomNoAccelerate—linear interpolation is used for each frame of animation between the source and destination.

kZoomAccelerate—Increment the step size for each frame of animation between the source and destination. This option produces the visual appearance of the animation speeding up as it approaches the destination.

kZoomDecelerate—Decrement the step size for each frame of animation between the source and destination. This option produces the visual appearance of the animation slowing down as it approaches the destination.

Data Structures

This section describes the data structures that are called to identify drags, drag items, drag item flavors and special drag item flavor data by application programs.

Drag Reference

The Drag Reference is a reference to a drag object. Before calling any other Drag Manager routine, a new Drag Reference must be first created by calling the NewDrag function. The Drag Reference that is returned by NewDrag is used in all subsequent calls to the Drag Manager. The DisposeDrag function is used to dispose of a Drag Reference after it is finished being used.

typedef unsigned long DragReference;

Drag Item Reference

The Drag Item Reference is a reference number used to refer to a single item in a drag. Drag Item Reference numbers are created by the sender application when adding drag item flavor information to a drag. Drag Item Reference numbers are created by and are only be interpreted by the sender application.

typedef unsigned long ItemReference;

Flavor Type

The Flavor Type is a four character type that describes the format of drag item flavor data. The Flavor Type has the same function as a scrap type; it designates the format of the associated data. Any scrap type, resource type or even AppleEvent brand descriptor type may be used.

Four character types consisting of only lower-case letters are reserved by Apple. A unique type can be guaranteed by using the registered application signature.

typedef ResType FlavorType;

HFS Drag Item Flavor Record

The Drag Manager defines a special data flavor for dragging file system objects. The BFS (Hierarchical Filing System) drag item flavor is used when dragging documents (e.g., files) and folder (e.g., directory) icons in the Finder. The HFS drag item flavor record is defined by the HFSFlavor data type.

An HFS drag item flavor is added to a drag by the sending application program by using the AddHFSFlavor function.

```
typedef struct HFSFlavor {
    OSType          fileType;      // file type
    OSType          fileCreator;   // file creator
    unsigned short  fdFlags;       // Finder flags
    FSSpec          fileSpec;      // file system specification
} HFSFlavor;
```

Field Descriptions:

fileType—The file type of the object.

fileCreator—The file creator of the object.

fdFlags—The Finder flags of the object (Finder flags are defined in the "Finder Interface" chapter of the publication "Inside Macintosh").

fileSpec—The FSSpec record for the object.

Drag Manager Routines

This section describes the Drag Manager routines are used to start a drag from an application program, gain control when the user drags an object into one of the application's windows, support the drag and drop user interface and to send and receive data as part of a drop transaction.

Installing and Removing Drag Handler Routines

The Drag Manager is called to install or remove handler routines for an entire application program or for one of an application program's windows. The Drag Manager provides a pair of install/remove functions for each handler type.

InstallTrackingHandler

The InstallTrackingHandler function is used to install a tracking handler routine for the Drag Manager to use while the user drags through an application's windows. The tracking handler provides feedback in windows controlled by the application program.

pascal OSErr InstallTrackingHandler
    (DragTrackingHandler theTrackingHandler, WindowPtr theWindow, unsigned long handlerRefCon);

theTrackingHandler—Pointer to a DragTrackingHandler routine.

theWindow—A pointer to the window to install the drag tracking handler for. When the cursor moves into this window during a drag, the Drag Manager sends tracking messages to the application program's handler routine. If this parameter is NIL, the given handler will be installed in the default handler space for the application (the handler is active for all windows in the application).

handlerRefCon—A reference constant that will be forwarded to the application program's drag tracking handler routine when it is called by the Drag Manager.

The InstallTrackingHandler function installs a tracking handler for one of the application's windows. Installing a tracking handler allows the application to track the user's movements through the application's windows during a drag. More than one drag tracking handler may be installed on a single window.

The Drag Manager sequentially calls all of the drag tracking handlers installed on a window when the user moves the cursor over that window during a drag.

By specifying a value of NIL in theWindow, the tracking handler is installed in the default handler space for the application. Drag tracking handlers installed in this way are called when the user moves the mouse over any window that belongs to the application.

Multiple drag handler routines of the same kind may be installed for the same window to determine if subwindows, etc. may handle the data promised in the drag item(s) and handle highlighting of destinations, such as subwindows, etc., to provide feedback to the user. Each drag handler routine will be called in the chain until a handler handles the requested task.

Result Codes:

| noErr | 0 | No error |
|---|---|---|
| paramErr | −50 | Parameter error |
| memFullErr | −108 | Not enough memory |
| handlerExistsErr | −1860 | Handler already exists |

InstallReceiveHandler

The InstallReceiveHandler function is used to install a receive drop handler routine for the Drag Manager to use when the user releases the mouse button while dragging over one of the application's windows. This routine will allow data to be accepted by the destination application.

pascal OSErr InstallReceiveHandler
        (ReceiveDropHandler theReceiveHandler, WindowPtr
          theWindow, unsigned long handlerRefCon);

theReceiveHandler—Pointer to a ReceiveDropHandler routine.

theWindow—A pointer to the window to install the receive drop handler for. When a drop occurs over (e.g., mouseUp event following a drag) this window, the Drag Manager calls this routine to allow the application to accept the drag. If this parameter is NIL, the given handler will be installed in the default handler space for the application (the handler will be called if a drop occurs in any window in the application).

handlerRefCon—A reference constant that will be forwarded to the application program's receive drop handler routine when it is called by the Drag Manager.

The InstallReceiveHandler function installs a receive drop handler for one of the application's windows. Installing a receive handler allows the application to accept a drag by getting drag item flavor data from the Drag Manager when the user releases the mouse button while dragging over one of the application's windows. More than one receive drop handler may be installed on a single window.

The application program may install multiple drag handler routines of the same kind for the same window to allow multiple subwindows, etc. in the application to receive data. Each drag handler routine in the chain will be called until a handler handles the requested task.

The Drag Manager sequentially calls all of the receive drop handlers installed on a window when a drop occurs in that window until a handler handles the requested task.

By specifying a value of NIL in theWindow, the receive drop handler is installed in the default handler space for the application. Receive drop handlers installed in this way are called when a drop occurs in any window that belongs to the application.

Result Codes:

| noErr | 0 | No error |
|---|---|---|
| paramErr | −50 | Parameter error |
| memFullErr | −108 | Not enough memory |
| handlerExistsErr | −1860 | Handler already exists |

InstallConstrainHandler

The InstallConstrainHandler function is used to install a constrain mouse handler routine for the Drag Manager to use when the user releases the mouse button while dragging over one of the application's windows.

pascal OSErr InstallConstrainHandler
        (DragConstrainHandler theConstrainHandler, WindowPtr theWindow, unsigned long handlerRefCon);

theConstrainHandler—Pointer to a DragConstrainHandler routine.

theWindow—A pointer to the window to install the constrain mouse handler for. When the cursor is over this window, the Drag Manager calls this routine to allow the mouse coordinates to be constrained by the application. If this parameter is NIL, the given handler will be installed in the default handler space for the application (the handler will be called for all windows in the application).

handlerRefCon—A reference constant that will be forwarded to the application program's constrain mouse handler routine when it is called by the Drag Manager.

The InstallConstrainHandler function installs a constrain mouse handler for one of the application's windows. Installing a constrain mouse handler allows the application to constrain the dragging movement to any degree of freedom that a user chooses (such as horizontal, vertical or grid movement). More than one constrain mouse handler may be installed on a single window.

The Drag Manager sequentially calls all of the constrain mouse handlers installed on a window when the user moves the cursor over that window during a drag.

By specifying a value of NIL in theWindow, the constrain mouse handler is installed in the default handler space for the application. Constrain mouse handlers installed in this way are called when the user moves the mouse over any window that belongs to the application.

Result Codes:

| noErr | 0 | No error |
|---|---|---|
| paramErr | −50 | Parameter error |
| memFullErr | −108 | Not enough memory |
| handlerExistsErr | −1860 | Handler already exists |

RemoveTrackingHandler

The RemoveTrackingHandler function is used to remove a tracking handler routine from one of the application's windows.

pascal OSErr RemoveTrackingHandler
        DragTrackingHandler theTrackingHandler, WindowPtr
          theWindow);

theTrackingHandler—Pointer to a DragTrackingHandler routine.

theWindow—A pointer to the window to remove the drag tracking handler from. If this parameter is NIL, the given handler will be removed from the default handler space for the application.

The RemoveTrackingHandler function removes a drag tracking handler from one of the application's windows.

By specifying a value of NIL in theWindow, the tracking handler is removed from the default handler space for the application (e.g., the chain).

Result Codes:

| noErr | 0 | No error |
|---|---|---|
| paramErr | −50 | Parameter error |
| memFullErr | −108 | Not enough memory |
| handlerNotFoundErr | −1861 | Drag handler could not be found |

RemoveReceiveHandler

The RemoveReceiveHandler function is used to remove a receive drop handler routine from one of the application's windows.

pascal OSErr RemoveReceiveHandler
        (ReceiveDropHandler theReceiveHandler, WindowPtr
          theWindow);

theReceiveHandler—Pointer to a ReceiveDropHandler routine.

theWindow—A pointer to the window to remove the receive drop handler from. If this parameter is NIL, the given handler will be removed from the default handler space for the application.

The RemoveReceiveHandler function removes a receive drop handler from one of the application's windows.

By specifying a value of NIL in theWindow, the receive drop handler is removed from the default handler space for the application.

Result Codes:

| noErr | 0 | No error |
|---|---|---|
| paramErr | −50 | Parameter error |
| memFullErr | −108 | Not enough memory |
| handlerNotFoundErr | −1861 | Drag handler could not be found |

RemoveConstrainHandler

The RemoveConstrainHandler function is used to remove a constrain mouse handler routine from one of the application's windows.

pascal OSErr RemoveConstrainHandler
   (DragConstrainHandler theConstrainHandler, WindowPtr theWindow);

theConstrainHandler—Pointer to a DragConstrainHandler routine.

theWindow—A pointer to the window to remove the constrain mouse handler from. If this parameter is NIL, the given handler will be removed from the default handler space for the application.

The RemoveConstrainHandler function removes a constrain mouse handler from one of the application's windows.

By specifying a value of NIL in theWindow, the constrain mouse handler is removed from the default handler space for the application.

Result Codes:

| noErr | 0 | No error |
|---|---|---|
| paramErr | −50 | Parameter error |
| memFullErr | −108 | Not enough memory |
| handlerNotFoundErr | −1861 | Drag handler could not be found |

Creating and Disposing of Drag References

A drag reference is created whenever an application wishes to start a drag. The drag reference is a token that used in all subsequent calls to Drag Manager routines to refer to a particular drag.

NewDrag

The NewDrag function is used to create a new drag reference token.

pascal OSErr NewDrag (DragReference *theDragRef, unsigned long senderRefCon);

theDragRef—The drag reference, which NewDrag fills in before returning.

senderRefCon—A reference constant that will be forwarded to an application program's drag handler routines when they are called by the Drag Manager. This constant is used to pass any data that is wished to be forwarded to the application program's handler routines.

The NewDrag function allocates a drag object in the Drag Manager and returns a drag reference token in the theDrag parameter. This drag reference is used in subsequent calls to the Drag Manager to identify the drag. This drag reference is required when adding drag item flavors and calling TrackDrag. All of the application program's installed drag handlers receive this drag reference so other Drag Manager routines can be called within the application program's drag handlers.

Result Codes:

| noErr | 0 | No error |
|---|---|---|
| paramErr | −50 | Parameter error |
| memFullErr | −108 | Not enough memory |

DisposeDrag

The DisposeDrag function is used to dispose of a drag reference token and its associated data when a drag has been completed or if the drag is no longer needed.

pascal OSErr DisposeDrag (DragReference theDragRef);

theDragRef—The drag reference of the drag object to dispose of.

The DisposeDrag function disposes of the drag object that is identified by the given drag reference token. If the drag reference contains drag item flavors, the memory associated with the drag item flavors is disposed of as well.

DisposeDrag should be called after a drag has been performed using TrackDrag or if a drag reference was created but is no longer needed.

Result Codes:

| noErr | 0 | No error |
|---|---|---|
| paramErr | −50 | Parameter error |
| badDragRefErr | −1851 | Unknown drag reference |
| dragInUseErr | −1853 | Drag reference is in use |

Providing Drag Callback Procedures

Drag callback procedures are provided to the Drag Manager when a user wants to override the default behavior of the Drag Manager. A user can override the mechanisms in the Drag Manager that provide data to a drop receiver, that samples the mouse and keyboard and that draws the standard "dotted outline" drag feedback.

SetDragSendProc

The SetDragSendProc function is used to set the send data procedure for the Drag Manager to use with a particular drag.

pascal OSErr SetDragSendProc (DragReference theDragRef, DragSendDataProc theSendProc, unsigned long theRefCon);

theDragRef—The drag reference that SetDragSendProc will set the drag send procedure for.

theSendProc—The send data routine that will be called by the Drag Manager when the receiver of a drop requests the flavor data of a flavor that has not been cached by the Drag Manager.

theRefCon—A reference constant that will be forwarded to the application program's drag send procedure when it is called by the Drag Manager. This constant is used to pass any data that is wished to be forwarded to the application program's drag send procedure.

The SetDragSendProc function sets the drag send procedure for the given drag reference. A drag's drag send procedure is called by the Drag Manager when the receiver of a drop requests the data of a flavor and the requested flavor data is not currently cached by the Drag Manager.

The Drag Manager caches drag item flavor data when the flavor was added to a drag by calling AddDragItemFlavor. If NIL is passed to AddDragItemFlavor as the data pointer, the flavor data is not cached and the Drag Manager will attempt to cache the data by calling the drag send procedure.

A drag send procedure is not needed if the application never passes NIL to AddDragItemFlavor when adding a drag item flavor to a drag.

Result Codes:

| noErr | 0 | No error |
|---|---|---|
| paramErr | −50 | Parameter error |

SetDragInputProc

The SetDragInputProc function is used to set the drag input procedure for the Drag Manager to use with a particular drag.

pascal OSErr SetDragInputProc (DragReference theDragRef, DragInputProc theInputProc, unsigned long theRefCon);

theDragRef—The drag reference that SetDragInputProc will set the drag input procedure for.

theInputProc—The drag input routine that will be called by the Drag Manager whenever the Drag Manager requires the location of the mouse, the state of the mouse button and the status of the modifier keys.

theRefCon—A reference constant that will be forwarded to the application program's drag input procedure when it is called by the Drag Manager. This constant is used to pass any data that is to be forwarded to the application program's drag input procedure.

The SetDragInputProc function sets the drag input procedure for the given drag reference. A drag's drag input procedure is called by the Drag Manager whenever the Drag Manager requires the location of the mouse, the state of the mouse button and the status of the modifier keys on the keyboard. The Drag Manager typically calls this routine once per cycle through the Drag Manager's main drag tracking loop.

The application program's drag input procedure may either modify the current state of the mouse and keyboard to slightly alter dragging behavior or entirely replace the input data to drive the drag completely by itself.

Result Codes:

| noErr | 0 | No error |
|---|---|---|
| paramErr | −50 | Parameter error |

SetDragDrawingProc

The SetDragDrawingProc function is used to set the drag drawing procedure for the Drag Manager to use with a particular drag.

pascal OSErr SetDragDrawingProc (DragReference theDragRef, DragDrawingProc theDrawingProc, unsigned long theRefCon);

theDragRef—The drag reference that SetDragDrawingProc will set the drag drawing procedure for.

theDrawingProc—

The drag drawing routine that will be called by the Drag Manager to draw, move and hide the "dotted outline" drag feedback on the screen during a drag.

theRefCon—A reference constant that will be forwarded to the application program's drag drawing procedure when it is called by the Drag Manager. This constant is used to pass any data that is wished to be forwarded to the application program's drag drawing procedure.

The SetDragDrawingProc function sets the drag drawing procedure for the given drag reference. A drag's drag drawing procedure is called by the Drag Manager when the Drag Manager needs to draw, move or hide the "dotted outline" drag feedback on the screen.

The application program's drag drawing procedure can implement any type of drag feedback, such as dragging a bitmap of the object being dragged.

Result Codes:

| noErr | 0 | No error |
|---|---|---|
| paramErr | −50 | Parameter error |

Adding Drag Item Flavors

The set of AddFlavor routines can be used to create drag items and to provide the data types for each item. Special AddFlavor routines can be used to add FSSpec flavors and to add the data contained within AEDesc records.

AddDragItemFlavor

The AddDragItemFlavor function is used to create drag items and to add a data flavor to a drag item.

pascal OSErr AddDragItemFlavor (DragReference theDragRef, ItemReference theItemRef, FlavorType theType, Ptr data, unsigned long dataSize short flavorFlags);

theDragRef—A drag reference.

theItemRef—The drag item reference to add the flavor to. New drag items are created by providing unique item reference numbers (e.g., those stored in fields 2561, 2562, etc. in FIG. 25). By using the same item reference number as in a previous call to AddDragItemFlavor, the flavor is added to an existing item. Any item reference number may be used when adding flavors to items.

theType—The data type of the flavor to add. This may be any four-character scrap, resource or AppleEvent type. The application's signature is used for a unique type for the application's own internal use.

data—A pointer to the flavor data.

dataSize—The size, in bytes, of the flavor data.

flavorFlags—A set of attributes to set for this flavor.

The AddDragItemFlavor function adds a drag item flavor to a drag item. A new drag item is created if the given item reference number is different than any other item reference numbers. When adding multiple flavors to the same item, supply the same item reference number.

In many cases it is easiest to use index numbers as item reference numbers (1, 2, 3 . . . ). Item reference numbers are only used as unique "key" numbers for each item. Item reference numbers do not need to be given in order nor must they be sequential. Depending on the application, it might be easier to use the user's own internal memory addresses as item reference numbers (as long as each item being dragged has a unique item reference number).

Sometimes it is useful to defer the creation of a particular data type until a receiver has specifically requested it (possibly if a lengthy translation is required). This can be done by passing NIL in the data parameter when adding a drag item flavor. Flavors that are added in this way will cause the Drag Manager to call the drag's send data procedure if the flavor is requested to get the data from the application.

All of the drag item flavors must be added to a drag before calling TrackDrag. Once TrackDrag is called, AddDragItemFlavor will return cantAddNewFlavorErr when attempting to add flavors to a drag that is in progress.

Result Codes:

| noErr | 0 | No error |
|---|---|---|
| paramErr | −50 | Parameter error |
| memFullErr | −108 | Not enough memory |
| badDragRefErr | −1851 | Unknown drag reference |
| flavorExistsErr | −1857 | Flavor already exists |
| cantAddNewFlavorErr | −1858 | Cannot add new flavor (drag is in progress) |

AddHFSFlavor

The AddHFSFlavor function is used to add an HFS (Hierarchical Filing System) drag item flavor to a drag.

pascal OSErr AddHFSFlavor (DragReference theDragRef, ItemReference theItemRef, FSSpec *fileSpec, unsigned long flavorFlags);

theDragRef—A drag reference.

theItemRef—The item reference to add the flavor to. A new item is created when a new item reference is given. By using the same item reference as a previously added flavor, the flavor is added to the same item.

fileSpec—A file system specification.

flavorFlags—A set of attributes to set for this flavor.

The AddHFSFlavor function adds an HFS (Hierarchical Filing System) flavor to the specified item within the given drag reference. AddHFSFlavor creates a HFSFlavor data structure and fills the structure's fields by calling FSpGetFInfo and then calls AddDragItemFlavor to add a flavor of type 'hfs'.

Result Codes:

| noErr | 0 | No error |
|---|---|---|
| nsvErr | −35 | No such volume |
| ioErr | −36 | I/O error |
| bdNamErr | −37 | Bad filename |
| fnfErr | −43 | File not found |
| paramErr | −50 | No default volume |
| memFullErr | −108 | Not enough memory |
| dirNFErr | −120 | Directory not found or incomplete pathname |
| badDragRefErr | −1851 | Unknown drag reference |
| flavorExistsErr | −1857 | Flavor already exists |
| cantAddNewFlavorErr | −1858 | Cannot add new flavor (drag is in progress) |
| afpAccessDenied | −5000 | User does not have the correct access |
| afpObjectTypeErr | −5025 | Directory not found or incomplete pathname |

AddAEFlavor

The AddAEFlavor function is used to add an AppleEvent descriptor as a drag item flavor.

pascal OSErr AddAEFlavor (DragReference theDragRef, ItemReference theItemRef, AEDesc theAEDesc, unsigned long flavorFlags);

theDragRef—A drag reference.

theItemRef—The item reference to add the flavor to A new item is created when a new item reference is given. By using the same item reference as a previously added flavor, the flavor is added to the same item.

fileSpec—An AppleEvent descriptor.

flavorFlags—A set of attributes to set for this flavor.

The AddAEFlavor function takes an AppleEvent descriptor record and adds a drag item flavor of the descriptor type containing the descriptor record's data.

Result Codes:

| noErr | 0 | No error |
|---|---|---|
| paramErr | −50 | Parameter error |
| memFullErr | −108 | Not enough memory |
| badDragRefErr | −1851 | Unknown drag reference |
| flavorExistsErr | −1857 | Flavor already exists |
| cantAddNewFlavorErr | −1858 | Cannot add new flavor (drag is in progress) |

AddDragRegionFlavor

The AddDragRegionFlavor function is used to add a drag region flavor to a drag item.

pascal OSErr AddDragRegionFlavor (DragReference theDragRef, ItemReference theItemRef, RgnHandle theRgn);

theDragRef—A drag reference.

theItemRef—The item reference to add the flavor to. A new item is created when a new item reference is given. By using the same item reference as a previously added flavor, the flavor is added to the same item.

theRgn—A region in global coordinates that is the outline of the drag item. The AddDragRegionFlavor function adds a drag region flavor to a drag item. The Drag Manager uses an item's drag region flavor to draw the "dotted outline" drag feedback for an item being dragged.

Every drag item should be given a drag region flavor. Without the drag region flavor, the Drag Manager is able to render the item on the screen during a drag.

Result Codes:

| noErr | 0 | No error |
|---|---|---|
| paramErr | −50 | No default volume |
| memFullErr | −108 | Not enough memory |
| badDragRefErr | −1851 | Unknown drag reference |
| flavorExistsErr | −1857 | Flavor already exists |
| cantAddNewFlavorErr | −1858 | Cannot add new flavor (drag is in progress) |

SetDragItemFlavorData

The SetDragItemFlavorData function is used to set the data contained within an existing flavor.

pascal OSErr SetDragItemFlavorData (DragReference theDragRef, ItemReference theItemRef, FlavorType theType, Ptr data, unsigned long dataSize);

theDragRef—A drag reference.

theItemRef—A drag item reference of the item that contains the flavor a user wishes to set the data for.

theType—The data type of the existing flavor to set the data for.

data—A pointer to the flavor data.

dataSize—The size, in bytes, of the flavor data.

The SetDragItemFlavorData function sets a given flavor's data. Data that was previously contained within a flavor is completely replaced by the data in the given data buffer.

This function is commonly used in a scenario where a flavor's data is not added to the flavor when the flavor is created using AddDragItemFlavor. Only after the drop receiver specifically requests the flavor is it necessary to provide the data using the SetDragItemFlavorData routine. This method is useful when the data needs to be translated by the sender and would be to expensive to compute the data until absolutely required.

This function, unlike the AddFlavor functions, may be called by an application's handler during a drag.

Result Codes:

| | | |
|---|---|---|
| noErr | 0 | No error |
| paramErr | −50 | Parameter error |
| memFullErr | −108 | Not enough memory |
| badDragRefErr | −1851 | Drag reference is unknown or invalid |
| badItemRefErr | −1852 | Item reference is unknown or invalid |
| badDragFlavorErr | −1855 | Drag flavor is unknown |

Performing a Drag

The TrackDrag function can be used to track a drag from within the application.

TrackDrag

The TrackDrag function is used to drag an object or collection of objects from the application.

pascal OSErr TrackDrag (const EventRecord *theEvent, DragReference theDragRef);

theEvent—The mouseDown event record that the application received that resulted in starting a drag.

theDragRef—A drag reference token to perform the drag operation with.

The TrackDrag function performs a drag operation given the mouseDown event and a drag reference token.

The Drag Manager follows the cursor on the screen with the "dotted outline" drag feedback and sends tracking messages to applications that have registered drag tracking handlers. The drag item flavor information that was added to the drag using the AddDragItemFlavor functions is available to each application that becomes active during a drag.

When the user releases the mouse button, the Drag Manager calls any receive drop handlers that have been registered on the destination window. An application's receive drop handler(s) are responsible for accepting the drag and transferring the dragged data into their application.

Result Codes:

| | | |
|---|---|---|
| noErr | 0 | No error |
| paramErr | −50 | Parameter error |
| dragInUseErr | −1853 | Drag reference is in use (already dragging) |
| dragInProgressErr | −1854 | Cannot start drag (a drag is in progress) |

Getting Drag Item Information

The Drag Manager provides a set of functions that allows a user to get information about the drag items and drag item flavors that have been added into a drag reference.

CountDragItems

The CountDragItems function is used to determine how many drag items are contained in a drag reference. This is used to obtain a particular drag item.

pascal OSErr CountDragItems (DragReference theDragRef, unsigned short *numItems);

theDragRef—A drag reference.

numItems—The CountDragItems function returns the number of drag items in the given drag reference in the numItems parameter.

The CountDragItems function returns the number of drag items in a drag reference in the numItems parameter.

Result Codes:

| | | |
|---|---|---|
| noErr | 0 | No error |
| paramErr | −50 | Parameter error |
| badDragRefErr | −1851 | Drag reference is unknown or invalid |

GetItemReferenceNumber

The GetItemReferenceNumber function is used to determine the item reference number of a specific item in a drag reference.

pascal OSErr GetItemReferenceNumber (DragReference theDragRef, unsigned short index, ItemReference *theItemRef);

theDragRef—A drag reference.

index—The index of an item in a drag reference to get the item reference number of.

theItemRef—The GetItemReferenceNumber function returns the item reference number of the item with the specified index in the theItemRef parameter.

The GetItemReferenceNumber function returns the item reference number of the item with the specified index in the theItemRef parameter.

If index is zero or larger than the number of items in the drag, paramErr is returned by GetItemReferenceNumber.

Result Codes:

| | | |
|---|---|---|
| noErr | 0 | No error |
| paramErr | −50 | Parameter error |
| badDragRefErr | −1851 | Drag reference is unknown or invalid |

CountDragItemFlavors

The CountDragItemFlavors function is used to determine how many drag item flavors are contained in a drag item in a drag reference. This is used to obtain a particular drag item by a handler.

pascal OSErr CountDragItemFlavors (DragReference theDragRef, ItemReference theItemRef, unsigned short *numFlavors);

theDragRef—A drag reference.

theItemRef—An item reference number.

numFlavors—The CountDragItemFlavors function returns the number of drag item flavors in the specified drag item in the numFlavors parameter.

The CountDragItemFlavors function returns the number of drag item flavors in the specified drag item in the numFlavors parameter.

Result Codes:

| | | |
|---|---|---|
| noErr | 0 | No error |
| paramErr | −50 | Parameter error |
| badDragRefErr | −1851 | Drag reference is unknown or invalid |
| badItemRefErr | −1852 | Item reference is unknown or invalid |

GetFlavorType

The GetFlavorType function is used to determine the type of a specific flavor in a drag item.

pascal OSErr GetFlavorType (DragReference theDragRef, ItemReference theItemRef, unsigned short index, FlavorType *theType);

theDragRef—A drag reference.

theItemRef—An item reference number.

index—The index of a flavor in the specified item to get the type of.

theType—The GetFlavorType function returns the type of the specified flavor in the theType parameter.

The GetFlavorType function returns the type of the specified flavor in the theType parameter.

Result Codes:

| | | |
|---|---|---|
| noErr | 0 | No error |
| paramErr | −50 | Parameter error |
| badDragRefErr | −1851 | Drag reference is unknown or invalid |
| badItemRefErr | −1852 | Item reference is unknown or invalid |
| badDragFlavorErr | −1855 | Drag flavor is unknown |

GetFlavorFlags

The GetFlavorFlags function is used to determine the attributes of a specific flavor in a drag item. This is used to determine if an application can accept a dragged item.

pascal OSErr GetFlavorFlags (DragReference theDragRef, ItemReference theItemRef, FlavorType theType, unsigned long *flavorFlags);
    theDragRef—A drag reference.
    theItemRef—An item reference number.
    theType—The flavor type of the flavor to get the attributes of.
    flavorFlags—The GetFlavorFlags function returns the attributes of the specified flavor in the flavorFlags parameter.

The GetFlavorFlags function returns the attributes of the specified flavor in the flavorFlags parameter.

Result Codes:

| | | |
|---|---|---|
| noErr | 0 | No error |
| paramErr | −50 | Parameter error |
| badDragRefErr | −1851 | Drag reference is unknown or invalid |
| badItemRefErr | −1852 | Item reference is unknown or invalid |
| badDragFlavorErr | −1855 | Drag flavor is unknown |

GetFlavorData

The GetFlavorData function is used to get the flavor data for a specific flavor in a drag item. This obtains the data for a specified flavor.

pascal OSErr GetFlavorData (DragReference theDragRef, ItemReference theItemRef, FlavorType theType, Ptr dataBuf, unsigned long *dataSize, AEDesc *acceptorDescriptor);
    theDragRef—A drag reference.
    theItemRef—An item reference number.
    theType—The flavor type of the flavor to get the flavor data from.
    dataBuf—Specifies where the GetFlavorData function should copy the requested flavor data. The application is responsible for allocating the memory for the flavor data and for setting the dataSize parameter to the number of bytes that has been allocated for the data. If the databufparameter points to an area of memory that is not large enough to hold all the data contained in the specified flavor, GetFlavorData returns as much data as the specified buffer memory area can hold, returns the amount of data remaining in the dataSize parameter, and returns the result code dragBufferIsSmallErr.
    dataSize—Contains the size of the data (in bytes) pointed to by the dataBuf parameter. If GetFlavorData returns the result code dragBufferIsSmallErr, the dataSize parameter contains the number of bytes remaining. GetFlavorData can be called again to receive the rest of the data.
    acceptorDescriptor—An optional AppleEvent description of the drop location that will be forwarded to the send data procedure that will be providing the requested flavor data.

The GetFlavorData function returns a flavor's data in a data buffer supplied by the application.

A buffer can be allocated to hold the flavor data and pass the number of allocated bytes to the GetFlavorData function. GetFlavorData will return that number of bytes of data and update the dataSize parameter to the amount of data bytes remaining in the flavor.

Result Codes:

| | | |
|---|---|---|
| noErr | 0 | No error |
| paramErr | −50 | Parameter error |
| badDragRefErr | −1851 | Drag reference is unknown or invalid |
| badItemRefErr | −1852 | Item reference is unknown or invalid |
| badDragFlavorErr | −1855 | Drag flavor is unknown |
| dragBufferIsSmallErr | −1856 | Specified buffer is too small to receive data |
| cantGetFlavorErr | −1859 | Error while trying to get flavor data |

Getting Drag Status Information

The Drag Manager provides a set of functions that allows a user to get information about a drag that is currently in progress.

DragGetFlags

The DragGetFlags function is used to get the current set of drag attribute flags.

pascal OSErr DragGetFlags (unsigned long *dragFlags, DragReference theDragRef);
    dragFlags—The DragGetFlags function returns the drag attribute flags for the given drag reference in the dragFlags parameter.
    theDragRef—A drag reference.

The DragGetFlags function returns the drag attribute flags for the given drag reference in the dragFlags parameter.

Result Codes:

| | | |
|---|---|---|
| noErr | 0 | No error |
| paramErr | −50 | Parameter error |
| badDragRefErr | −1851 | Drag reference is unknown or invalid |

DragGetMouse

The DragGetMouse function is used to get the current mouse and pinned mouse locations. This is used to determine whether given areas in a window should be highlighted.

pascal OSErr DragGetMouse (Point *mouse, Point *pinnedMouse, DragReference theDragRef);
    mouse—The DragGetMouse function returns the mouse location in the mouse parameter. The mouse location is given in global screen coordinates.
    pinnedMouse—The DragGetMouse function returns the pinned mouse location in the pinnedMouse parameter. The pinned mouse location is the mouse location that is being used to draw the "dotted outline" drag region in its current location. The pinnedMouse location is different than the mouse location only when the cursor approaches the edge of the screen and the drag region is "pinned" to the edge of the screen. The pinned mouse location is given in global screen coordinates.
    theDragRef—A drag reference.

The DragGetMouse function returns the mouse location in the mouse parameter and the pinned mouse location in the pinnedMouse parameter. All coordinates are given in global screen coordinates.

NIL may be passed into the mouse or pinnedMouse parameters if a user wishes to disregard either of these return values.

Calling DragGetMouse before using the drag in a TrackDrag call returns (0, 0) as both the mouse and pinnedMouse locations.

Result Codes:

| noErr | 0 | No error |
|---|---|---|
| paramErr | −50 | Parameter error |
| badDragRefErr | −1851 | Drag reference is unknown or invalid |

DragGetModifiers

The DragGetModifiers function is use to get the current set of keyboard modifiers.

pascal OSErr DragGetModifiers (short *modifiers, short *mouseDownModifiers, short *mouseUpModifiers, DragReference theDragRef);

modifiers—The DragGetModifiers function returns the current keyboard modifiers in the modifiers parameter.

mouseDownModifiers—The DragGetModifiers function returns the keyboard modifiers at mouseDown time in the mouseDownModifiers parameter.

mouseUpModifiers—The DragGetModifiers function returns the keyboard modifiers at the time of a mouseUp event in the mouseUpModifiers parameter.

theDragRef—A drag reference.

The DragGetModifiers function returns the set of modifier keys at the current time, at mouseDown time and at mouseUp time.

NIL may be passed into the modifiers, mouseDownModifiers or mouseUpModifiers parameters if a user wishes to disregard any of these return values.

NIL may be passed into any of the modifier parameters if a user wishes to disregard any of the return values of that parameter.

Calling DragGetModifiers before using the drag in a TrackDrag call returns zero in all of the modifier parameters. Calling DragGetModifiers during a drag, but while the drag is still tracking returns zero in the mouseUpModifiers parameter.

Result Codes:

| noErr | 0 | No error |
|---|---|---|
| paramErr | −50 | Parameter error |
| badDragRefErr | −1851 | Drag reference is unknown or invalid |

Window Highlighting Utilities

ShowDragHilite, HideDragHilite, and UpdateDragHilite functions can be used to highlight parts of the application's windows during a drag. The DragPreScroll and DragPostScroll functions can also be used if a user intends to scroll parts of the window that contain drag highlighting.

ShowDragHilite

The ShowDragHilite function is used to highlight an area of the window during a drag. The application program's tracking handler routine should call this if a drop is allowed at the current mouse position.

pascal OSErr ShowDragHilite (DragReference theDragRef, RgnHandle hiliteFrame, Boolean inside);

theDragRef—The drag reference of the drag currently in progress.

frame—A region of the frame of the window, pane, or shape a user wishes to highlight. This region should be in the window's local coordinate system.

inside—If true, the highlighting will be drawn inside the frame shape. Otherwise it will be drawn outside the frame shape. Note that in either case, the highlight will not include the boundary edge of the frame.

The ShowDragHilite procedure creates a standard drag and drop highlight in the window. Only one highlight can be shown at a time, and if this routine is called when a highlight is currently visible, the first one is removed before the newly requested highlight is shown.

The highlight that is drawn is defined by the hiliteFrame and inside parameters. The hiliteFrame is the defining region for the highlight, which is made by creating a two pixel outline either inset or outset from the region. The inside parameter determines whether the pixel outline is drawn on the inside of the region (if true), or outside of the region (if false). This allows easy highlighting inside a window frame or a pane, or to highlight outside of a container or object in the window.

ShowDragHilite assumes that the highlighting should be drawn in the current port. The application makes sure that the correct port is set before calling ShowDragHilite. Also, highlighting drawn by ShowDragHilite is clipped to the current port. Make sure that the port's clip region is appropriately sized to draw the highlighting.

The Drag Manager maintains the currently highlighted portion of the window if the HideDragHilite and UpdateDragHilite functions are used. If it is intended to scroll the window that contains the highlighting, the DragPreScroll and DragPostScroll functions can be used to properly update the drag highlighting. This is required because a scroll causes parts of frame highlighting to be eliminated.

Result Codes:

| noErr | 0 | No error |
|---|---|---|
| paramErr | −50 | Parameter error |
| memFullErr | −108 | Not enough memory |
| badDragRefErr | −1851 | Unknown drag reference |
| dragHiliteErr | −1870 | Highlight is invalid |

HideDragHilite

This routine removes highlighting created with the ShowDragHilite function.

pascal OSErr HideDragHilite (DragReference theDragRef);

theDragRef—The drag reference that is currently showing a drag highlight.

The HideDragHilite function is used to remove any highlighting from the window that was shown using the ShowDragHilite function.

HideDragHilite assumes that the highlighting should be erased from the current port. The application should make sure that the correct port is set before calling HideDragHilite. Also, highlighting erased by HideDragHilite is clipped to the current port.

Result Codes:

| noErr | 0 | No error |
|---|---|---|
| badDragRefErr | −1851 | Unknown drag reference |
| dragHiliteErr | −1870 | Highlight is invalid |

DragPreScroll

When scrolling part of the window when drag highlighting is showing, the DragPreScroll function is used to remove any drag highlighting that would be scrolled away from the hiliteFrame given to ShowDragHilite.

pascal OSErr DragPreScroll (DragReference theDragRef, short dH, short dV);

theDragRef—The drag reference.

dH—The horizontal distance intended to be scroll.

dV—The vertical distance intended to be scroll.

The DragPreScroll function prepares the window or pane for scrolling. This function is used if scroll part of the window using ScrollRect or CopyBits is planned.

Scrolling part of the window may inadvertently move part of the drag highlighting with it. DragPreScroll is optimized to remove from the screen only the parts of the highlighting that will be scrolled away from the hiliteFrame region. After calling DragPreScroll with the dH and dV that will be scrolled, a user can then scroll the window followed by a call to DragPostScroll which redraws any necessary highlighting after the scroll. The details of this procedure are discussed below.

If an offscreen port is used to draw the window into while scrolling, the HideDragHilite and ShowDragHilite functions should be used to preserve drag highlighting in the offscreen port. The DragScroll functions are optimized for onscreen scrolling.

Result Codes:

| noErr | 0 | No error |
| paramErr | −50 | Parameter error |
| memFullErr | −108 | Not enough memory |
| badDragRefErr | −1851 | Unknown drag reference |
| dragHiliteErr | −1870 | Highlight is invalid |

DragPostScroll

The DragPostScroll function is used to restore the drag highlight after scrolling part of the window using the Drag-PreScroll function.

pascal OSErr DragPostScroll (DragReference theDragRef);

theDragRef—The drag reference.

The DragPostScroll function restores the drag highlight after scrolling part of the window. This routine must be called following a call to DragPreScroll Result Codes:

| noErr | 0 | No error |
| paramErr | −50 | Parameter error |
| memFullErr | −108 | Not enough memory |
| badDragRefErr | −1851 | Unknown drag reference |
| dragHiliteErr | −1870 | Highlight is invalid |

UpdateDragHilite

The UpdateDragHilite function is used to update a portion of the drag highlight that was drawn over by the application.

pascal OSErr UpdateDragHilite (DragReference theDragRef, RgnHandle updateRgn);

theDragRef—The drag reference.

updateRgn—A region that needs to be updated. Typically the port's updateRgn.

The UpdateDragHilite function redraws the portion of the drag highlight which intersects the given updateRgn. This function is used if the application draws into the highlighted portion of the window during a drag. For example, dragging over a folder icon in the Finder causes the Finder to redraw the folder icon in its darkened (selected) color. The Finder calls UpdateDragHilite to redraw any portion of the drag highlight that may have intersected with the folder icon.

Result Codes:

| noErr | 0 | No error |
| paramErr | −50 | Parameter error |
| memFullErr | −108 | Not enough memory |
| badDragRefErr | −1851 | Unknown drag reference |
| dragHiliteErr | −1870 | Highlight is invalid |

Drag Manager Utilities

The WaitMouseMoved function can be used to determine after a mouseDown event if a drag should be started, the ZoomRects and ZoomRegion functions to provide "zooming" animation to provide destination or abort feedback. TEGetHiliteRgn is used to obtain the highlight region from a selection in a TextEdit record.

WaitMouseMoved

When the application receives a mouseDown event on a draggable object, call WaitMouseMoved to determine if dragging the object should begin.

pascal Boolean WaitMouseMoved (Point initialMouse);

initialMouse—The point where a mouseDown event occurred. The initialMouse location is given in global screen coordinates.

The WaitMouseMoved function waits for either the mouse to move from the given initialMouse location or for the mouse button to be released. If the mouse moves away from the initialMouse location before the mouse button is released, WaitMouseMoved returns true. If the mouse button is released before the mouse moved from the initialMouse location, WaitMouseMoved returns false.

ZoomRects

The ZoomRects function is used to animate a rectangle into a second rectangle. This routine is used to animate drag operations or abort feedback, and a flowchart shows the operation of ZoomRects( ) in more detail below.

pascal OSErr ZoomRects (const Rect *fromRect, const Rect *toRect, short zoomSteps, short zoomAcceleration, ZoomProc callback, void *callbackData);

fromRect—Specifies the starting rectangle to animate from, in global coordinates.

toRect—Specifies the ending rectangle to animate to, in global coordinates.

zoomSteps—Specifies the number of animation steps that are shown between the source and destination rectangles. The minimum number of zoomSteps is 4. If less than 4 are specified, 4 will be used. The maximum number of zoomSteps is 25. If more than 25 are specified, 25 will be used.

zoomAcceleraton—Specifies how the intermediate animation steps will be calculated. This function can accept the constants kZoomNoAccelerate, kZoomAccelerate, or kZoomDecelerate. Using kZoomNoAccelerate makes the distance between steps from the source to the destination equal. Using kZoomAccelerate makes each step from the source to the destination increasingly larger, making the animation appear to speed up as it approaches the destination. Using kZoomDecelerate makes each step from the source to the destination smaller, making the animation appear to slow down as it approaches the destination.

callback—A routine that will be called if there is extra processor time during the zoom. If idle time is not needed during the animation, NIL may be passed by the handler.

callbackData—A reference constant passed to the callback routine.

The ZoomRects function animates a movement between two rectangles on the screen. It does this by drawing gray dithered rectangles incrementally toward the destination rectangle. This was illustrated with reference to FIGS. 20a–20c.

ZoomRects draws on the entire screen, outside of the current port. It does not change any pixels on the screen after it has completed its animation. It also preserves the current port and the port's settings.

Each step of animation will occur no faster than once per Tick (one-sixtieth of a second). If ZoomRects completes an animation step in less than one Tick, ZoomRects calls the callback routine that can use the left over idle time.

Result Codes:

| noErr | 0 | No error |
|---|---|---|
| paramErr | −50 | Parameter error |

ZoomRegion

The ZoomRegion function is used to animate a region's outline from one screen location to another. This routine provides the same visual feedback that the Finder uses to "zoom" icons when performing a Clean Up operation.

pascal OSErr ZoomRegion (RgnHandle region, Point zoomDistance, short zoomSteps, short zoomAcceleration, ZoomProc callback, void *callbackData);

region—A region to animate.

zoomDistance—The horizontal and vertical distance from the starting point that the region will animate to.

zoomSteps—Specifies the number of animation steps that are shown between the source and destination regions. The minimum number of zoomSteps is 4. If less than 4 are specified, 4 will be used. The maximum number of zoomSteps is 25. If more than 25 are specified, 25 will be used.

zoomAcceleration—Specifies how the intermediate animation steps will be calculated. Can accept the constants kZoomNoAccelerate, kZoomAccelerate, or kZoomDecelerate. Using kZoomAccelerate makes the distance between steps from the source to the destination equal. Using kZoomAccelerate makes each step from the source to the destination increasingly larger, making the animation appear to speed up as it approaches the destination. Using kZoomDecelerate makes each step from the source to the destination smaller, making the animation appear to slow down as it approaches the destination.

callback—A routine that will be called if there is extra processor time during the zoom. If idle time is not needed during the animation, NIL may be passed. See the ZoomProc definition below for more details.

callbackData—A reference constant passed to the callback routine.

The ZoomRegion function animates a region from one location to another on the screen. It does this by drawing gray dithered regions incrementally toward the destination region.

ZoomRegion draws on the entire screen, outside of the current port It does not change any pixels on the screen after it has completed its animation. It also preserves the current port and the port's settings.

Each step of animation will occur no faster than once per Tick (one-sixtieth of a second). If ZoomRegion completes an animation step in less than one Tick, ZoomRegion calls the callback routine that can use the left over idle time.

Result Codes:

| noErr | 0 | No error |
|---|---|---|
| paramErr | −50 | Parameter error |

TEGetHiliteRgn

The TEGetHiliteRgn function is used to get the highlight region from the current selection in a TextEdit record.

pascal OSErr TEGetHiliteRgn (RgnHandle region, TEHandle hTE);

region—The TEGetHiliteRgn function computes the QuickDraw region of the current selection in the given TextEdit handle. This region is placed into the region parameter that has already been allocated. This region is in the window's local screen coordinates.

hTE—A TextEdit handle.

The TEGetHiliteRgn function returns in the region parameter the region of the current selection in the given TextEdit handle.

TEGetHiliteRgn does not allocate a new region. A new region must be created with NewRgn before calling TEGetHiliteRgn Also, the previous contents of the given are completely replaced by the TextEdit selection region.

If the given TextEdit handle does not currently have a selection, TEGetHiliteRgn returns an empty region.

Result Codes:

| noErr | 0 | No error |
|---|---|---|
| paramErr | −50 | Parameter error |
| memFullErr | −108 | Not enough memory |

Application—Defined Routines

This section describes the application-defined routines whose addresses are passed to the Drag Manager. Routines are typically, but not necessarily, defined that the Drag Manager calls during a drag can be defined to implement dragging behavior both into and out of the application's windows.

Drag Handler Routines

Most of the application's dragging functionality is implemented through the use of drag handlers. The Drag Manager calls an application's drag handlers when a drag originates from one of the application's windows (a SendDrag handler), while the user drags a collection of items through one of the application's windows (a tracking handler), and when the user drops the items into one of the application's windows (a receive handler).

DragTrackingHandler

A drag tracking handler has the following syntax:

pascal OSErr DragTrackingHandler (short message, Point pinnedMouse, WindowPtr theWindow, unsigned long handlerRefCon, DragReference theDragRef);

message—A tracking message from the Drag Manager.

pinnedMouse—The pinned mouse location, in global coordinates.

theWindow—A pointer to the window that the mouse is over.

handlerRefCon—A reference constant that was provided to InstallTrackingHandler when this handler was installed.

theDragRef—The drag reference of the drag.

The Drag Manager calls the application program's DragTrackingHandler routine during a drag when the user moves the mouse over one of the application's windows. The application program's DragTrackingHandler can determine what is being dragged by calling the drag item information functions, such as CountDragItems, CountDragItemFlavors, GetFlavorType and GetFlavorFlags.

The message parameter can be used to determine what action the application program's DragTrackingHandler should take. The message parameter may be one of the following values:

Message Descriptions:

kDragEnterHandlerMessage—A call will be received with this message when the focus of a drag enters a window that is handled by the application program's DragTrackingHandler. If the user moves the drag directly to another window that is handled by the same DragTrackingHandler, a second kDragEnterHandlerMessage is not received The application program's DragTrackingHandler only receives this message when the drag enters the domain of the procedure after leaving another.

kDragEnterWindowMessage—A call will be received with this message when a drag enters any window that is handled by the application program's DragTrackingHandler. This message is sent to the application program's DragTrackingHandler for each window that the drag may enter. This message will always be received within a pair of kDragEnterHandlerMessage and kDragLeaveHandlerMessage calls.

kDragInWindowMessage—Calls will be received with this message as the user is dragging within a window handled by the application program's DragTrackingHandler. This message can be used to track the dragging process through the window. This message will always be received within a pair of kDragEnterWindowMessage and kDragLeaveWindowMessage calls. The majority of the window highlighting and object tracking will typically be drawn when this message is received from the Drag Manager.

kDragLeaveWindowMessage—A call will be received with this message when a drag leaves any window that is handled by the application program's DragTrackingHandler. This message is received after receiving a corresponding kDragEnterWindowMessage. This message will always be received within a pair of kDragEnterHandlerMessage and kDragLeaveHandlerMessage calls.

kDragLeaveHandlerMessage—A call will be received with this message when the focus of a drag enters a window that is not handled by the application program's DragTrackingHandler. This message is guaranteed to be received after receiving a corresponding kDragEnterHandlerMessage.

When the Drag Manager calls the application program's DragTrackingHandler, the port will be set to the window that the mouse is over.

ReceiveDropHandler

A receive drop handler has the following syntax:

pascal OSErr ReceiveDropHandler (WindowPtr theWindow, unsigned long handlerRefCon, DragReference theDragRef);

theWindow—A pointer to the window that the drop occurred in.

handlerRefCon—A reference constant that was provided to InstallReceiveHandler when this handler was installed.

theDragRef—The drag reference of the drag.

When the user releases a drag in a window, the Drag Manager calls any ReceiveDropHandler functions that have been installed on that window. A user can get the drop location and what data is being dragged to determine if the window will accept the drop by using the drag information functions provided by the Drag Manager.

After the application program's ReceiveDropHandler decides that it can accept the drop, use the GetFlavorData function to get the needed data from the sender of the drag.

When the Drag Manager calls the application program's ReceiveDropHandler, the port will be set to the window that the mouse is over.

DragConstrainHandler

A drag constrain mouse handler has the following syntax:

pascal OSErr DragConstrainHandler (Point mouse, Point *constrainedMouse, unsigned long handlerRefCon, DragReference theDragRef);

mouse—The current mouse location in global screen coordinates.

constrainedMouse—The constrainedMouse parameter, on entry, contains the constrained mouse coordinates produced by the last DragConstrainHandler called or it contains the mouse coordinates if it is the first DragConstrainHandler to be called. The constrainedMouse parameter, on exit, should be set to the newly constrained mouse location by the application programs DragConstrainHandler. The constrainedMouse coordinates are specified in global screen coordinates.

handlerRefCon—A reference constant that was provided to InstallConstrainHandler when this handler was installed.

theDragRef—The drag reference of the drag.

When the mouse moves over a window, any DragConstrainHandlers that are installed on that window are called sequentially to give each handler the opportunity to constrain the mouse movement.

The application program's DragConstrainHandler is called after the Drag Manager has sampled the mouse location, but before it uses the mouse location to move the "dotted outline" drag region on the screen. The application program's DragConstrainHandler can modify the mouse location in any way, such as horizontal, diagonal or grid consent. The Drag Manager does not, however, use the constrained mouse location to determine which window to send handler messages to.

If there are more than one constrain mouse handlers installed on a single window, the handlers will be called sequentially, where the first handler will receive the real mouse location in the constrainedMouse parameter, and subsequent handlers will receive the result of the previous handler in the constrainedMouse parameter.

When the Drag Manager calls the application programs DragConstrainHandler, the port will be set to the window that the mouse is over.

DragCallback Procedures

There are several Drag Manager functions that can be overridden by setting any of several drag callback procedures for any given drag. The available drag callback procedures override the standard flavor data sending, mouse and keyboard sampling and "dotted outline" drag region drawing functions.

DragSendDataProc

A drag send data procedure has the following syntax:

pascal OSErr DragSendDataProc (FlavorType theType, const AEDesc *acceptorDescriptor, unsigned long theRefCon, ItemReference theItemRef, DragReference theDragRef);

theType—A flavor type being requested by a drop receiver.

acceptorDescriptor—An optional AppleEvent description of the drop location that the data will be sent to.

theRefCon—A reference constant that was provided when SetDragSendProc was called to install this procedure.

theItemRef—The item reference of the item that the flavor data is being requested from.

theDragRef—The drag reference of the drag.

The Drag Manager calls the application program's DragSendProc when drag item flavor data is requested by a drop receiver if the drag item flavor data is not already cached by the Drag Manager. The SetDragItemFlavorData function is used to give the Drag Manager the requested data.

The Drag Manager caches all drag item flavor data that was given in the data pointer when the flavor was added using the AddDragItemFlavor function. If the data pointer is NIL when the flavor is added, the Drag Manager will call the DragSendProc to get the data only if a receiver requests the data using the GetFlavorData function.

A second scenario where the DragSendProc is called is when a drop receiver requests a flavor that is translated by the Translation Manager and the source data (which would be a different type than actually requested by the receiver) is not already cached by the Drag Manager.

A DragSendDataProc does not need to be provided if NIL is not ever passed as the data pointer when calling AddDragItemFlavor.

DragInputProc

A drag input procedure has the following syntax:

pascal OSErr DragInputProc (Point *mouse, short *modifiers, unsigned long theRefCon);

mouse—On entry, the mouse parameter contains the physical location of the mouse. On exit, the application program's DragInputProc returns the desired current mouse location in the mouse parameter. The mouse location is specified in global screen coordinates.

modifiers—On entry, the modifiers parameter contains the physical state of the keyboard modifiers and mouse button. On exit, the application program's DragInputProc returns the desired state of the keyboard modifiers and mouse button. The modifiers parameter is specified using the same format and constants as the Event Manager's EventRecord modifiers field.

theRefCon—A reference constant that was provided when SetDragInputProc was called to install this procedure.

Each time the Drag Manager samples the mouse and keyboard, it calls the DragInputProc (if one has been set by calling SetDragInputProc) to provide way to modify or completely change the mouse and keyboard input to the Drag Manager.

When the DragInputProc is called, the mouse and modifiers parameters contain the actual values from the physical input devices. The application program's DragInputProc may modify these values in any way. The application program's DragInputProc may simply inhibit the control key modifier bit to become set or it may completely replace the mouse coordinates with those generated some other way to drive the drag itself.

DragDrawingProc

A drag drawing procedure has the following syntax:
    pascal OSErr DragDrawingProc (short message, Point pinnedMouse, unsigned long theRefCon, DragReference theDragRef);

message—A drag region drawing message from the Drag Manager.

pinnedMouse—The pinned mouse location, in global coordinates.

theRefCon—A reference constant that was provided when SetDragDrawingProc was called to install this procedure.

theDragRef—The drag reference of the drag.

If the application set a custom drawing procedure for a drag using the SetDragDrawingProc function, the Drag Manager calls the application program's DragDrawingProc to perform all drag region drawing operations.

The message parameter is used to determine what action the application program's DragDrawingProc should take. The message parameter may be one of the following values:

Message Descriptions:

kDragPrimeDrawingMessage—A call will be received with this message when a drag is being started and it is time to initialize the application program's drawing procedure. Nothing should be drawn to the screen when this message is received.

kDragDrawMessage—A call will be received with this message when the drag feedback should be drawn at the pinnedMouse location. The Drag Manager port is set such that a user can draw to the entire screen. Successive kDragDrawMessage calls will be received to move the drag feedback on the screen.

kDragHideMessage—Calls will be received with this message when the drag feedback should be erased from the pinnedMouse location. The Drag Manager port is set such that a user can draw to the entire screen.

kDragDrawIdleMessage—A call will be received with this message when the drag region has not moved on the screen. This message can be used if any type of animation is being drawn to update the application program's drag region. The Drag Manager port is set such that a user can draw to the entire screen.

kDragEndDrawingMessage—A call will be received with this message when the drag has completed and it is time to deallocate any allocations made during in the application program's DragDrawingProc. After this message is received, any additional messages will not be received.

Functional Operation

Figure 26:
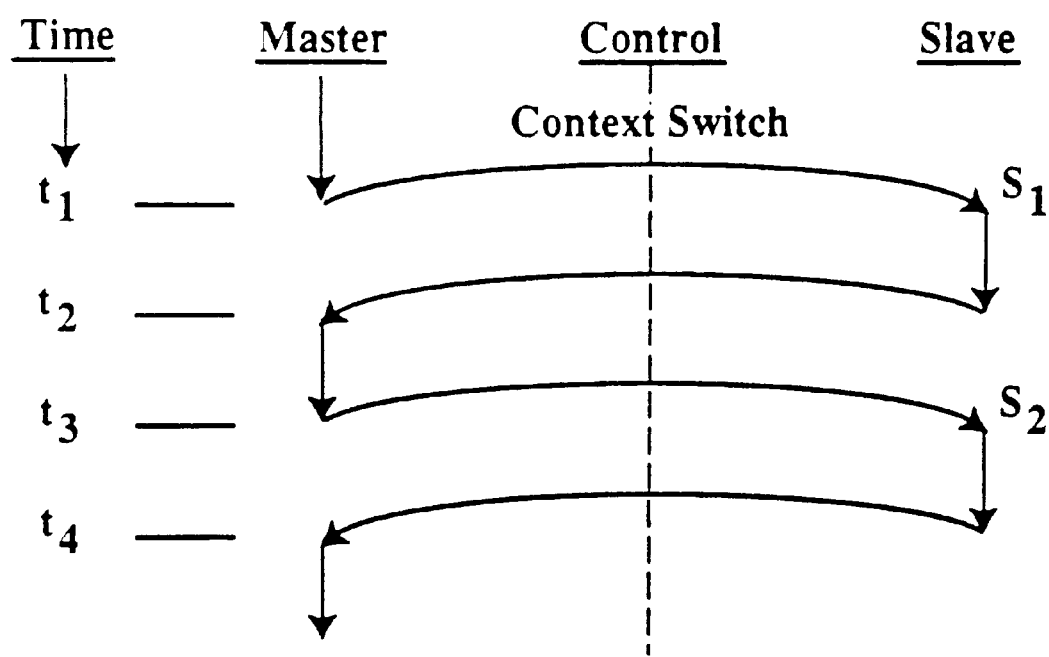
FIGS. 26 and 27 illustrate the transfer of control and context switches which occur between application programs in typical prior art systems.
Figure 27:
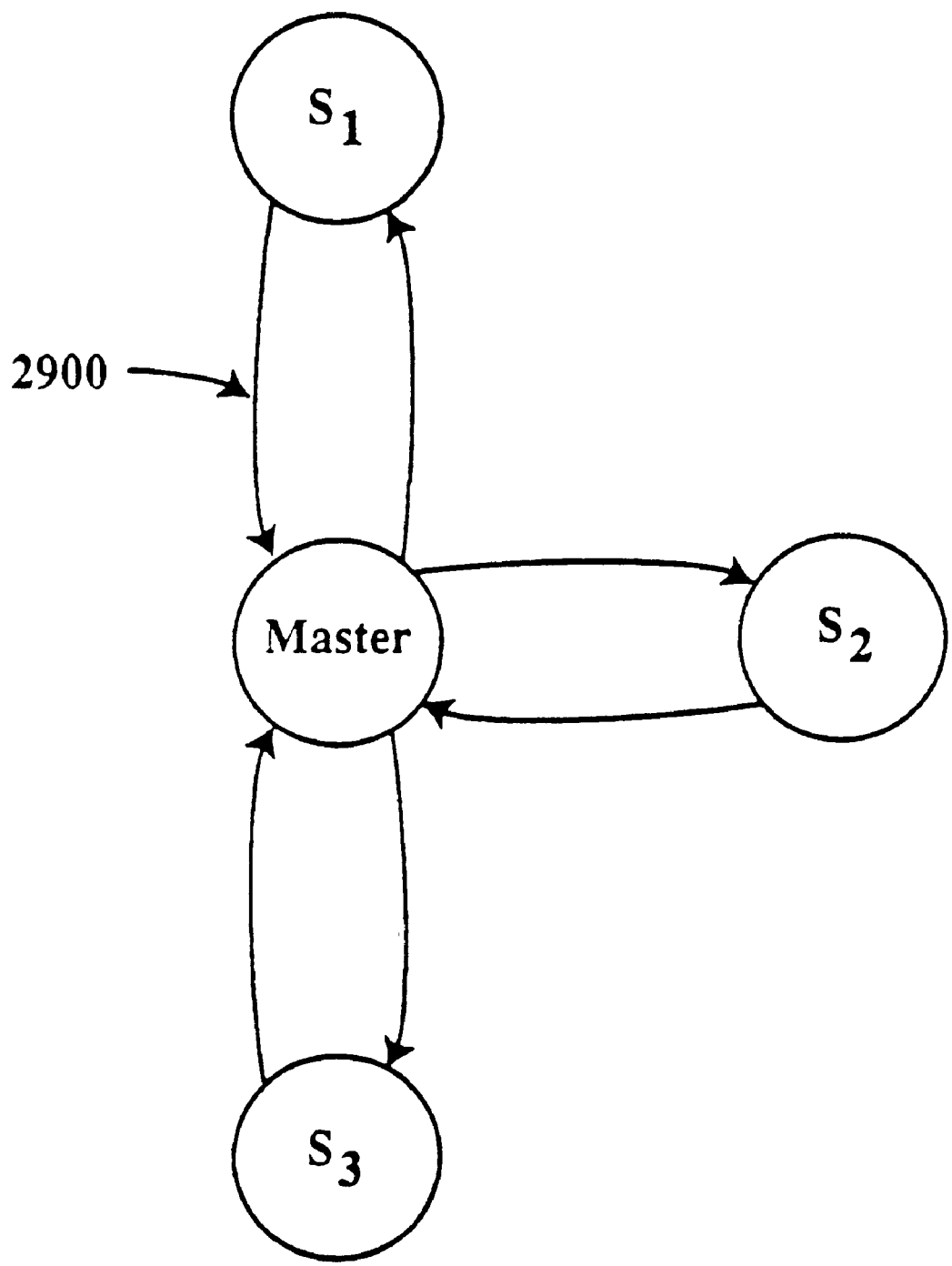

Another inventive feature of the preferred embodiment is the definition of a new type of process switching mechanism which accelerates the response time of drag-and-drop operations, and thus makes such interapplication dragging a truly useful and feasible alternative. Prior art systems for performing task switching typically are similar to that illustrated in FIGS. 26 and 27. For example, the prior art assumes a single-master slave relationship wherein a master program retains control, and all slave programs must return control to the master program upon completing their tasks. This is briefly illustrated with reference to the timing diagram of FIG. 26. For example, a master may retain control of the computer's operation, however, at time $t_1$, at such time it is determined that a slave process should be transferred control to perform some operations, such as highlighting a window, selecting text or other type of operation, a context switch takes place wherein transfer is controlled to a slave $S_1$. The slave $S_1$ performs some processing for some duration of time and then, at some point, returns control back to the master at time $t_2$. Again, the master retains control for a certain interval and may transfer control to another slave, such as $S_2$ illustrated at time $t_3$, which slave returns control back at time $t_4$. This type of mechanism may also be illustrated by FIG. 27 which shows the master and slave illustrated as a series of states wherein each slave process is represented as a state which always returns back to the master state. Therefore, control is to be allocated by the master, and control always returns to the master at the completion of processing by any slave.

The preferred embodiment assumes a more distributed context switching apparatus wherein each process in the computer system is assumed to provide all control for the display and other necessary processing during the time in which it is transferred control. In this manner, no control needs to be returned to master, and each process which is active in the system transfers complete control of the display and other actions taking place. This model is known in the preferred embodiment as the "hot potato model" or "peer-to-peer-to-peer." This is distinguishable from master/slave or the server/client control in the prior art, as was illustrated with reference to FIGS. 26 and 27. The flow of control can be briefly illustrated by reference to FIGS. 28 and 29. For example, with reference to FIG. 28, proceeding at time $t_1$ wherein a context switch takes place, a first interactor $I_1$ may have control. Then, upon detection that a second interactor needs to obtain control, $I_1$ performs all necessary functions for housekeeping prior to leaving that process, and control is switched at time t1 through use of a context switch to interactor $I_2$. Similarly, $I_2$ retains control for a certain duration of time, and then, at time $t_2$, $I_2$ begins a switch context again to a third process $I_3$. This type of context switching can take place any and all of the processes in the system with no process or interactor being required to retain control, as in the master/slave or server/client relationships.

Figure 28:
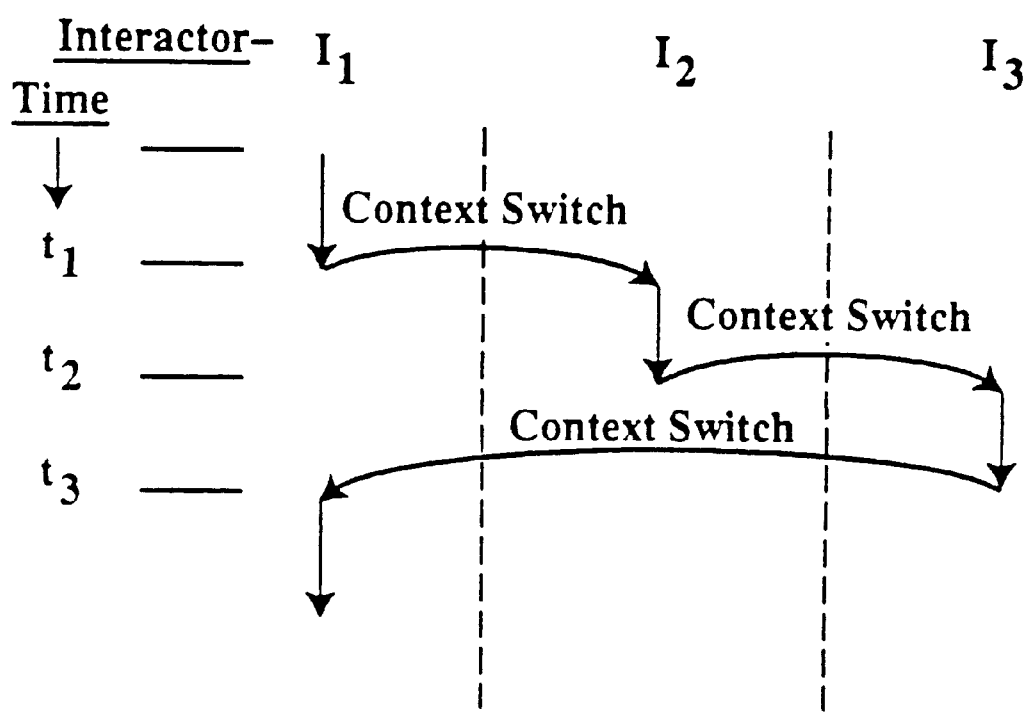
FIGS. 28 and 29 illustrate transfers of control which may be implemented in one embodiment of the present invention.
Figure 29:
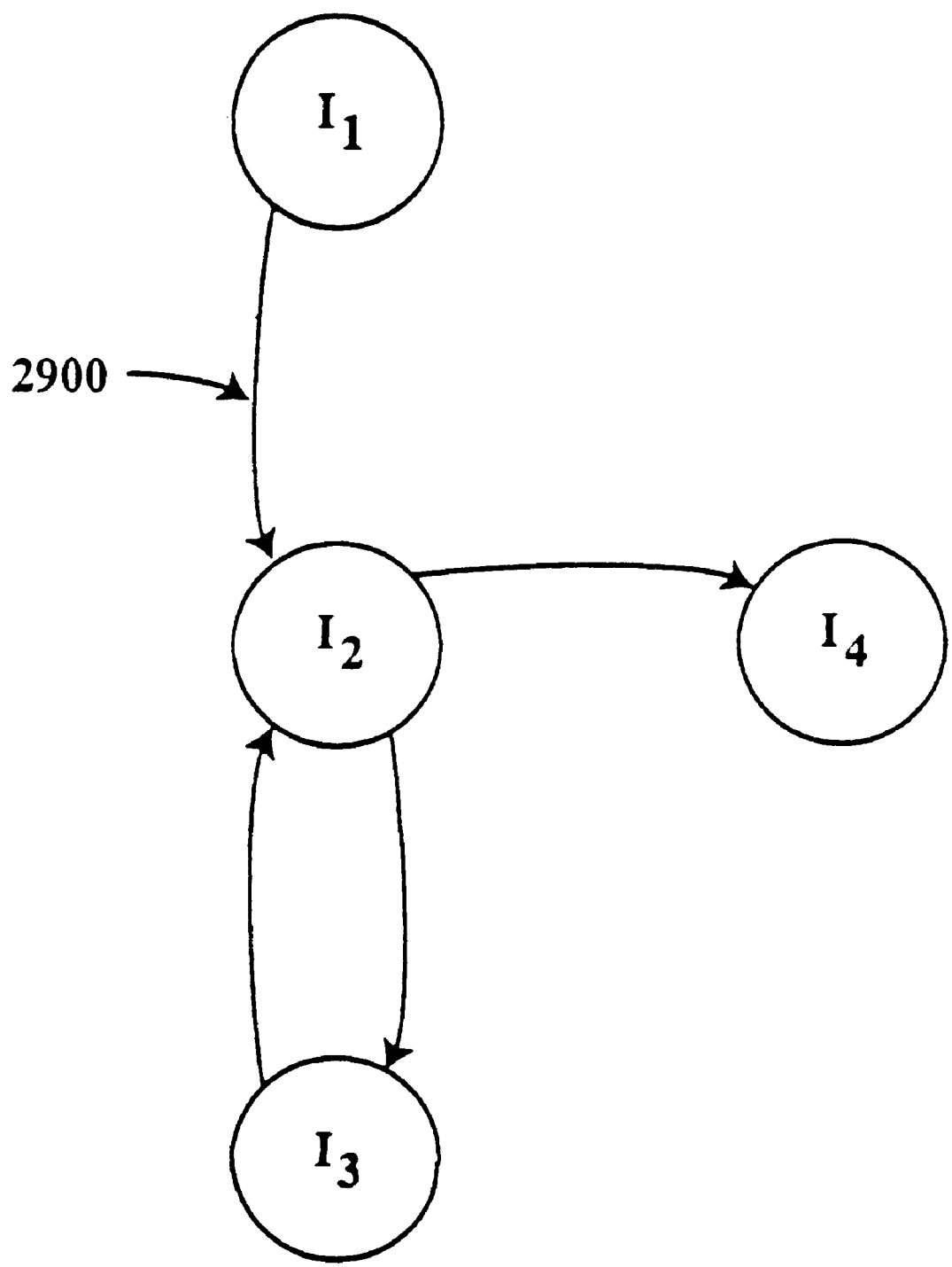

Yet another view of this model is illustrated with reference to FIG. 29. For example, interactor $I_1$ may have control and transfer that control to $I_2$, as illustrated by transition line 2900 in FIG. 29. Further, $I_2$ may retain control for a period of time and transfer control to a third interactor $I_3$. This process continues, as discussed above, with no interactor requiring that another interactor returns control back to it, as was required in the master/slave relationship. This technique has performance advantages in that only a single-context switch to switch control from one interactor to another is required. This is distinguishable from the master/slave relationship wherein if control wants to be transferred to a second slave (e.g., $S_2$ in FIG. 26), then control has to be retained from a first slave (e.g., $S_1$), and then control must be transferred to $S_2$. This is illustrated at times $t_2$ and $t_3$ in FIG. 26. In contrast, as is illustrated in FIG. 28, if one interactor desires control, such as In interactor $I_2$ at time $t_1$, then only a single-context switch between interactors $I_1$ and $I_2$ need take place at $t_1$. Thus, significant performance advantages are realized by only performing a single-context switch per transfer of control from one interactor, such as $I_1$, to a second interactor, such as $I_2$. This particular type of switching model is useful when transfers of context between windows in the user's computer system need take place. So, for example, to transfer control from a first interactor, such as $I_1$, to a second interactor, such as $I_2$, when the tracking of a mouse goes from a window handled by interactor $I_1$ to a second window handled by interactor $I_2$, then a message is merely sent from the Drag Manager to $I_2$ causing the second process to assume control.

For example, the sending application, such as $I_1$, may track the drag, do whatever highlighting is appropriate, until the mouse moves into a window belonging to another application program, such as interactor $I_2$. The sending application program $I_1$ sends the destination application program under the mouse event effectively transferring control, and the receiver, such as $I_2$, is now in complete control until the mouse moves over a window handled by a different application program. Applications thus pass control around like a hot potato, each is in total control until it decides to pass control to another application program. Thus, each interactor is required to only implement the slave functionality and the functionality to transfer control to a different application program.

Transfer of control is implemented in the preferred embodiment using a Process Manager switch mechanism. The switch mechanism allows the Drag Manager to efficiently change which application context is current. The Drag Manager uses this mechanism to prepare handlers to receive messages. This allows it to quickly change which application has control of the drag by immediately calling the new application handlers directly in their own context. This is a significant improvement over Event Manager based messages, which correctly set contexts but are slower because of overhead. In the following discussion, in the preferred embodiment, three cases are handled: a selection in a foreground (currently active) application's window and possible drag; a selection in a background window and possible drag; and a drop in a background window. These cases are handled through the use of a process TrackDrag described with reference to FIGS. 30 and 31 and related process at FIGS. 32–34.

Figure 30:
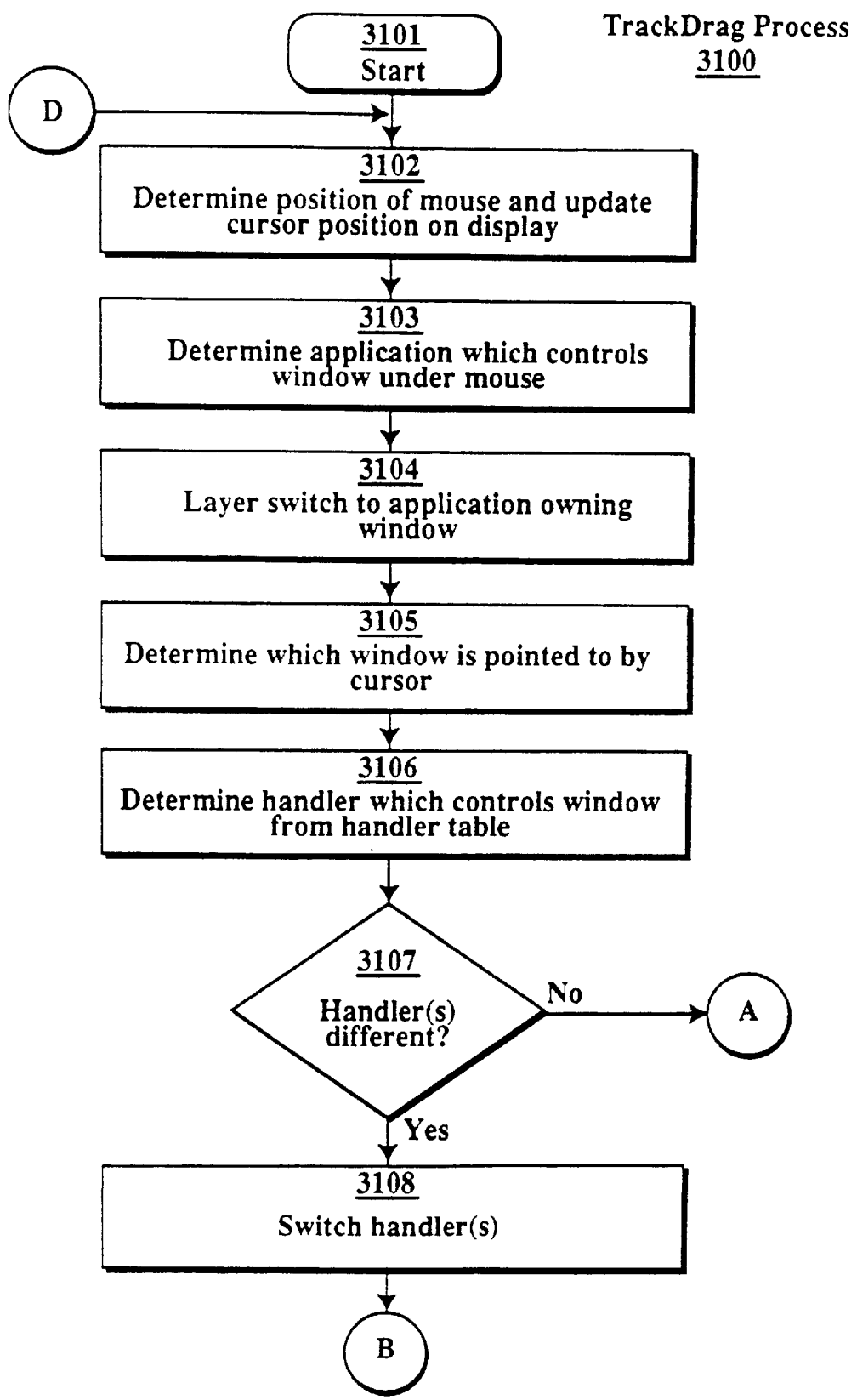
FIGS. 30 and 31 illustrate the drag tracking process as performed within the preferred embodiment.
Figure 31:
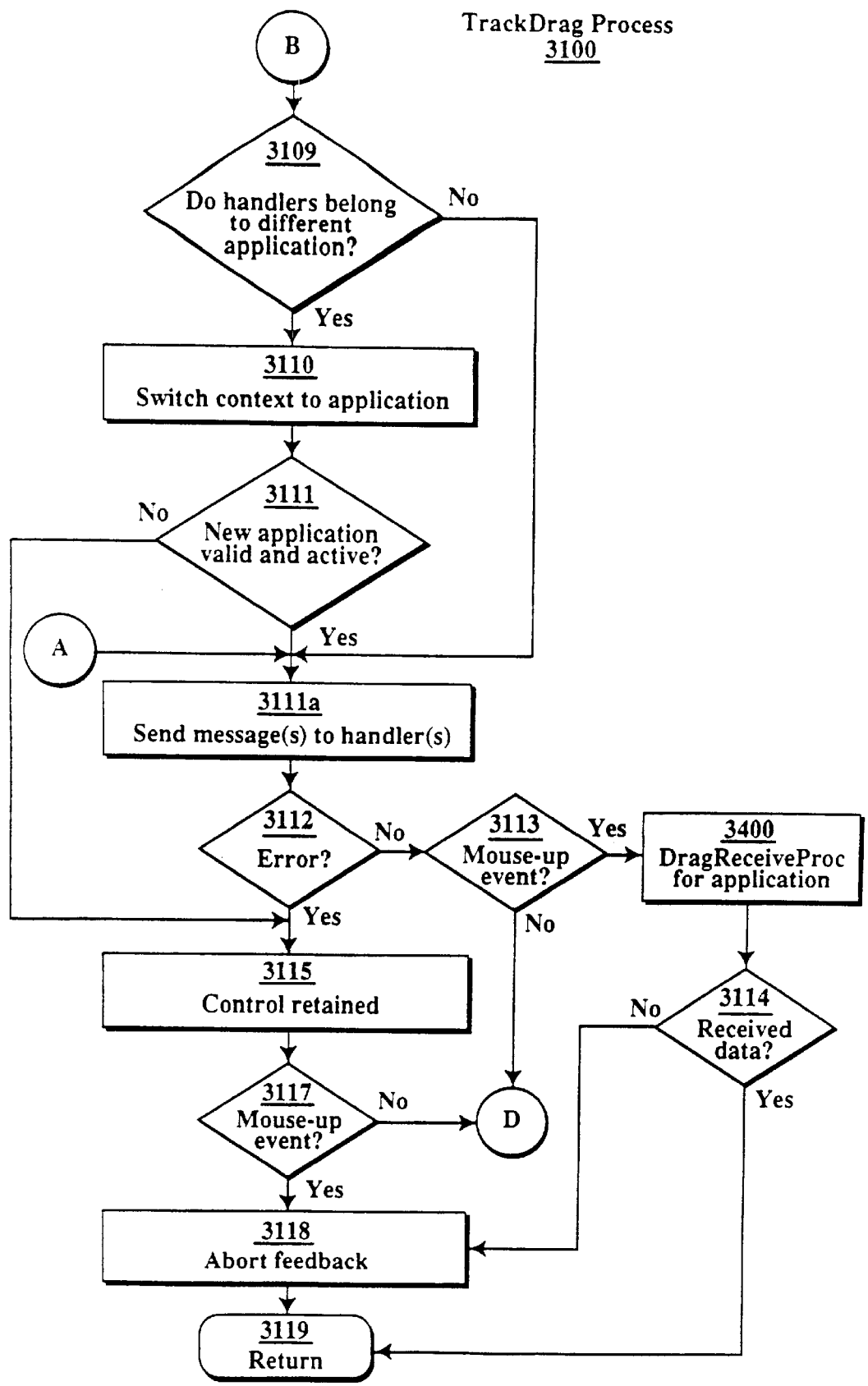

For example, process 3100 of FIGS. 30 and 31 illustrates the transfer of control which occurs in a process known as TrackDrag, which may occur upon detection of a drag (e.g., the selection of an item and movement of three pixels or more while selected) and the appropriate calls to the handlers. This process, which starts at step 3101, determines, based upon the position of the cursor on the user interface display, the position of the pointing device or mouse at step 3102 and updates the position of the cursor on the display. It can be determined at step 3103 which application program controls the window under the mouse by determining the cursor position in global coordinates and determining which window is under the cursor at step 3103. Each window has associated with it a routine which controls the window (e.g., the main application program). Then, at step 3104, a layer switch to the application occurs for implementation purposes to allow the Drag Manager to determine which window controlled by the application has been selected. Thus, if an application has several different registered sets of handlers for different windows (e.g., 2211 and 2212 of FIG. 22 for window "graphics" or 2221 for window "documents"), then the proper handlers can be accessed, and a switch of handlers and/or applications may be performed.

It can then be determined at step 3105 which window is pointed to by the cursor that is handled by the application. That is, a single application program may have several windows displayed, one of which only is handled by the application, each of which has a set of handlers associated registered with it in the handler list (see, e.g., FIG. 22). Then, it is determined at step 3107 whether the handler is different, via its callback and process ID, from the current handlers loaded at step 3107. If so, then a switch of handlers is performed at step 3108. As was discussed with reference to the messages above, the respective handlers are transmitted messages indicating whether the handlers are being left or entered. Thus, the old handler for either the old window or old application program receives a kLeaveHandler message, and the new handler receives a kEnterHandler message. If the handler is not different, as determined at step 3107, then process 3100 continues at step 3111a in FIG. 31.

Once handlers have been switched at step 3108, it is determined whether the handler belongs to a different application program at step 3109. If so, then an application context switch is performed at step 3110. This is a limited switch, of only the context of the application and that the activation of the application itself This allows the handler access to any global variables and routines in the application program (in the Macintosh® brand operating system known as a switch to allow the handler to have access to the A5 global variables of the application program). This allows the handler to determine, if a background selection was made, the content and flavors of a drag item or, in the case of a background drop, allows rewrapping and other reformatting of information in the background window without activation of the application program. Thus, the handler can have access to the facilities provided by the application without activation of the application. It is then determined whether the new application (e.g., the handler of the context) is valid and active at step 3111. Subsequently, at step 3111a, InWindow messages are sent to the handler(s) to indicate that a window that the handler(s) control should take action. This occurs if a different handler was not detected at step 3107 or if the handlers did not belong to a different application program at step 3109. If any errors occur, as determined at step 3112, or the new application was not valid or not active, as determined at step 3111, then control is retained at step 3115 by the current application. This is not fatal, as the application window under the cursor simply will not be able to receive the dragged data, no handlers are called, and the window is not highlighted. If, however, the user causes a mouse-up event (deactivation of the selection device to indicate a drop), as detected at step 3117, then process 3100 aborts at step 3118, and abort feedback may be provided to the user. As will be discussed, and was referenced above, the process ZoomRects( ) may be used for this purpose to animate that the drag was, in fact, not successful. Thus, at step 3119, the TrackDrag process is returned from at step 3119, as is illustrated in FIG. 31. If a mouse-up event is not detected at step 3117, then TrackDrag 3100 returns to the top of the loop at step 3102.

If, however, an error was not detected at step 3112 from the activation of the new application program context at step 3111, then it is determined whether, at step 3113, a mouse-up event has occurred. This will indicate that the user wishes to "drop" the dragged data to the window over which the cursor now resides. In that case, process 3100 proceeds to call DragReceive process 3400 for the application program. This is illustrated in more detail with reference to FIG. 34 below. Then, at step 3114, it is determined whether the call to the DragReceive process for the application program resulted in the receipt of any data. If not, then step 3114 branches to step 3118 which provides abort feedback to the user (such as through the use of ZoomRects or other user interface function), and process 3100 returns at step 3119. If, however, the DragReceive process for the application did receive the data, as determined at step 3114, then the process normally returns at step 3119 with all the necessary drop completion feedback being provided by the user by DragReceive process 3400 for the application program.

Figure 32:
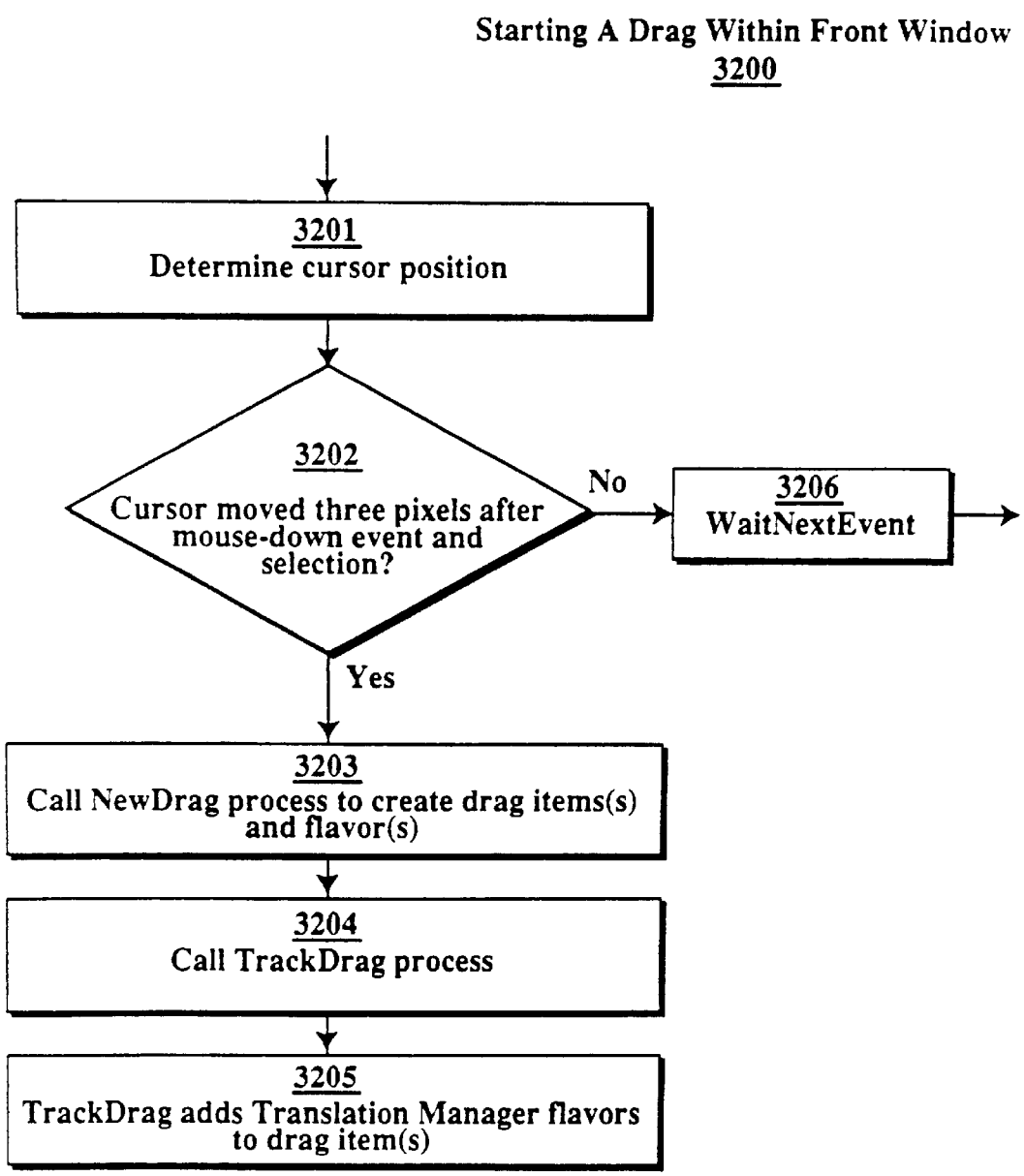
FIG. 32 illustrates a process which is performed in a normal event loop of an application program for commencing a drag from an active application program.

FIG. 32 illustrates a process 3200 which is performed within the normal event loop of a front application window (the active process) which has already been switched in and needs to perform a StartDrag process in order to create drag items or flavors which the sending process can transmit. Then, at step 3202, the application detects the position of the cursor and a movement of three pixels after a mouse-down event and a selection. If there is no movement of three pixels after a selection and mouse-own event, then the normal event loop continues at WaitNextEvent at step 3206. The application program uses the process NewDrag provided by the application program at step 3203 if a drag was detected to start the drag. The application program's NewDrag process adds drag items with transmittable flavors at step 3203 and does not need to be switched in because it is already active and loaded. The application program then calls the TrackDrag process at step 3204. Of course, the drag items with transmittable flavors are only created if the application program is drag aware, and if it not, then it does not call TrackDrag. The Translation Manager is invoked at step 3205 by TrackDrag process 3100 to add flavors to the drag item(s). Based upon flavors provided by the application program, the Translation Manager determines other flavors it can provide the data in. That is, if the type 'styl' was a drag item flavor provided by the application program and the Translation Manager can provide an '.rtf' flavor, then the Translation Manager will add the flavor '.rtf' to the drag item flavors list in the drag data structure. Then, upon completion, the Drag Manager begins to track the drag as described TrackDrag process 3100 described above.

Figure 33A:
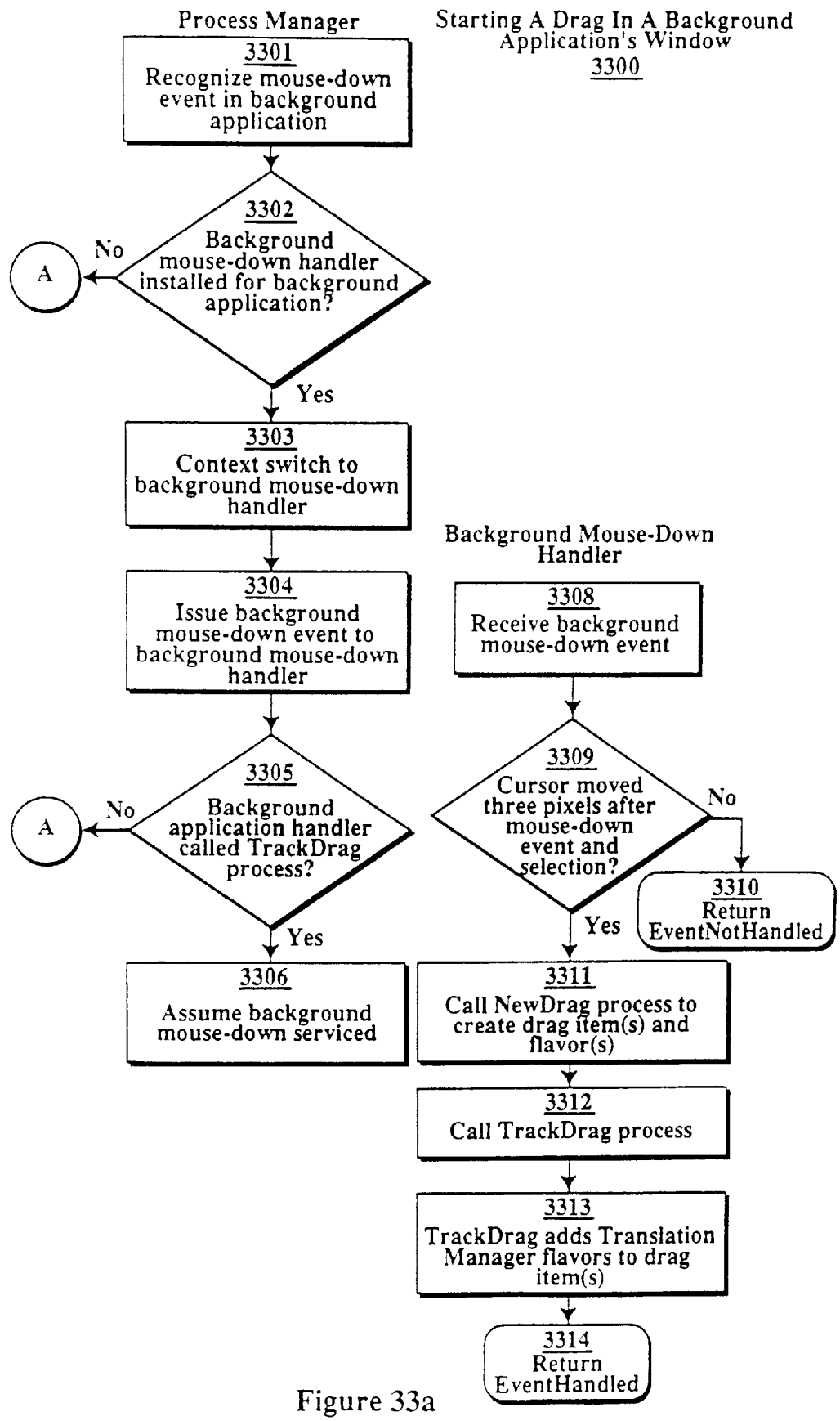
FIGS. 33a and 33b illustrate a process which is performed during the selection and drag of items in a background or inactive application program.

A process for a background application is illustrated with reference to FIGS. 33*a* and 33*b*. This is used in the event that a drag is started from a window which was inactive or in the background. Process 3300 of FIGS. 33*a* and 33*b* starts at step 3301 which recognizes the mouse-down event in a background application window. This may be determined by checking the application program associated with the window where the selection took place. If that application is not active, then it is considered to be a background selection. Then, it is determined at step 3302 whether a background mouse-down handler has been installed for the background application. If not, then the process proceeds to step 3311 on FIG. 33*b*. If there is a background mouse-own handler installed for the background application program, which is the most likely case in the case of a drag aware background application program, then process 3300 proceeds to step 3303. Step 3303 performs a context switch to the background application program (the background mouse-down event handler is invoked for the application program, and the A5 global variables are made available), and at step 3304, the background mouse-down handler is sent the mouse-own event. The handler receives the event at step 3308 and determines whether the cursor has moved three pixels or more after a mouse-down event and selection at step 3309. If not, the handler returns at step 3310 with the flag EventNotHandled. Otherwise, the handler then proceeds, in a similar manner, to process 3200 wherein, at step 3311, NewDrag is called to create drag item(s) and flavors, TrackDrag is called at step 3312, and TrackDrag calls the Translation Manager at step 3313, and the handler returns at step 3314 with the flag EventHandled.

Figure 33B:
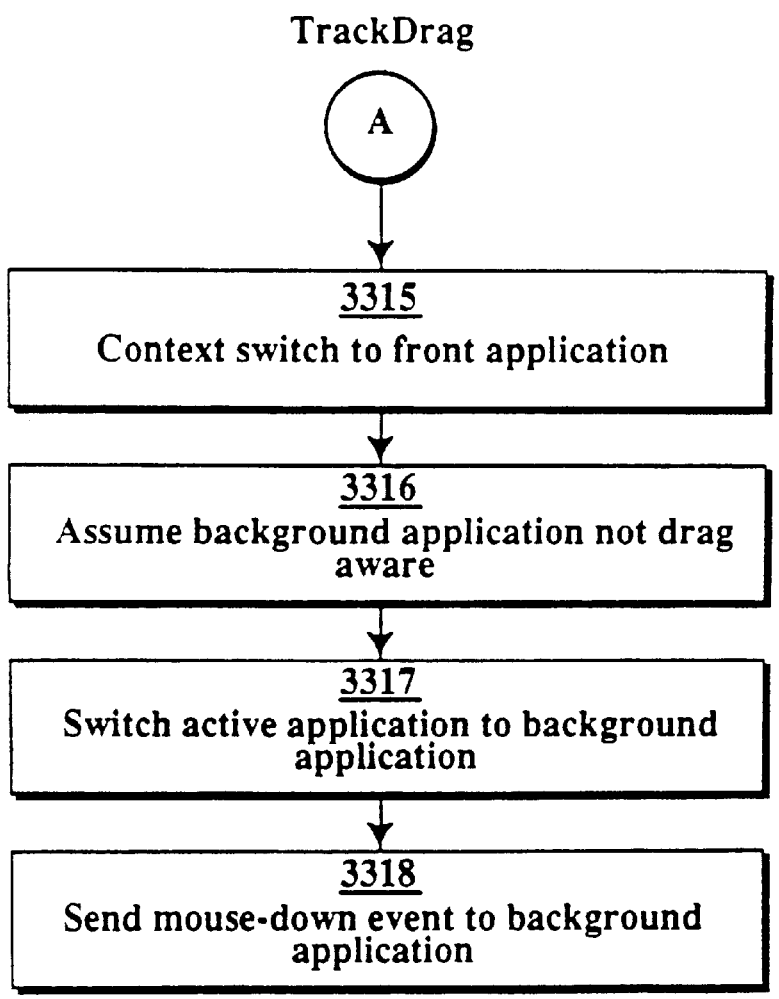

FIG. 33*b*, starting at step 3312, illustrates the case where a TrackDrag process was not started or a handler was not installed for the background application. In either event, as shown in FIG. 33*b*, it is assumed that the mouse-down event will cause a control switch to the background application program wherein a context switch is performed to the front application at step 3315 to recognize that the drag process aborted, and at step 3316, it is assumed that the background application is not drag aware. Then, a switch is performed to the background application program to make it active at step 3317 (control is transferred entirely to the background application), and a simple mouse-down event is sent to the background application program at step 3318. The background application program detects the event in its normal event loop and services the mouse-down event in the normal manner as the active application program.

Figure 34:
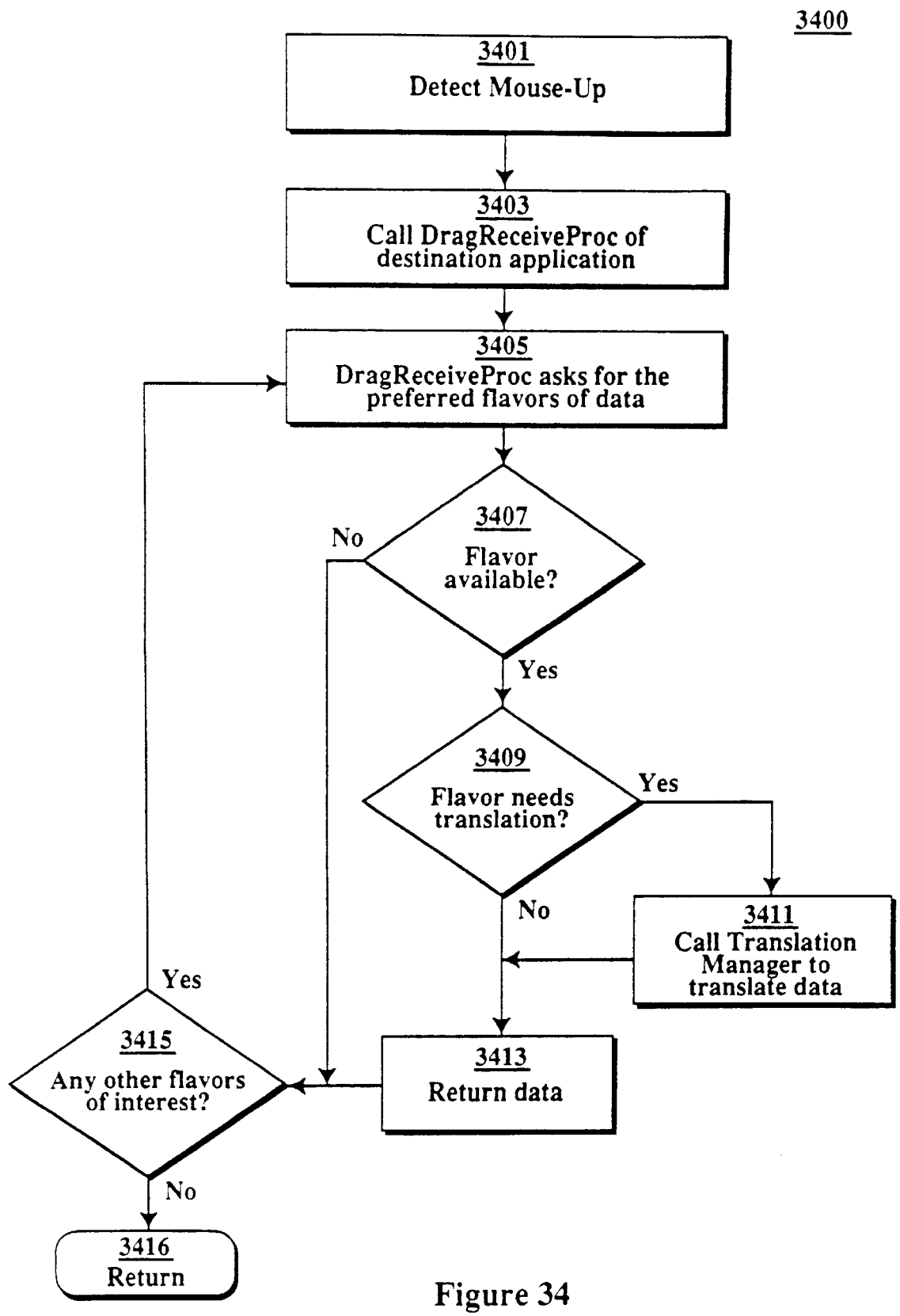
FIG. 34 illustrates a flow diagram of a process which is performed when a drop operation takes place in the preferred embodiment.

Process 3400 of FIG. 34 shows a sequence of steps which are performed by the Drag Manager when a mouse-up event has been detected in the drag tracking process 3100 of FIGS. 30 and 31. For example, at step 3401, a mouse-up event has already been detected. Then, at step 3403, the DragReceive process of the destination application is invoked. This allows the destination application program's receive handler to be invoked which communicates messages to the Drag Manager to provide the various flavors of data requested by the receiving process. At step 3405, the DragReceive process of the background application program requests the flavors of data from the Drag Manager and thus the sending handler. If the sending handler can provide the flavor, as detected at step 3407, then it is determined whether that flavor needs translation at step 3409. If so, then the Translation Manager is invoked at step 3411 to translate the data, and data is returned to the DragReceive process at step 3413. If the flavor does not need translation, as detected at step 3409, then data is returned normally and untranslated to the DragReceive process of the destination application program at step 3413. If there are any other flavors of interest, as requested by the DragReceive process at step 3415, then process 3400 continues at step 3405. If, however, there are no other flavors of interest requested by the DragReceive process of the application program, then process 3400 is complete at step 3416 and returns.

The foregoing switching mechanism, especially that described with regards to the tracking process illustrated in process 3100, assumes that the Drag Manager is in control and provides all message passing between the various handlers in the system. In the current preferred embodiment, control is typically returned to the Drag Manager in its drag tracking process 3100 in order to transfer control to a second set of handlers and/or switch context between application programs. However, it is anticipated that, in an alternative embodiment, the methodology set forth in FIGS. 30–34 is implemented in individual application programs in order to provide for interapplication dragging and transfer of control to and from other application programs. Thus, in this manner, only a single message from the process relinquishing control to the new process need be made, and the process relinquishing control will perform an orderly shutdown and transfer control. Message passing is kept to a minimum, and performance can be maximized.

Thus, it can be appreciated by the foregoing discussion that process switching between application programs is simplified, and performance is enhanced by the use of peer-to-peer-to-peer context switching model described above. Other advantages, features, and performance enhancements can be appreciated by one skilled in the art.

Example User Interface Routines

Figure 35:
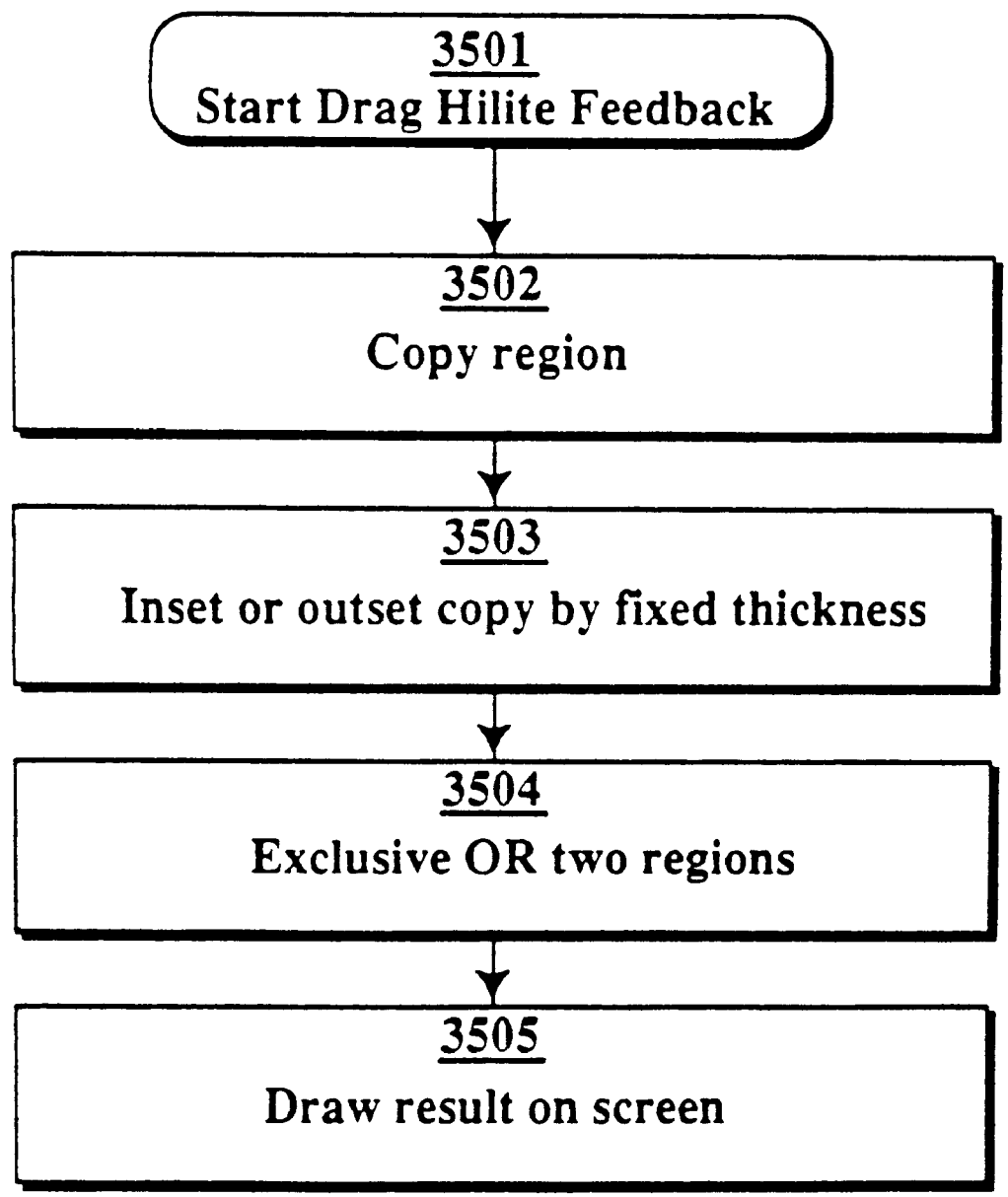
FIG. 35 shows a process for a highlighting a region on a display for improved user interface feedback.

Certain user interface actions for providing feedback to a user during drag-and-drop operations can be illustrated with reference to the process flow diagrams of FIGS. 35–37. For example, FIG. 35 illustrates the technique of starting a Drag Hilite Feedback which is used for representing arbitrary shapes during drag feedback. This same technique is used for representing arbitrary shapes of items during tracking (e.g., windows, subwindows, fields, spreadsheet cells, etc.).

For example, as is illustrated in FIG. 35, the Start Drag Hilite Feedback procedure starts at step 3501. Then, a region shape is passed by the application's handler to the Start-DragHilite function, such as the icon and title or other representation of the item and the position of the item. The passed region is then copied at step 3502. The region is then inset or outset by a certain fixed thickness at step 3503 (e.g., a single pixel outset for selection feedback or two or three pixel inset for tracking feedback). Then, an exclusive OR is performed on the original shape and the outset or inset region at step 3504, and the result is drawn on the screen at step 3505. The resulting region either insets or outsets the frame of a possible drag destination or an item during a drag. It also provides feedback that an arbitrarily shaped area of the screen can successfully receive a drop. This same technique can also be used for tracking the drag of the cursor across the user interface screen and provides arbitrary shapes for feedback to the user during drag operations.

Other prior art systems sometimes use arbitrary shapes, however, many use a fixed shape for performing drags between applications, and some even use them during drags within their own file system. Thus, this method provides distinct advantages and improved user feedback over the prior art.

Figure 36A:
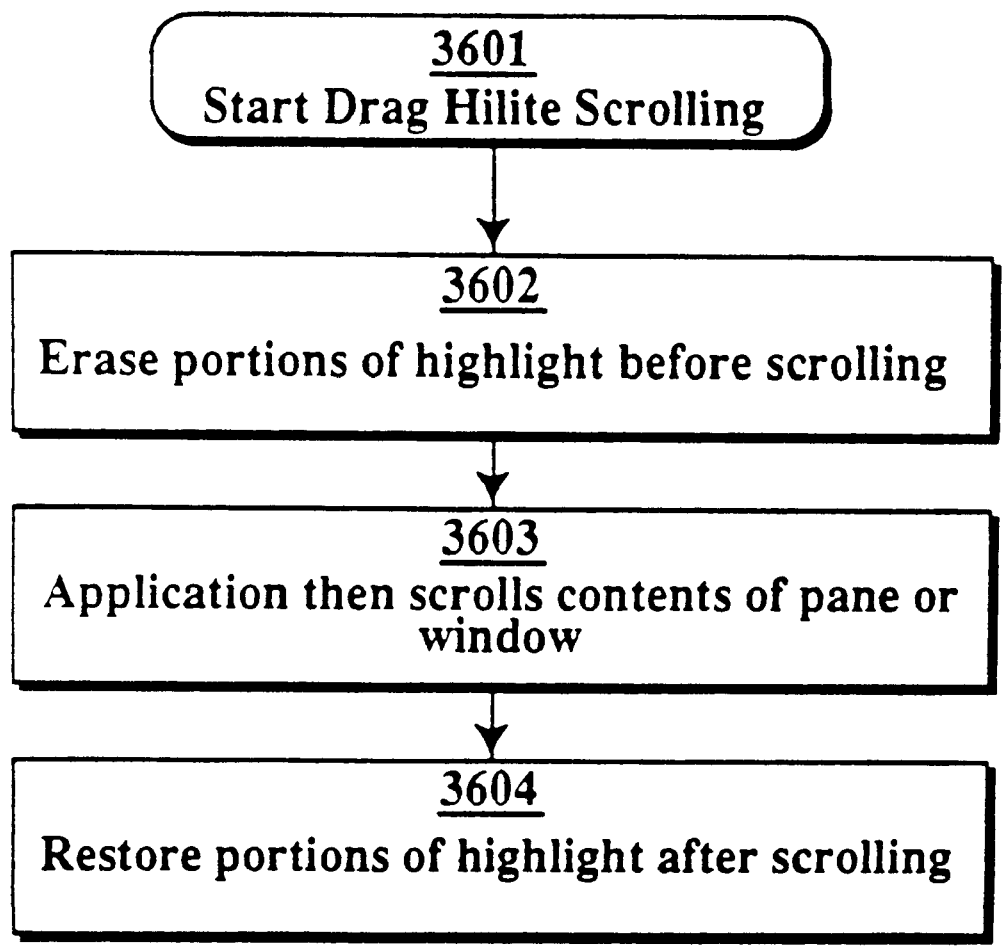
FIGS. 36a–36c illustrate methods for maintaining highlighting in windows during scrolling operations.
Figure 36B:
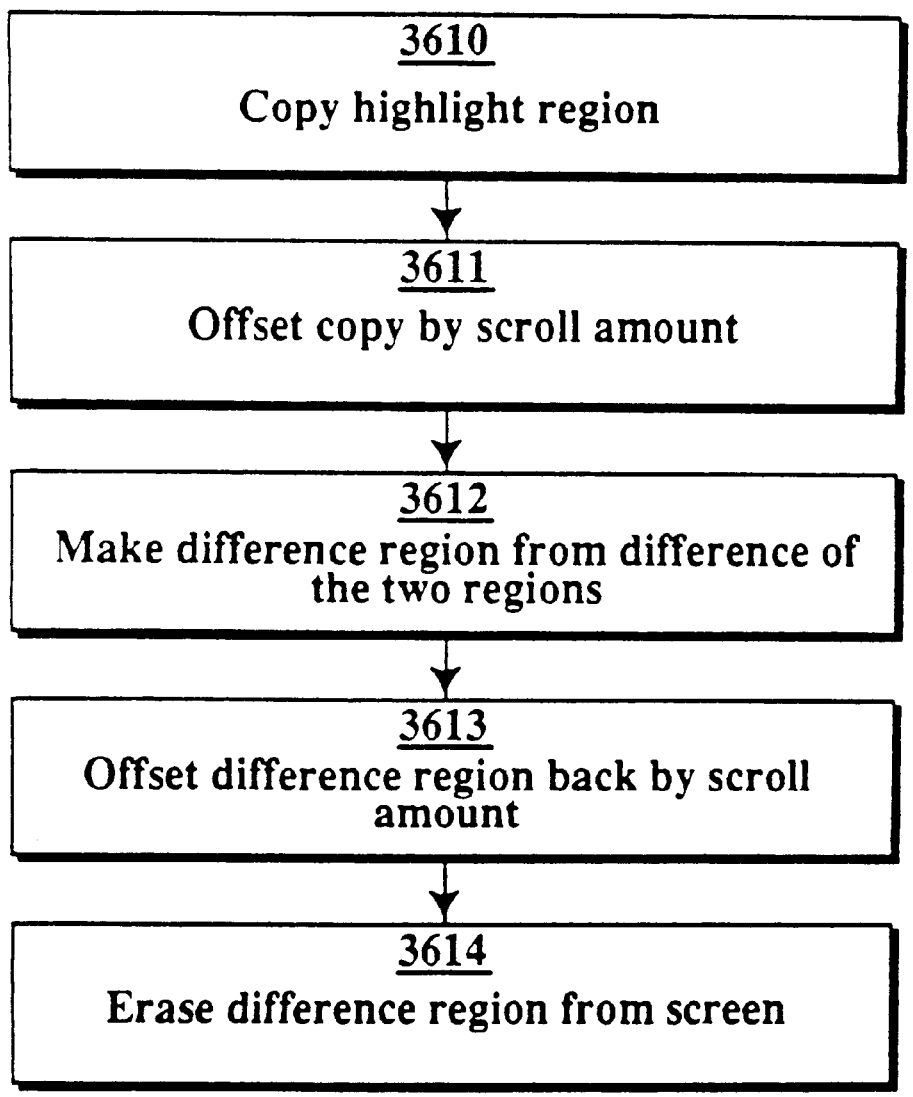
Figure 36C:
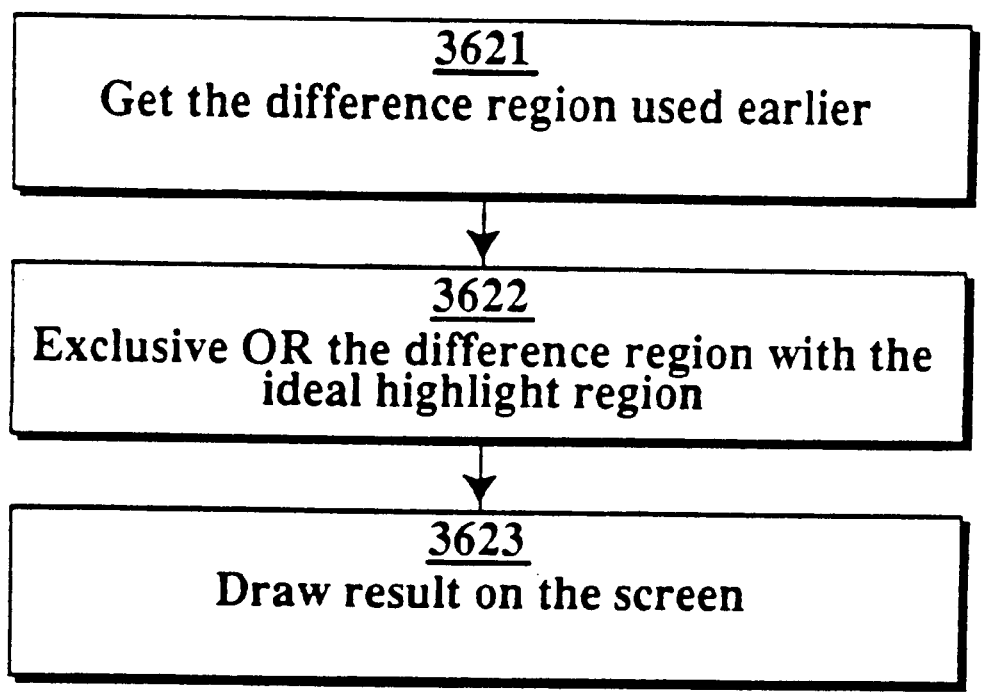

FIGS. 36a–36c illustrate a simple procedure used for maintaining highlighting during autoscrolling. For example, at step 3601, the Start Drag Hilite Scrolling procedure is started. Then, prior to scrolling the data on the display at step 3602, the highlighted portions which will be scrolled out of the window are erased. A more detailed view of this step is illustrated with reference to FIG. 36b. For example, during an autoscrolling operation, depending on the direction which the autoscrolling is taking place, the highlight region is copied at step 3610, illustrated in FIG. 36b. Then, the copy which was made is offset by a scroll amount (e.g., 10 pixels vertically and 3 pixels horizontally) at step 3611. Then, a difference region from the difference of the two regions is created at step 3612. The difference region is offset back by a certain scroll amount at step 3613. Then, at step 3614, the difference region is erased from the display during the scroll.

At step 3603, as is illustrated in FIG. 36a, the application then scrolls the contents of the pane or window by the defined scroll amount. At step 3604, the portions of the highlight after the scrolling are restored at step 3604 are restored. This is shown in more detail with reference to FIG. 36c. As is illustrated in 36c, step 3621 is performed to find the difference region which was used earlier to perform the scroll. Then, at step 3622, an exclusive OR is made with the difference region and the ideal highlight region. Finally, at step 3623, the final highlighting on the display during the scroll is restored, and the window or frame is highlighted back to the state it was in prior to the scroll.

Figure 37:
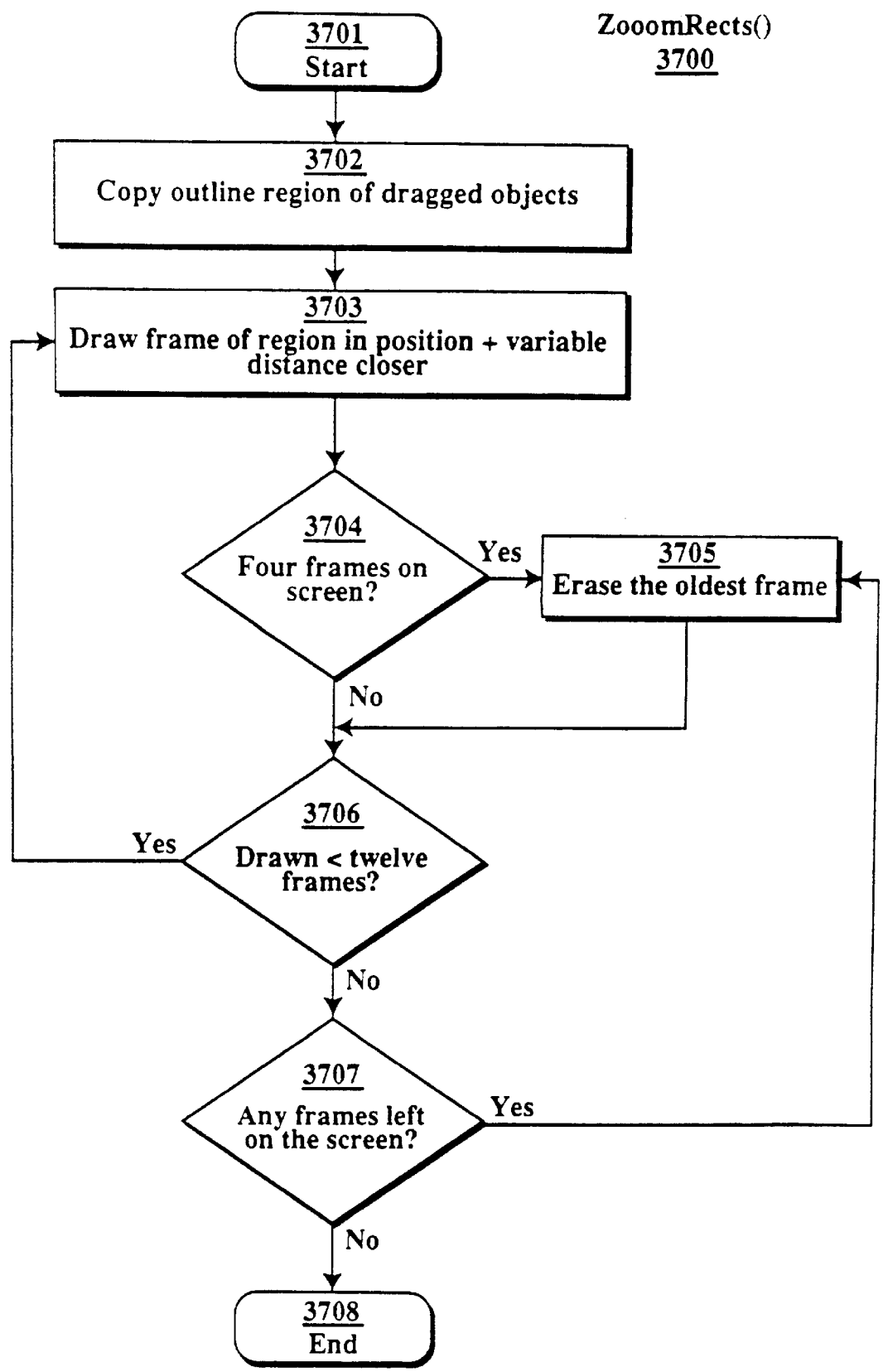
FIG. 37 shows an example process for providing abort or completion feedback.

Other user interface feedback is provided, as is illustrated in FIG. 37. This is the abort or completion feedback process entitled ZoomRects. For example, this process starts at step 3701 wherein the starting and ending drag objects and locations in global coordinates are passed to the process by the invoking handler. Then, an outline region of the dragged object(s) is displayed at step 3702. A frame of the region is then displayed at step 3703. It is determined at step 3704 whether four frames (the default, or n if specified in the call by the application's handler) are present on the screen, and, if so, then the oldest frame is erased at step 3705. If less than 12 frames have been drawn (the minimum to animate feedback), as determined at step 3706, then another frame is drawn at step 3703 back and process 3700 repeats steps 3704–3706. Upon reaching the destination on the display, if any frames are left on the display at step 3707, then process 3700 proceeds back to step 3705 to erase the oldest frame. Once all the frames have been erased from the display at step 3708, the process is complete, and rectangles have been drawn from the destination to the source location for abort feedback or, alternatively, in the case of destination feedback, from the source to the destination location on the display. In either event, an animated effect is provided to the user on the display similar to that provided and described with reference to FIGS. 20a–20d.

Other user interface actions performed on the display (e.g., navigation feedback, the progress bar, etc.) are performed using other techniques well-known to those skilled in the art.

Clipping

Interapplication dragging is one major feature provided by the preferred embodiment. This includes dragging between two different application programs, two application windows, and windows controlled by the file manager or Finder system service of the Macintosh® brand operating system. The Finder is also treated as another application program from the perspective of the operating system, it also provides a mechanism for receiving dragged data. In the case of a simple drag and drop to a window in the file system, such as the desktop or a folder (subdirectory), a clipping is created which appears and can be manipulated, as described above. Because this is a special and important instance of interapplication dragging, the detailed steps for generating a clipping will be discussed with reference to FIGS. 38a–38d.

In the preferred embodiment, the Drag Manager scans through each of the items in the drag item list and determines whether any are of the type which can be retrieved and stored as a file. This is shown with reference to FIG. 38a. For instance, the clipping process starts at step 3801 (the process entry point) and begins with the first drag item at step 3802. It determines whether this item contains a flavor of type 'hfs' at step 3803. This allows the receiver to determine whether it is a file object being moved, for example, in the file system. If it is a file system object (it has a flavor of type 'hfs'), as detected at step 3803, then, at step 3805, the file system object of type 'hfs' is retrieved from the drag item. Then, the file object is moved, and no clipping has been created. If, however, there is no flavor type of 'hfs,' as determined at step 3803, then all drag item flavors provided by the sender are stored into a clipping file at step 3804. This is to preserve the fidelity of the data for any flavor(s) requested by a receiver subsequently receiving the clipping. Step 3804 is shown in more detail with reference to FIG. 38b. If there are more drag items, as determined at step 3806, then process 3800 proceeds to step to the next drag item at step 3807, and steps 3803–3806 are performed repetitively until there are no more drag items left in the drag item list. Then, process 3800 ends at step 3808.

A more detailed view of step 3804 is illustrated with reference to FIG. 38b. 3804 starts at the process entry point 3811 and determines, at step 3812, by examining the flavors, whether there is a flavor of type 'cnam.' This is the name that the application recommends be given to the clipping. If so, then the clipping file is created at step 3813 based upon the 'cnam' flavor data. For example, an application program, such as a word processing program, may specify that clippings are to entitled "Word Processing Clipping 1," "Word Processing Clipping 2," etc. In another embodiment, the word processing document may give the clipping with the selected text "This is text" the file name "This is text" in the file system. Any file names of the application's choosing may be specified in the 'cnam' flavor specified by the application program.

Otherwise, if there is no specified 'cnam' flavor indicated by the sending application program, then a clipping file is created with some default name, such as "Untitled Clipping," at step 3814. Then, at step 3815, it is determined whether there is a drag item flavor 'prxy.' This flavor is used for specifying the default appearance of the icon for the application's clipping. For example, the application program may desire to provide a miniature representation of a view of the clipping, such as a condensed view of a graphics image, or a miniature image of text. Again, like the naming example, this is application-dependent. Then, if there is a type 'prxy' flavor in the drag item, then the 'prxy' flavor data is retrieved and used as the appearance of the icon for the clipping file at step 3816. Otherwise, a default icon for the clipping file, such as that for text (e.g., 781 in FIG. 7d) or graphic data (e.g., 780 in FIG. 7d) is used at step 3817. Step 3817 is shown in more detail with reference to FIG. 38d. In either event, all of the drag item flavors from the drag item(s) are retrieved from the sending application, if needed, and stored into the clipping file at step 3818, as is illustrated in FIG. 38b. This is to provide the highest fidelity for any application program which may subsequently desire to drop the clipping into one of its windows. This is shown in more detail with reference to FIG. 38c. In any event, upon storage of all the drag item(s) and flavors into the clipping file, the process ends at step 3819.

Figure 38A:
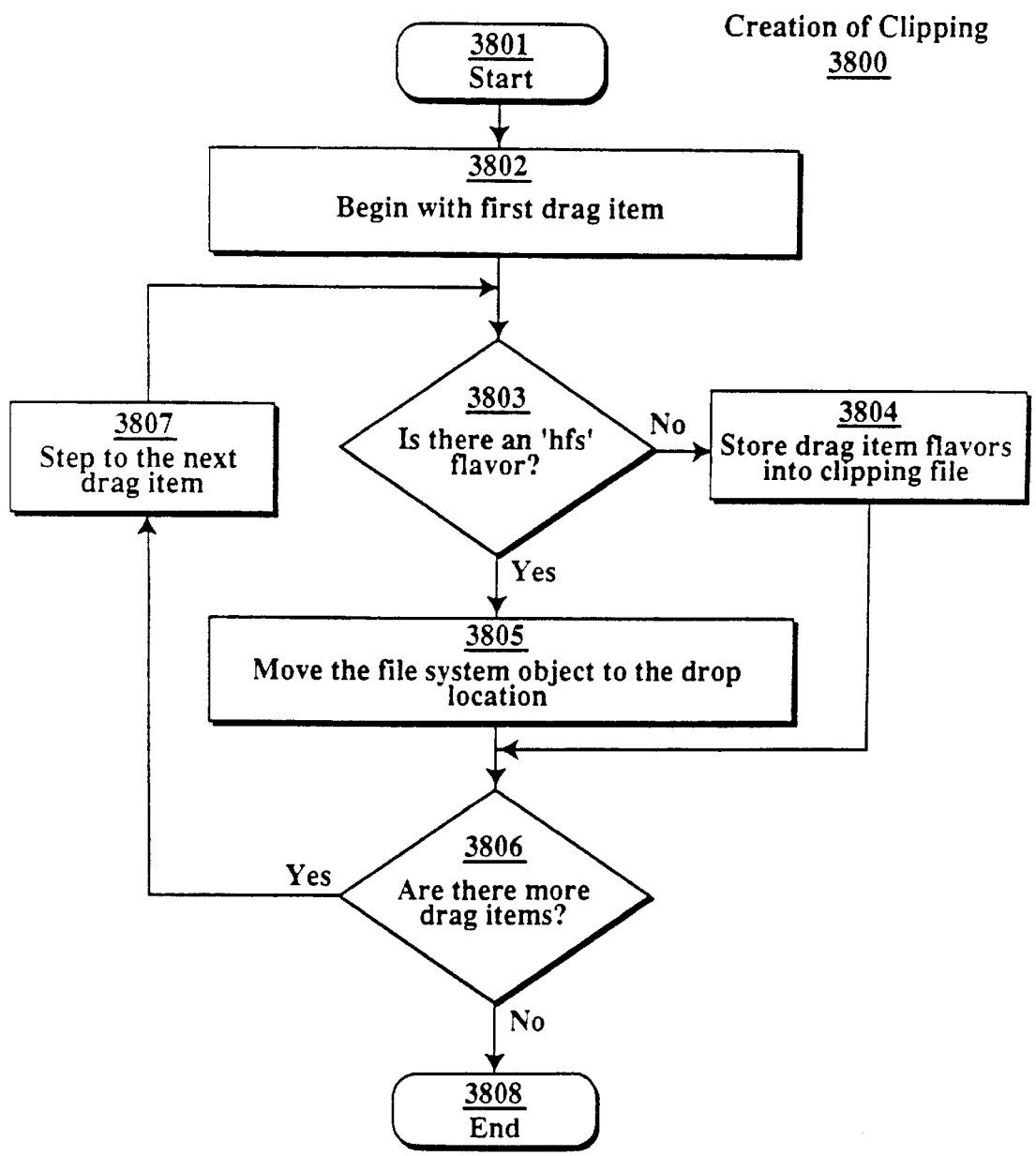
FIGS. 38a–38d illustrate a process for creating a clipping file in the file system of the a computer system.
Figure 38B:
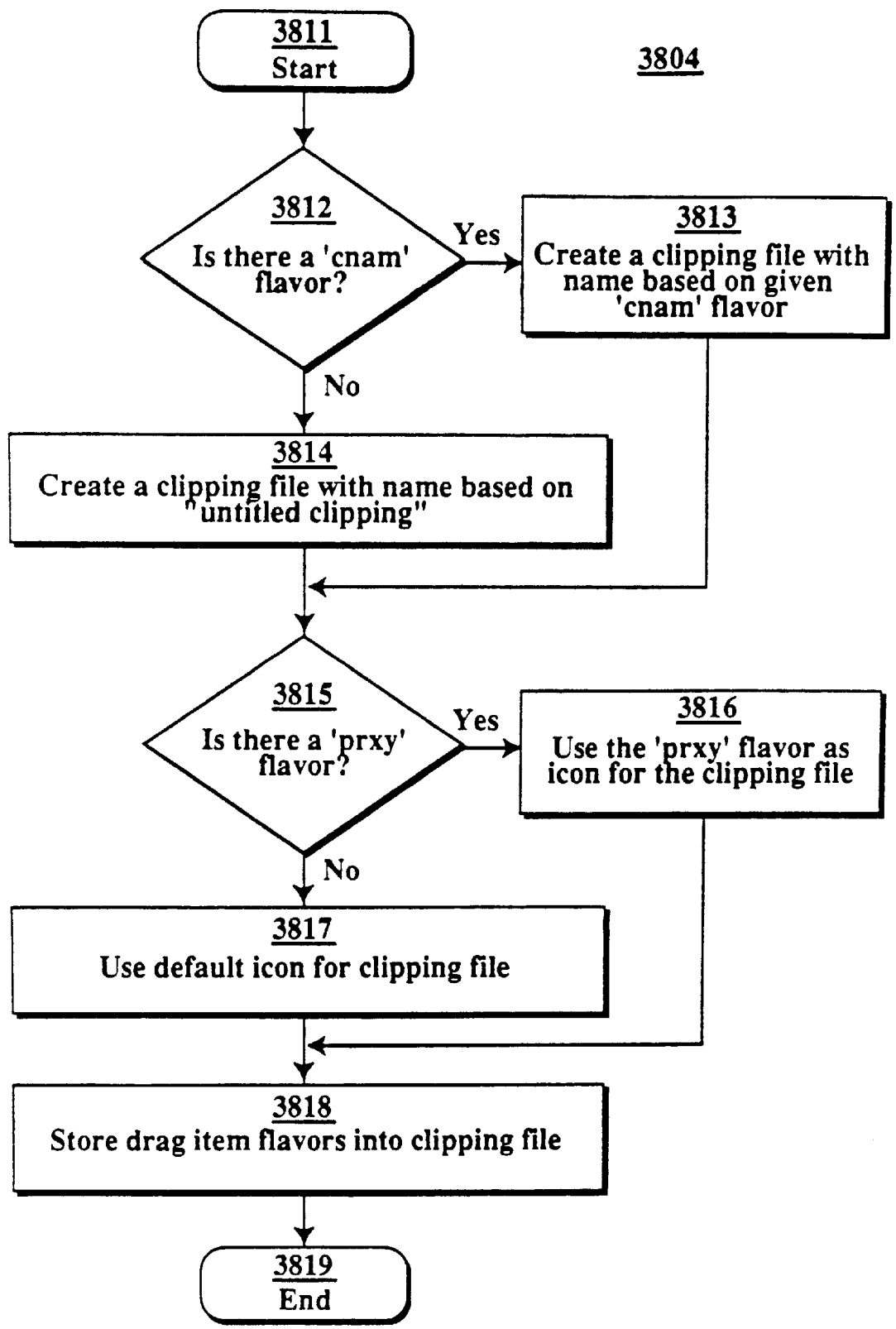
Figure 38C:
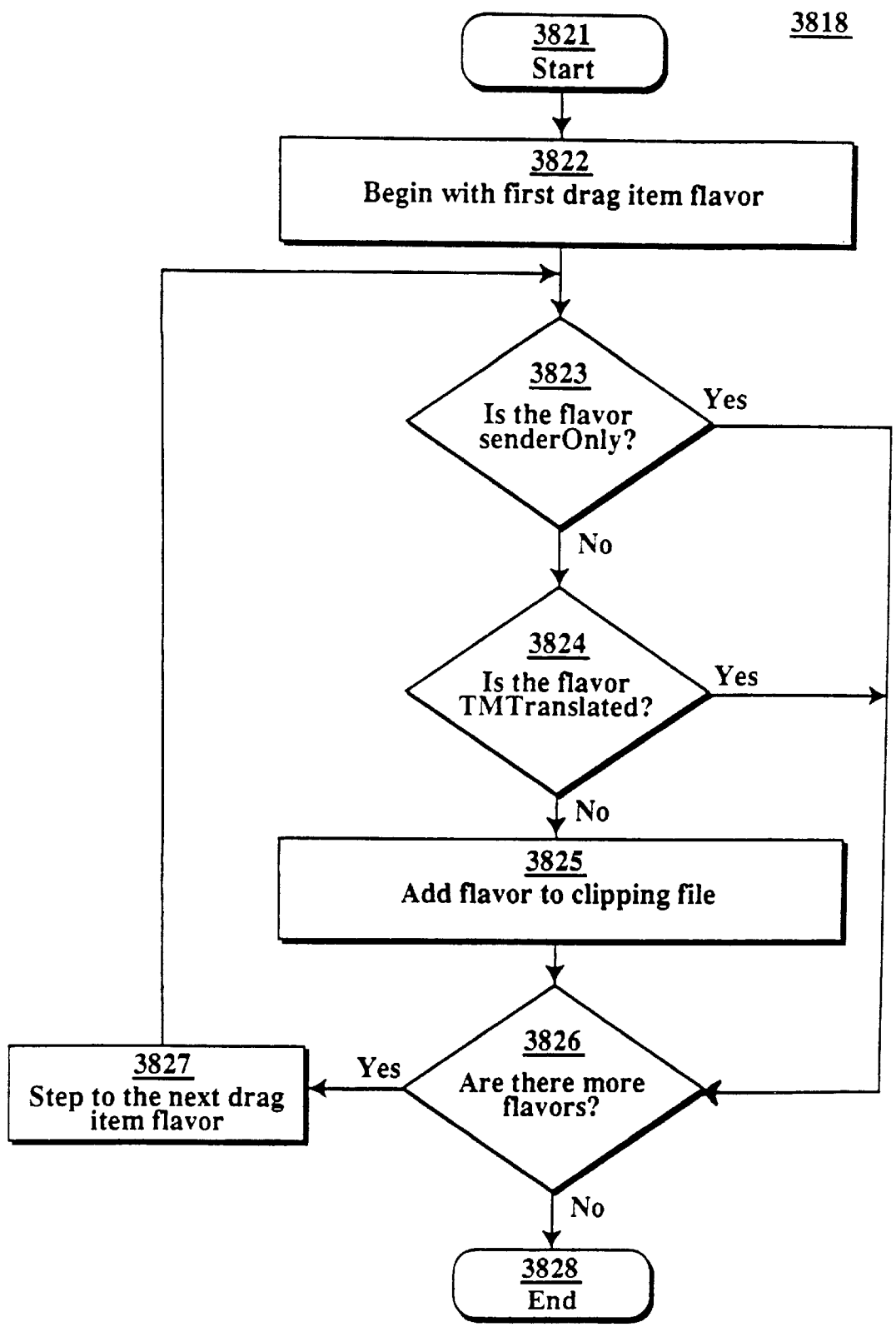

A more detailed view of step 3818 of process 3804 in FIG. 38b is illustrated with reference to FIG. 38c. For example, the process starts at process entry point 3821 and begins with the first drag item flavor listed in the drag item flavor list at step 3822. If the flavor is senderOnly, (as indicated by a flag stored with the flavor), as determined at step 3823, then the flavor is skipped, and it is determined at step 3826 whether there are more flavors. If the flavor is not sender only, as detected at step 3823, then it is determined whether the flavor has been translated by the Translation Manager at step 3824 indicated by the flag TMTranslated. If so, because the maximum fidelity of the clipping needs to be retained, then that flavor also is skipped for the creation of the clipping file since the translation of data may result in some loss in fidelity. No flavors which have been translated should be stored in the clipping. If the flavor is neither senderOnly nor TMTranslated, then the flavor being checked is added to the clipping file at step 3825 wherein the data is requested from the sender, if not provided in the drag item(s). Then, it is determined whether there are more flavors at step 3826, and, if so, then the next drag item flavor in the drag item flavor list is retrieved. Steps 3823–3827 repeat until the process ends at step 3828.

Figure 38D:
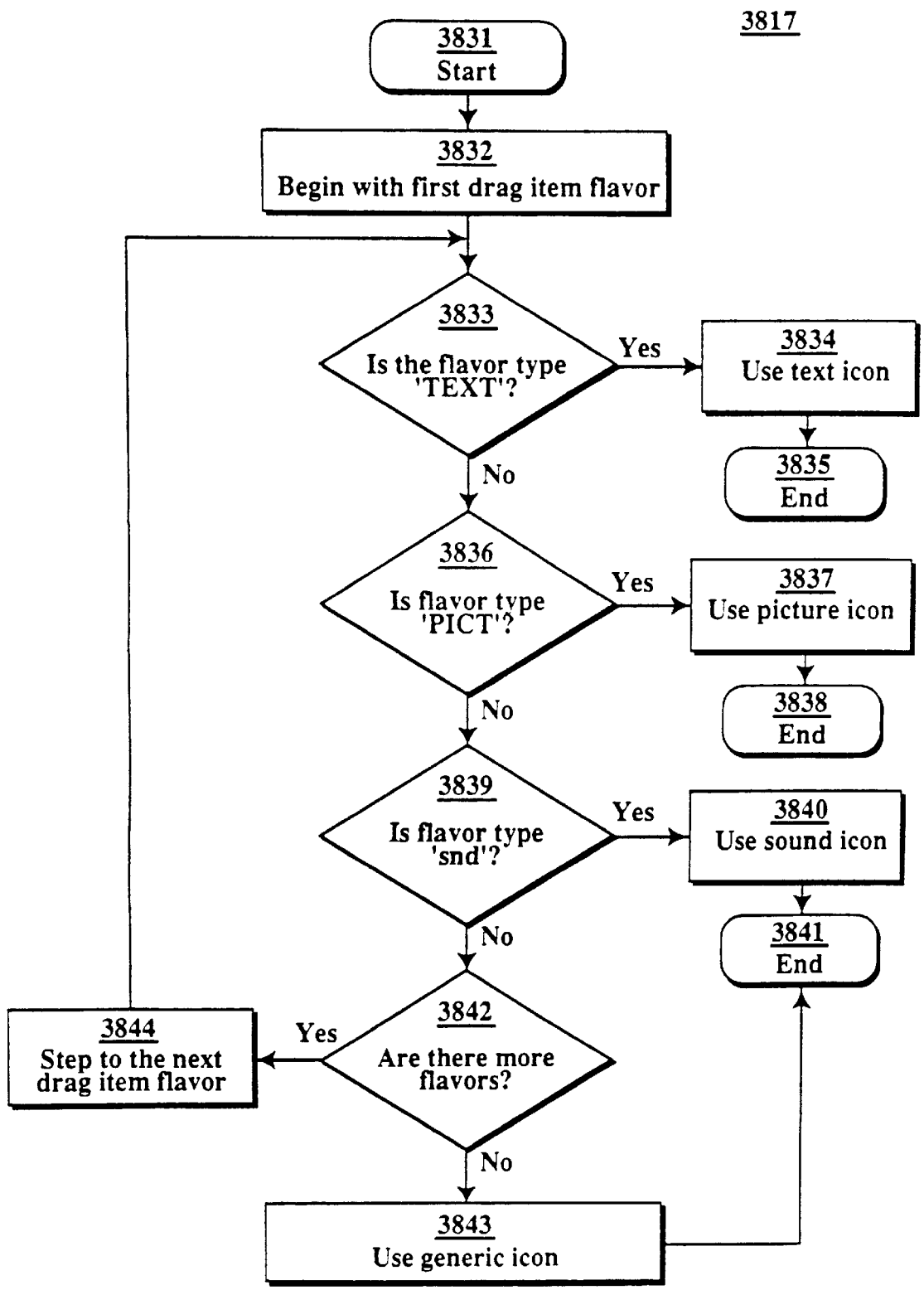

FIG. 38d illustrates the subprocess which is used for determining the appropriate icon to associate with the clipping file, as referred to at step 3817 in FIG. 38b. The process enters at step 3831 and begins by viewing the first drag item flavor at step 3832. Then, various flavors are tested for at steps 3833–3842 to associate with the file the default icon requesting the first flavor recognized by the clipping process. For example, the process determines whether the flavor type is of type 'TEXT' at step 3833, and if so, then the default text icon (e.g., 781 in FIG. 7d) is used to represent the clipping at step 3834. The process then ends at step 3835. If the flavor is of type 'PICT,' as determined at step 3836, then the picture icon is used at step 3837 (e.g., 780 of FIG. 7d), and the process ends at step 3838. If the flavor type is of type 'snd,' indicating a sound clipping, then the sound icon is used (e.g., 784 of FIG. 7d) at step 3840, and the process ends at step 3841. If there arm any additional flavors in the flavor list and an icon has not yet been assigned, as detected at step 3842, then the next drag item flavor is skipped to at step 3844 to determine another default icon may be associated with the clipping. Otherwise, if there are no more flavors to scan, as detected at step 3842, then the generic icon (e.g., 782 of FIG. 7d) is used to represent the clipping file at step 3843, and the process ends at step 3841.

Verb Selection

Figure 39:
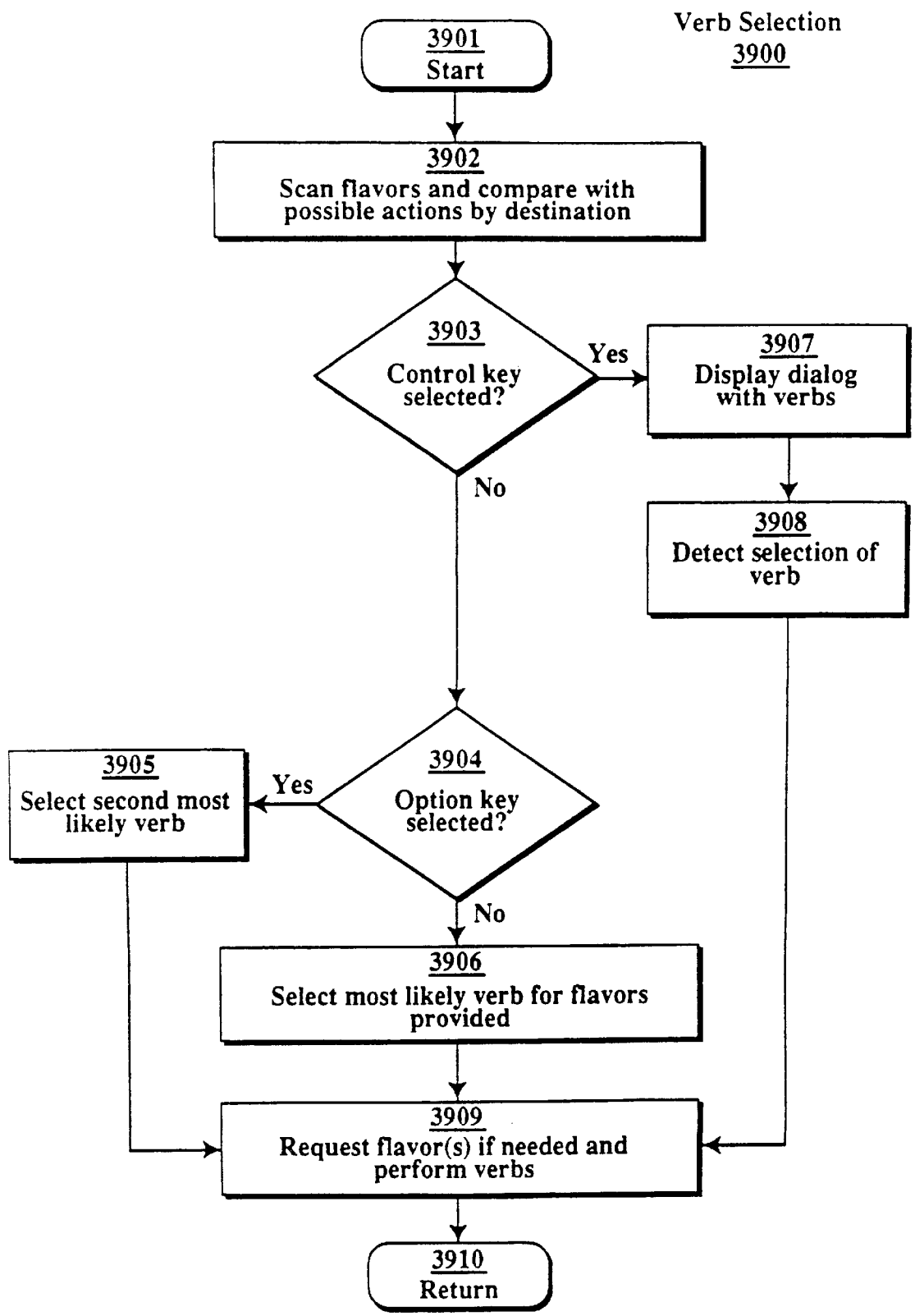
FIG. 39 shows a process implemented for selecting verbs which may be implemented in one embodiment of the present invention.

One method already referred to, but which may be better understood by a more detailed discussion, is verb selection. This is discussed with reference to FIG. 39. This process may be performed by a drag receive handler in a receiving process upon the detection of a mouse-up event (the release of a selection device). This is especially useful for system services (e.g., a printing service or a mailing service) but may also be performed by other receivers having specific functions. For example, the application program may invoke verb selection process 3900 to perform various actions. The process starts at entry point 3901, and, at step 3902, the process scans through the flavors and compare each of the flavors with possible actions to be performed by the destination. Each of the flavors are listed in hierarchical order so that preferred flavors are listed first, with less preferred listed last. Also, the destination will have a series of actions associated with it in hierarchical order and flavors associated with each action. For example, a printing process may have a primary verb "print" which prefers a flavor of 'styl' to perform the printing. Alternatively, the process may also be able to perform a function such as "copy" in the file system and require a flavor of 'hfs.' In either event, primary actions may be compared with flavors of the drag item(s) and arranged from most likely verb, given the flavor(s), to least likely verb. The user may then specify whether the primary or secondary (or other action) should take place by selecting certain keys. For example, at step 3903, if the "control" key has been selected by the user, then this may cause the dialog window with the verbs to be displayed and manually selected by the user at step 3907. For example, such a dialog window to allow a user to select verbs based upon flavors and actions may be displayed, as illustrated in FIG. 21 above. If so, then the selection made by the user can be detected at step 3908, and the flavors for the selected verb can be requested from the sending application program and the selected action can be performed at step 3909.

If, however, the "control" key was not selected, as detected at step 3903, then it can be determined whether the "option" key has been selected, as detected at step 3904. If not, then the most likely verb to be performed is selected at step 3906 (e.g., a "move" verb in the case of a movement of an icon within a single volume) and performed at step 3909. If, however, the "option" key has been selected, as detected at step 3904, then the second most likely verb is selected at step 3905. In the case of a single-volume file movement operation, this may cause a "copy" of the file represented by the icon to be performed. At any rate, the hierarchy is maintained and the first two most likely verbs may be accessed by the user by selecting the "option" key. In any event, the selected action is performed by requesting flavor(s) from the receiving application, if needed, and the performance of the action at step 3909. The verb selection process is thus complete at step 3910.

Summary

Thus, an improved interface and mechanism for manipulation of data in a computer system has been described. Although the foregoing has been described particularly with reference to FIGS. 1–39, it can be appreciated by one skilled in the art that many departures may be made without departing from the general spirit and scope of the present invention. Thus, the foregoing figures are merely to be viewed in an illustrative sense and in no way restrict the present invention.

What is claimed is:

1. A method of manipulating data between application programs in a computer-controlled display system comprising:

a. a user selecting a first item in a first window, said first window under control of a first process, said first process capable of providing data from the first item to a receiving process a plurality of formats, the first process capable of using data for a purpose other than conversion;

b. said user dragging said selected first item to a second window, said second window under control of a second process, said second process comprising at least one action the second process is capable of performing, each action specified to perform using data in at least one associated format, one of the at least one action identified as a primary action, the second process capable of utilizing data for purposes other than conversion of data;

c. said user deselecting said selected first item while said first item is located at said second window;

d. communicating to the second process formats in which first data from said first item can be provided by the first process;

e. said second process receiving an identification of the formats in which first data from said first item can be provided and determining if said second process can perform the primary action based upon a first data from the first item in the first format of the formats in which first data from said first item cane provide; and f. if the second process can perform the primary action based upon the first data from the first item in the first format,
  i. notifying the first process to communicate the first data in the first format to the second process,
  ii. said first process communicating the first data in the first format to the second process, and
  iii. said second process receiving first data from said first process in said first format and performing said primary action using the first data in said first format received from said first process.

2. The method of claim 1 wherein said second process comprises a plurality of different actions.

3. The method of claim 1, wherein the method comprises a primary state and an alternate state of operation, parts e and f performed only when the method is in the primary state, and when the method is in the alternate state, the method further comprising:

g. the second process receiving an identification of the formats in which first data from the first item can be provided, and determining if the second process can perform an alternate action based upon the first data from the first item in a second format of the formats in which first data from the first item can be provided; and h. if the second process can perform the alternate action based upon the first data from the first item in the second format,
  i. notifying the first process to communicate the first data in the second format to the second process,
  ii. the first process communicating the first data in the second format to the second process, and
  iii. the second process receiving first data from the first process in the second format and performing the alternate action using the first data in the second format received from the first process.

4. The method of claim 1, the method further comprising:

g. if the second process cannot perform the primary action based upon the first data from the first item in the first format and the second process can perform the alternate action based upon the first data from the first item in the first format,
  i. notifying the first process to communicate the first data in the first format to the second process,
  ii. the first process communicating the first data in the first format to the second process, and
  iii. the second process receiving the first data in the first format and performing the alternate action using the first data in the first format.

5. The method of claim 2 wherein said second process further comprises an alternate action the second process is capable of performing, said alternate action performed using data in a second format.

6. The method of claim 2, wherein said method comprises a first state and a second state of operation, said steps e and f performed only when said method is in said first state, and when said method is in the second state, said method further comprising:

g. displaying a list of executable actions, said executable actions determined from said plurality of actions which can be performed by said second process using said formats communicated by the first process;

h. said user selecting a desired action from said list of plurality of actions; and i. said second process performing said desired action using the first data in the associated format.

7. The method of claim 3 wherein the alternate action state is specified by said user using an input means.

8. The method of claim 5, wherein said formats communicated to the second process include the second format, said method further comprising g. if the second process cannot perform the primary action base upon the first data from the first item in the first format and the second process can perform the alternate action based upon the first data from the first item in the second format
  i. notifying the first process to communicate the first data in the second format to the second process,
  ii. said first process communicating the first data in the second format to the second process, and
  iii. said second process receiving the first data in the second format and performing the alternate action using the first data in the second format.

9. The method of claim 5 wherein said primary action moves said first item in a file system of said computer-controlled display system, and said alternate action copies said first item in said file system.

10. The method of claim 5 wherein said primary action comprises moving said first item from one location in the first window to another location in the second window in a file system of said computer-controlled display system, and said alternate action comprises making a copy of said first item from the first window to said second window in said file system.

11. The method as set forth in claim 6, further comprising the user selecting the state using an input device.

12. The method of claim 7 wherein said input means comprises a key on a user-actuated keyboard coupled to said computer controlled display system.

13. The method of claim 7 wherein said input means comprises displaying a list of a plurality of actions which may be performed by said second process using said first item, said user specifying said alternate action from said list.

14. An apparatus for manipulating data between application programs in a computer-controlled display system comprising:

a first process operating in the computer-controlled display system, said process capable of providing data from a first item in a plurality of formats to a receiving process, the first process capable of using data for a purpose other than conversion;

a first window, said first window under control of the first process;

a second process operating on the computer-controlled display system, said second process comprising at least one action Me second process is capable of performing, each action specified to perform data in at least one associated format, one of the at least one action identified as a primary action, the second process capable of using data for purposes other than conversion of data;

a second window, under control of the second process;

a selection device for a user selecting a first item in the first window, dragging said selected first item to a second window and deselecting said selected first item while said first item is located at said selected window;

said first process, communicating to the second process formats in which first data from said first item can be provided;

said second process receiving the formats in which first data from said first item can be provided, and determining if said second process can perform a primary action based upon data from the first item in one of the formats specified by the first process, and, if so, receiving data in the format associated with the primary action and performing said primary action using the data of said first item in said format associated with the primary action received from said first process.

15. A method of manipulating data between application programs in a computer-controlled display system comprising:

a user selecting a first item in a first window, the first window under control of a first process, the first process capable of providing data from the first item to a receiving process in a plurality of formats, the first process capable of using data for a purpose other than conversion;

the user dragging the selected first item to a second window, the second window under control of a second process, the second process comprising a plurality of actions the second process is capable of performing, each action specified to perform using data in at least one associated format, the second process capable of using data for purposes other than conversion of data;

the user deselecting the selected first item while the first item is located at the second window;

communicating to the second process an identification of formats in which first data from the first item can be provided;

the second process receiving the identification of formats in which first data from the first item may be provided;

the second process determining an action of the plurality of actions having an associated format that is one of the formats in which first data from the first item can be provided;

notifying the first process to communicate the first data in the associated format to the second process;

the first process communicating the first data in the associated format to the second process; and the second process receiving first data from the first process in the associated format and performing the action determined using the first data in the associated format received from the first process.

* * * * *